United States Patent
Nakagawa et al.

(10) Patent No.: US 6,810,131 B2
(45) Date of Patent: Oct. 26, 2004

(54) INFORMATION PROCESSING METHOD AND APPARATUS

(75) Inventors: Toshiyuki Nakagawa, Kanagawa (JP); Mitsuru Maeda, Tokyo (JP); Tadashi Ohira, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 09/750,164

(22) Filed: Dec. 29, 2000

(65) Prior Publication Data

US 2001/0028725 A1 Oct. 11, 2001

(30) Foreign Application Priority Data

| Jan. 5, 2000 | (JP) | 2000-000518 |
| Jan. 5, 2000 | (JP) | 2000-000517 |
| Jan. 21, 2000 | (JP) | 2000-013251 |
| Dec. 19, 2000 | (JP) | 2000-385941 |

(51) Int. Cl.[7] .............................................. G06K 9/00
(52) U.S. Cl. ...................... 382/100; 283/902; 380/201; 380/202; 386/94
(58) Field of Search ................................ 382/100, 232, 382/246, 251; 713/176, 179; 380/51, 54, 210, 252, 287; 370/522, 523, 524, 525, 526, 527, 528, 529; 283/72, 74, 75, 76, 77, 78, 79, 80, 81, 85, 93, 113, 901, 902; 358/328; 704/200.1, 273

(56) References Cited

U.S. PATENT DOCUMENTS

| 5,353,062 A | 10/1994 | Maeda | 375/240.14 |
| 5,748,742 A | * 5/1998 | Tisdale et al. | 380/249 |
| 5,768,426 A | * 6/1998 | Rhoads | 382/232 |
| 6,171,191 B1 | 1/2001 | Ogata et al. | 463/38 |
| 6,385,329 B1 | * 5/2002 | Sharma et al. | 382/100 |
| 6,496,591 B1 | * 12/2002 | Rhoads | 382/100 |
| 6,535,558 B1 | * 3/2003 | Suzuki et al. | 375/240.12 |
| 6,546,049 B1 | * 4/2003 | Lee | 375/240.03 |
| 6,611,607 B1 | * 8/2003 | Davis et al. | 382/100 |
| 6,641,479 B1 | 11/2003 | Ogata et al. | 463/37 |

FOREIGN PATENT DOCUMENTS

| EP | 0 696 668 | 1/2000 |
| EP | 0 969 668 | 1/2000 |
| JP | 10-295936 | 11/1998 |
| JP | 10-295937 | 11/1998 |
| JP | 2000-83233 | 3/2000 |

* cited by examiner

Primary Examiner—Bhavesh M. Mehta
Assistant Examiner—Abolfazl Tabatabai
(74) Attorney, Agent, or Firm—Fitzpatrick, Cella, Harper & Scinto

(57) ABSTRACT

In an image encoding apparatus for receiving and encoding an image signal, the input image signal is encoded in units of blocks in accordance with an encoding parameter via a DCT device, quantizer, and variable-length encoder. The encoded codes are multiplexed together with information indicating the presence/absence of scrambling, authentication data, a quantization parameter used in the quantizer, and a quantization parameter obtained by converting this quantization parameter. A copyrighted image signal is scrambled upon encoding, an image decoding apparatus of an authentic viewer normally plays back, and an image decoding apparatus of an unauthentic viewer plays back an image with which the viewer can recognize its outline.

98 Claims, 34 Drawing Sheets

FIG. 3

| SCRAMBLE ON/OFF FLAG | IP AUTHENTICATION RESULT | SELECTED BY SELECTOR 204 | SELECTED BY SELECTOR 207 | PLAYBACK IMAGE |
|---|---|---|---|---|
| ON | ○ | a | b | NORMAL |
| ON | × | a | a | DISTORTED |
| OFF | ○ | a | a | NORMAL |
| OFF | × | b | — | BLACK IMAGE |

※"DISTORTED" IN ITEM OF PLAYBACK IMAGE INDICATES DISTORTION PRODUCED BY SCRAMBLING

FIG. 10

| SCRAMBLE ON/OFF FLAG | IP AUTHENTICATION RESULT | SELECTED BY SELECTOR 503 | SELECTED BY SELECTOR 207 | PLAYBACK IMAGE |
|---|---|---|---|---|
| ON | ○ | c | b | NORMAL |
| ON | × | b | a | DISTORTED |
| OFF | ○ | b/c | a | NORMAL |
| OFF | × | a | — | BLACK IMAGE |

※"DISTORTED" IN ITEM OF PLAYBACK IMAGE INDICATES DISTORTION PRODUCED BY SCRAMBLING

FIG. 18

| SCRAMBLE ON/OFF FLAG | IP AUTHENTICATION RESULT | SELECTED BY SELECTOR 2002 | SELECTED BY SELECTOR 2009 | SELECTED BY SELECTOR 2302 | PLAYBACK IMAGE |
|---|---|---|---|---|---|
| ON | ○ | b | b | a | HIGH-RESOLUTION IMAGE |
| ON | × | b | a | a | DISTORTED |
| OFF | ○ | a | a/b | a | HIGH-RESOLUTION IMAGE |
| OFF | × | — | — | b | LOW-RESOLUTION IMAGE |

※"DISTORTED" IN ITEM OF PLAYBACK IMAGE INDICATES DISTORTION PRODUCED BY SCRAMBLING

FIG. 28

| SCRAMBLE ON/OFF FLAG | IP AUTHENTICATION RESULT | SELECTED BY SELECTOR 4002 | SELECTED BY SELECTOR 2002 | PLAYBACK IMAGE |
|---|---|---|---|---|
| ON | ○ | b | b | NORMAL |
| ON | × | b | a | DISTORTED |
| OFF | ○ | b | a | NORMAL |
| OFF | × | a | — | BLACK IMAGE |

※"DISTORTED" IN ITEM OF PLAYBACK IMAGE INDICATES DISTORTION PRODUCED BY SCRAMBLING

FIG. 33

| IPMP Time | IPMP Command |
|---|---|
| 0 | FREE 1ST IPMP PACKET |
| 1000 | CHARGE 2ND IPMP PACKET |

FIG. 34

| IPMPS_Type | CONTROL METHOD |
|---|---|
| 1 | ADD NOISE |
| 2 | BLACK OUT |
| 3 | STILL IMAGE |
| 4 | BLUR/MOSAIC |
| 5 | DESIGNATE PIXEL RESOLUTION |
| 6 | DESIGNATE NUMBER OF LUMINANCE GRAY LEVELS |
| 7 | DESIGNATE FREQUENCY RESOLUTION |

INFORMATION PROCESSING METHOD AND APPARATUS

FIELD OF THE INVENTION

The present invention relates to an image processing method and apparatus for encoding and/or decoding an image to protect the copyright or the like of its rightful holder.

The present invention also relates to an image encoding apparatus and method for receiving and encoding a moving image, and an image decoding apparatus and method for decoding the encoded codes.

Furthermore, the present invention relates to a data processing method and apparatus for processing not only image data but also audio data and, more particularly, to a data processing method and apparatus which are suitable for a case wherein authentication is required for the purpose of copyright protection upon reclaiming predetermined information from a plurality of object streams.

BACKGROUND OF THE INVENTION

Conventionally, as image coding schemes, coding schemes such as Motion JPEG, Digital Video, and the like as intra-frame coding, and coding schemes H.261, H.263, MPEG-1, MPEG-2, and the like using inter-frame predictive coding are known. These coding schemes have been internationally standardized by ISO (International Organization for Standardization) and ITU (International Telecommunication Union). Intra-frame coding is best suitable for apparatuses which require edit and special playback processes of moving images, since it encodes in units of frames, and allows easy management of frames. On the other hand, inter-frame coding can assure high coding efficiency since it uses inter-frame prediction based on the difference between image data of neighboring frames.

Furthermore, international standardization of MPEG-4 as versatile next-generation multimedia coding standards which can be used in many fields such as computers, broadcast, communications, and the like is in progress.

As such digital coding standards have prevailed, the contents industry strongly recognizes a problem of copyright protection. That is, contents cannot be provided with confidence using standards which cannot sufficiently guarantee copyright protection.

To solve this problem, MPEG-4 adopts an IPMP (Intellectual Property Management and Protect) technique, and a function of suspending/restarting playback of an image to protect copyrights is examined. In this scheme, copyright protection is implemented by inhibiting playback of frames, the copyright of which must be protected.

On the other hand, a scheme and service which provide scrambled images with which the viewers can recognize their outlines have been started. More specifically, sub scrambling is implemented by replacing arbitrary scan lines or pixels in an image signal (television signal). Also, a method of converting a playback image to be output by a playback apparatus is available.

Furthermore, a scalability function is examined, and a method of encoding/decoding images to have a plurality of levels of image temporal and spatial resolutions is available.

However, in a general copyright protection process, the following problems are posed.

(1) Since the conventional IPMP technique stops decoding or playback of an image which must undergo copyright protection, no information can be provided to the viewer at all. This means that no information of the contents (e.g., image) can be provided to an unauthorized viewer (non-subscriber) of that video or the like. Originally, the contents provider wants to distribute contents to more viewers, and contents information must be provided to viewers not entitled to these contents to some extent. That is, in order to distribute contents to more viewers and to obtain more subscribers, the contents provider wants to provide information of given contents even to viewers not entitled to these contents so that they can recognize the contents to some extent.

(2) In the aforementioned image coding schemes, when the entire bitstream is scrambled by the conventional scheme, a viewer who has a decoder that cannot descramble the scrambled bitstream or a viewer not entitled to these contents cannot normally descramble the bitstream, and cannot recognize a video at all.

(3) The aforementioned image coding schemes implement high coding efficiency by exploiting the correlation of images in the space and time directions. When an input image upon encoding is scrambled by the conventional scheme, the correlation of images in the space and time directions is lost, thus considerably impairing coding efficiency.

(4) Furthermore, even when a bitstream is partially scrambled, in a playback image of a moving image coding scheme using inter-frame predictive coding, distortion in a given frame propages to the next frame, and is gradually accumulated. For this reason, the distortion generated is not steady; when a playback image is reviewed on the decoding side, whether distortion is caused by scrambling or is a symptom of another operation error can hardly be discriminated.

(5) In recent years, the process of an image encoding/decoding apparatus is complicated, and software encoding/decoding is often used. In such case, if the load of the scramble process other than the image encoding/decoding process is heavy, the performance of the overall apparatus lowers.

MPEG (Moving Picture Experts Group)-4 mentioned above is a scheme for combining multimedia data containing a plurality of objects such as a moving image object, audio object, and the like, and sending them as a single bitstream. Hence, the receiving side (playback side) of MPEG-4 plays back, e.g., audio and moving picture scenes in association with each other. Such MPEG-4 player must be able to impose various limitations on the use of all or some data to protect the copyrights and the like of their rightful holders.

An MPEG-4 data stream has a function of independently sending/receiving a plurality of video scenes and video objects on a single stream unlike a conventional multimedia stream. As for audio data, a plurality of objects can be decoded from a single stream. That is, the MPEG-4 data stream contains BIFS (Binary Format for Scenes) obtained by modifying VRML (Virtual Reality Modeling Language) as information for compositing these scenes.

Since individual objects required for such scene composition are sent while independently undergoing optimal coding, the decoding side decodes them individually. The player then synchronously composites and plays back scenes by adjusting the time axes of individual data to the internal time axis of the player in accordance with the description of BIFS.

In order to protect copyrights, a process for sending processed data by encrypting data to be sent or embedding digital watermark data is required on the sending side. The receiving side, i.e., the player side acquires information for decrypting (decoding) the encrypted data or information required for authentication using the digital watermark when the user pays a given fee for the copyrights, and reconstructs data containing a desired moving image and audio from the processed data and plays back the decoded data. Upon decrypting the encrypted data or authenticating using the digital watermark, copyright protection is attained by limiting the number of copies of data or inhibiting decoded data from being edited with other objects.

In this way, since the MPEG-4 player composites a plurality of objects, use limitations must be set for individual objects according to copyrights. For this purpose, the present applicant has proposed a system for obtaining authentication information that pertains to copyright use of each object in Japanese Patent Application No. 10-295936.

However, a method of playing back a specific object, the use of which is denied as a result of authentication, or an object, the playback of which is limited since no given fee is paid for copyrights, while lowering its quality (image size, image quality, sound quality, or the like) upon playback has not been proposed.

SUMMARY OF THE INVENTION

The present invention has been made in consideration of the aforementioned prior art, and has as its object to provide an image processing method and apparatus, and a storage medium, which scrambles an image signal which requires copyright protection upon encoding an image, allows an image decoding apparatus of an authentic viewer to normally play back an image, and allows an image decoding apparatus of an unauthorized viewer to play back an image so that the viewer can recognize an outline of the image.

It is another object of the present invention to generate an encoded image signal, image contents of which can be roughly recognized even by an apparatus of an unauthorized viewer.

It is still another object of the present invention to allow an apparatus of even an unauthorized viewer to decode encoded image signal so that the viewer can roughly recognize the image contents.

It is still another object of the present invention to partially scramble a bitstream which requires copyright protection upon encoding an image, and to encode an image without any coding efficiency drop.

It is still another object of the present invention to control playback quality of each object on the basis of whether or not the user who is about to restore and play back data is authentic upon restoring and playing back information from a data stream containing a plurality of objects.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing the relationship between the input/output of a security controller and the playback image according to the first embodiment;

FIG. 10 is a table showing the relationship between the input/output of a security controller and the playback image according to the second embodiment;

FIG. 18 is a table for explaining the relationship between the input/output of a security controller and the playback image according to the fourth embodiment;

FIG. 28 is a table showing the relationship between the input/output of a security controller and the playback image according to the sixth embodiment;

FIG. 33 is a table showing an example of details of management information to be processed by the data processing apparatus of the seventh embodiment;

FIG. 34 is a table showing an example of details of management information that controls playback of the IPMP controller 20.

DESCRIPTION OF THE PREFERRED EMBODIMENTS

Preferred embodiments of the present invention will now be described in detail in accordance with the accompanying drawings.

First Embodiment

Figure 1:
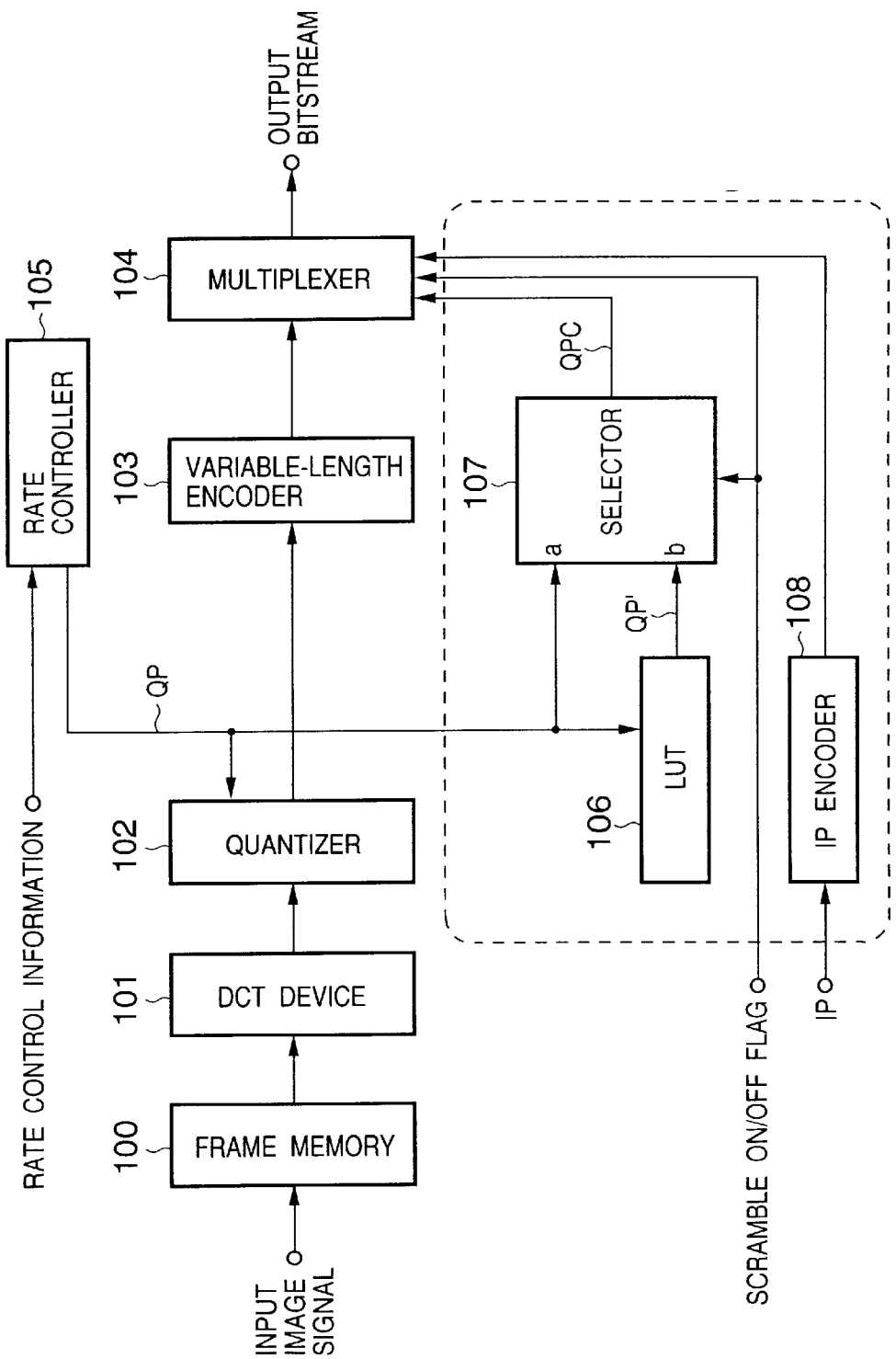
FIG. 1 is a block diagram showing the arrangement of an image encoding apparatus according to the first embodiment.
Figure 2:
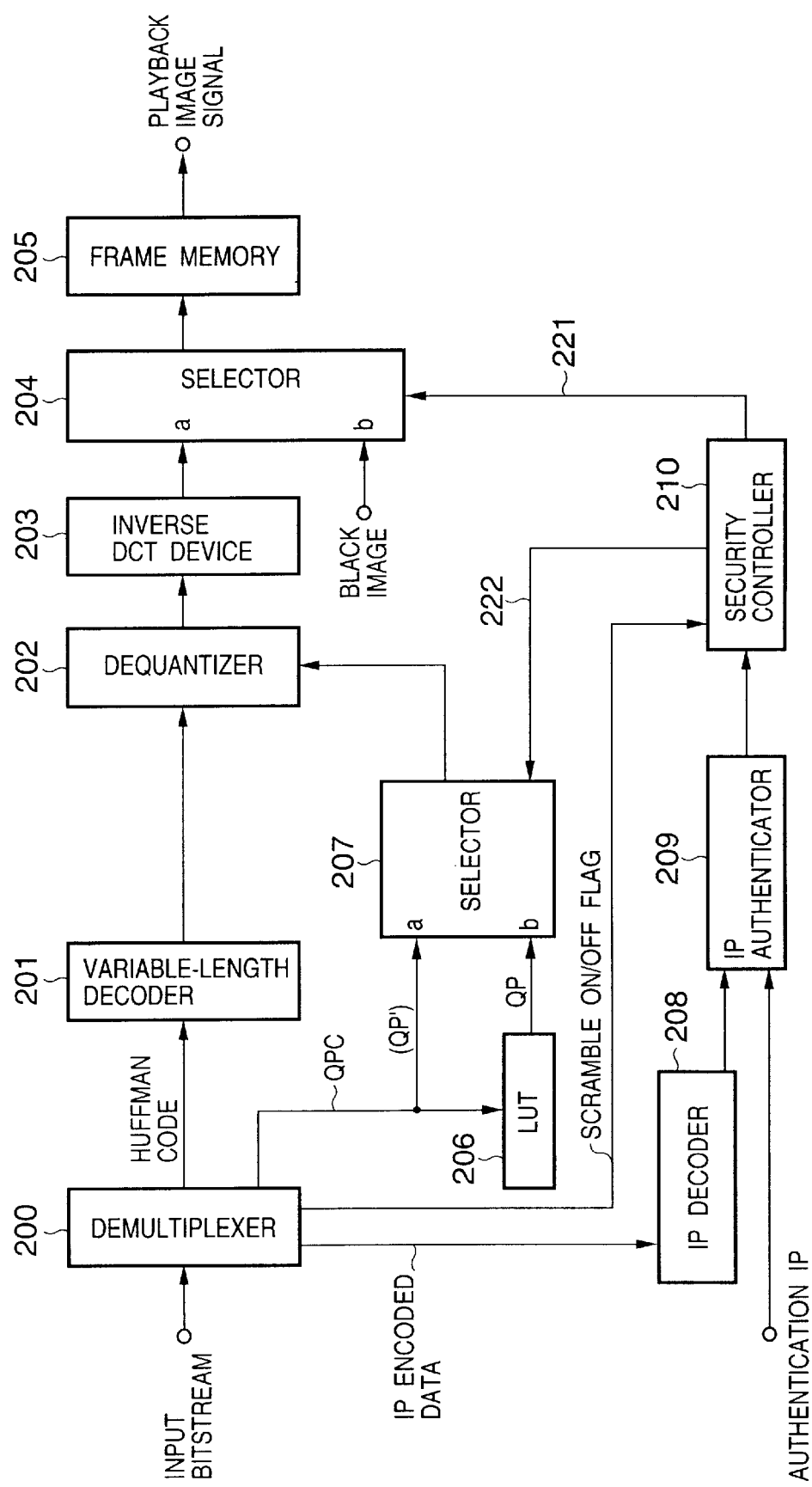
FIG. 2 is a block diagram showing the arrangement of an image decoding apparatus according to the first embodiment.

FIG. 1 is a block diagram showing the arrangement of an image encoding apparatus according to the first embodiment, and FIG. 2 is a block diagram showing the arrangement of an image decoding apparatus for decoding codes encoded by the encoding apparatus shown in FIG. 1. In the first embodiment, a case will be exemplified below wherein quantization parameters are scrambled by JPEG. See ITU T.81 for details of JPEG.

Referring to FIG. 1, reference numeral 100 denotes a frame memory for storing an input image signal for one frame, and outputting macroblocks as encoding units (luminance data is expressed by 16×16 pixels and each of color difference data Cb and Cr is expressed by 8×8 pixels and, hence, luminance data is defined by four blocks and each color difference data is defined by one block; this applies to the case of color signal format 420, and other color signal formats may be used). Reference numeral 101 denotes a DCT (discrete cosine transformation) device for transforming the input macroblocks in turn in units of blocks by computing two-dimensional discrete cosine transforms (DCTs) in units of 8×8 pixels, and outputting DCT coefficients.

$QP[j][i]$ (j=0 to 1, i=0 to 63) is a quantization matrix, and represents two different matrices for a luminance signal when j=0 and for color difference signals when j=1 in the first embodiment. This matrix is a two-dimensional one consisting of 8×8 pixels, and assumes a total of 128 (=64×2) 8-bit values.

Reference numeral 105 denotes a rate controller which receives rate control information, and outputs the quantization matrix $QP[j][i]$ to a quantizer 102 and LUT 106 (to be described below). The quantizer 102 receives the quantization matrix $QP[j][i]$, and outputs quantization representative values. Reference numeral 103 denotes a variable-length encoder which encodes the quantization representative values by Huffman coding, and outputs Huffman codes. Reference numeral 106 denotes a look-up table (LUT) which converts the quantization matrix $QP[j][i]$ used in the quantizer 102 into a scrambled value $QP'[j][i]$. Note that scrambling is done within the range of i=3 to 63.

The LUT 106 converts the quantization matrix by:

$$QP'[j][i] = QP[j][i] \text{ XOR } 0FFH$$

where XOR is the exclusive OR, and H indicates hexadecimal notation (for i=3 to 63, j=0 or 1). As described above, the quantization matrix $QP[j][i]$ in JPEG includes a luminance signal matrix and color signal matrix in which 64 8-bit values successively appear in a zigzag scan order. In this embodiment, each 8-bit value of this quantization matrix is to be scrambled and, hence, each $QP'[j][i]$ is an 8-bit value.

Note that the decoding side uses the same conversion formula in this embodiment.

Reference numeral 107 denotes a selector for selecting one of $QP[j][i]$ and $QP'[j][i]$ in accordance with an externally input scramble ON/OFF flag, and outputs the selected value as encoded data $QPC[j][i]$ of the quantization matrix. If the scramble ON/OFF flag is ON, $QPC[j][i]=QP'[j][i]$; if the scramble ON/OFF flag is OFF, $QPC[j][i]=QP[j][i]$.

Reference numeral 108 denotes an IP encoder for encoding information for protecting a copyright IP (Intellectual Property) of image data, and outputting IP encoded data. In this embodiment, this IP is a password. Reference numeral 104 denotes a multiplexer for multiplexing the Huffman codes output from the variable-length encoder 103, $QPC[j][i]$ from the selector 107, and comment data including the externally input scramble ON/OFF flag and IP encoded data output from the IP encoder 108 in accordance with the JPEG format, and outputting multiplexed data as a bitstream.

The operation in the image encoding apparatus shown in FIG. 1 will be explained below.

An input image signal is temporarily stored in the frame memory 100, and is output as macroblocks as encoding units. The DCT device 101 transforms the input macroblocks into DCT coefficients in units of blocks. The quantizer 102 receives the quantization matrix $QP[j][i]$ as control information from the rate controller 105, converts the DCT coefficients input from the DCT device 101 into quantization representative values, and outputs the converted values. The variable-length encoder 103 encodes the quantization representative values output from the quantizer 102 into Huffman codes, and outputs the Huffman codes. On the other hand, the LUT 106 converts the quantization matrix $QP[j][i]$ into $QP'i[j][i]$.

A case will be explained first wherein the scramble ON/OFF flag is ON.

When the scramble ON/OFF flag is ON, the selector 107 selects $QP'[j][i]$ from the LUT 106 at input b, and outputs it as $QPC[j][i]$ (=$QP'[j][i]$). The IP encoder 108 encodes externally input IP and outputs IP encoded data. The multiplexer 104 multiplexes and outputs the Huffman codes from the variable-length encoder 103, the quantization matrix $QPC[j][i]$ from the selector 107, and comment data including the scramble ON/OFF flag (=ON) and the IP encoded data from the IP encoder 108 in accordance with the JPEG format.

A case will be explained first wherein the scramble ON/OFF flag is OFF.

When the scramble ON/OFF flag is OFF, the selector 107 selects the quantization matrix QP[j] [i] at input a, and outputs it as QPC[j] [i] (=QP[j] [i]). The IP encoder 108 encodes externally input IP and outputs IP encoded data. The multiplexer 104 multiplexes and outputs the Huffman codes from the variable-length encoder 103, the quantization matrix QPC[j] [i] from the selector 107, and comment data including the scramble ON/OFF flag (=OFF) and the IP encoded data from the IP encoder 108 in accordance with the JPEG format.

Figure 4:
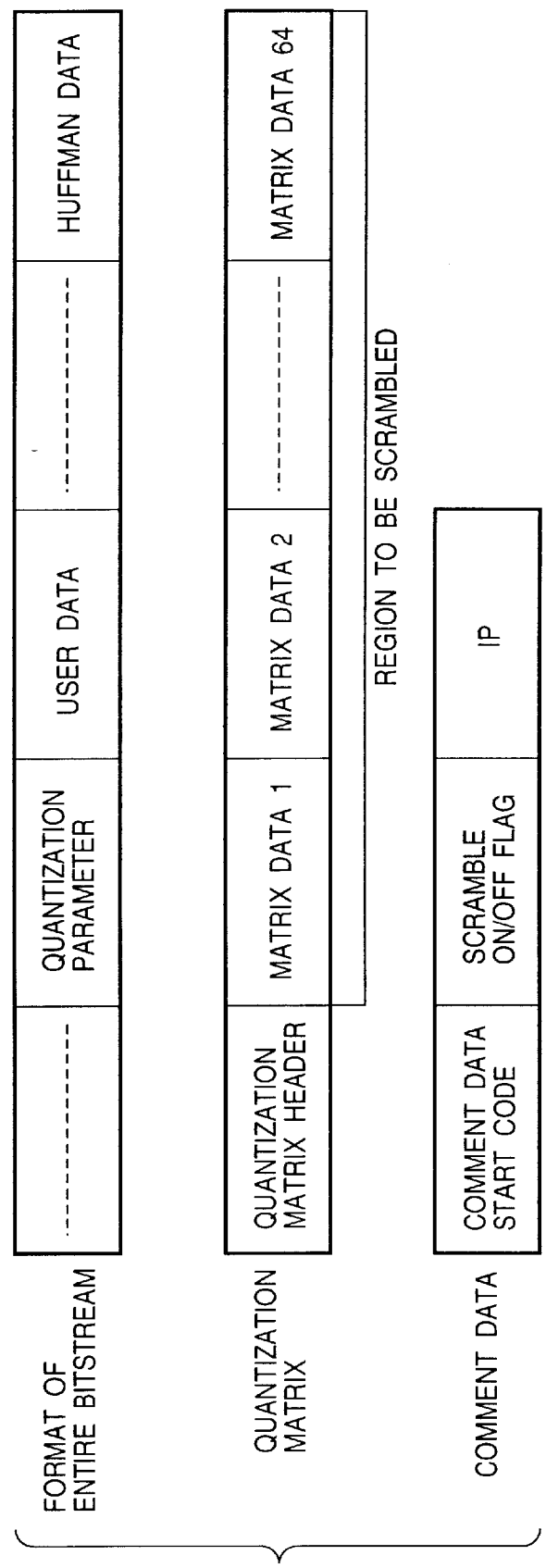
FIG. 4 is a view for explaining the format of a bitstream according to the first embodiment.

FIG. 4 is a view for explaining an outline of the format of the bitstream according to this embodiment.

Since the code amount is controlled by a quantization matrix in JPEG, the entire matrix is to be scrambled. There are two different matrices for luminance and color difference signals, but since they have the same format, FIG. 4 shows only one of these matrices. Comment data formed by the output (IP encoded data) from the IP encoder 108 and scramble ON/OFF flag starts from a 16-bit comment data start code, which is followed by a 1-bit scramble ON/OFF flag and 4-byte IP encoded data. For example, when an externally input password upon scramble=ON includes text codes "ABCD", scramble ON/OFF flag=1, and IP encoded codes=41H, 42H, 43H, and 44H (H indicates hexadecimal notation).

Figure 5:
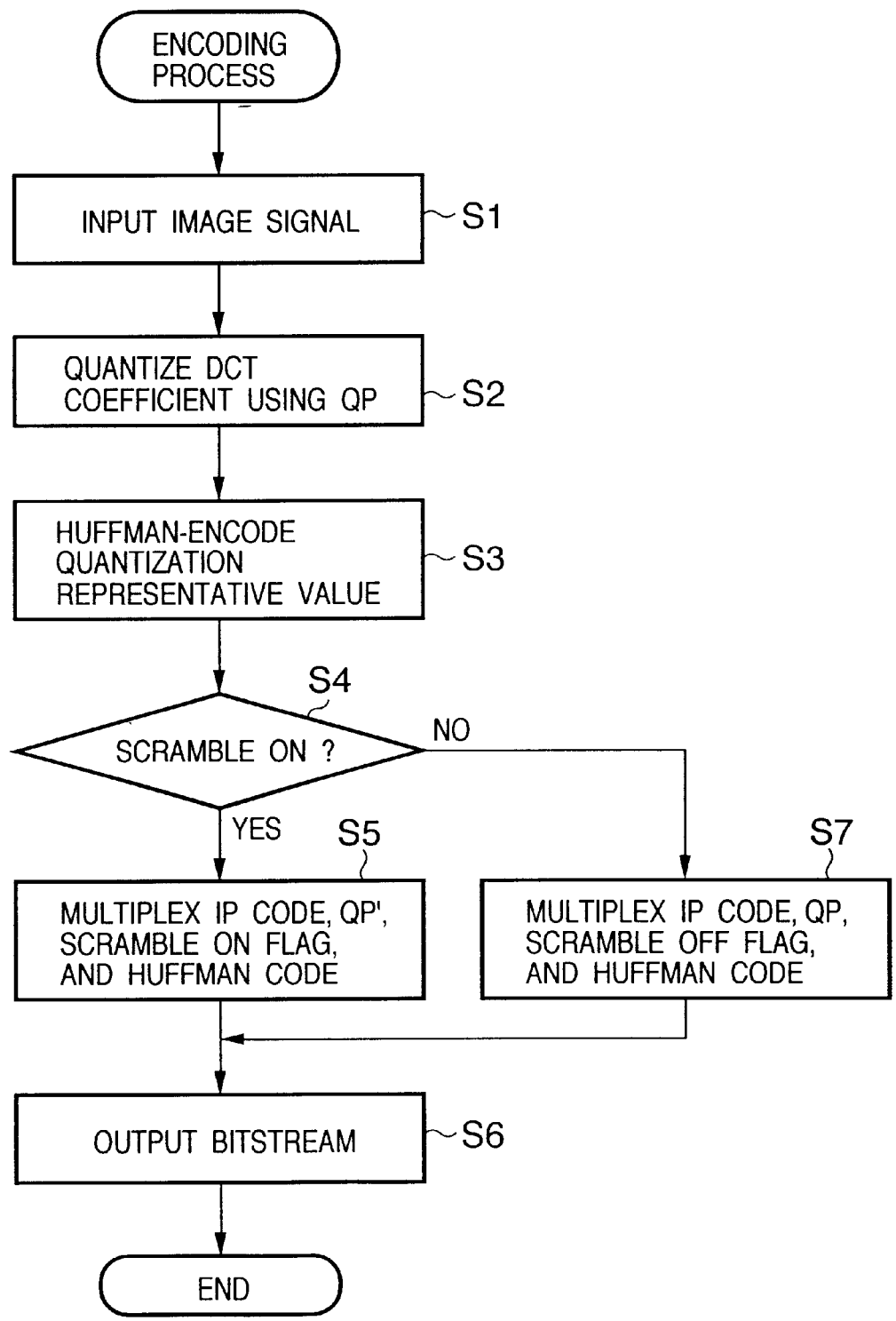
FIG. 5 is a flow chart showing an encoding process in the image encoding apparatus according to the first embodiment.

FIG. 5 is a flow chart showing an encoding process in the image encoding apparatus according to the first embodiment of the present invention.

In step S1, an image signal is input. In step S2, the DCT device 101 computes the DCTs of the input image signal and the quantizer 102 quantizes the computed DCT coefficients using the quantization matrix QP. In step S3, the variable-length encoder 103 converts the quantized quantization representative values into Huffman codes. It is checked in step S4 if the scramble ON/OFF flag is ON. If the flag=ON, the flow advances to step S5 to multiplex IP encoded data obtained by encoding input IP, QP' as the quantization matrix, a scramble ON flag, and the Huffman codes. In step S6, multiplexed data is output as a bitstream.

On the other hand, if the scramble ON/OFF flag is OFF in step S4, the flow advances to step S7 to multiplex IP encoded data obtained by encoding input IP, QP' as the quantization matrix, a scramble ON flag, and the Huffman codes. In step S6, multiplexed data is output as a bitstream.

An image decoding apparatus shown in FIG. 2 will be explained below.

Referring to FIG. 2, reference numeral 200 denotes a demultiplexer for demultiplexing the input bitstream into a Huffman code, QPC[j] [i], scramble ON/OFF flag, and IP encoded data, and outputting them to corresponding units. Reference numeral 201 denotes a variable-length decoder for receiving the Huffman codes output from the demultiplexer 200 and converting them into quantization representative values. Reference numeral 202 denotes a dequantizer for outputting the quantization representative values output from the variable-length decoder 201 as DCT coefficients. Reference numeral 203 denotes an inverse DCT device for transforming the DCT coefficients output from the dequantizer 202 into image data. Reference numeral 208 denotes an IP decoder for decoding the IP encoded data into an IP. Reference numeral 209 denotes an IP authenticator for checking using an externally input authentication IP if the IP decoded by the IP decoder 208 is authentic. Reference numeral 210 denotes a security controller for outputting switching signals 221 and 222 on the basis of the scramble ON/OFF flag input from the demultiplexer 200 and the authentication result from the IP authenticator 209 so as to control input signal select processes in selectors 204 and 207 to be described below. The selector 204 selects one of image data from the inverse DCT device 203 or black image data in accordance with the switching signal 221 output from the security controller 210. Reference numeral 205 denotes a frame memory for outputting image data in units of macroblocks as a playback image signal. Reference numeral 206 denotes an LUT for converting QPC[j] [i] (=QP') into the quantization matrix QP[j] [i]. The selector 207 outputs one of QP[j] [i] and QP'[j] [i] in accordance with the switching signal 222 from the security controller 210. Since QPC[j] [i] may be QP (when scramble=OFF) the LUT 206 does not execute any conversion in such case, and the selector 207 selects input a.

The conversion formula in the LUT 206 will be explained below. This conversion formula is the same as that of the LUT 106 shown in FIG. 1, as mentioned above.

QP'[j]=QP[j] [i] XOR FFH where XOR indicates an exclusive OR.

The operation of the image decoding apparatus shown in FIG. 2 will be explained below.

In the first embodiment, the demultiplexer 200 demultiplexes the input bitstream into Huffman codes, QPC[j] [i], a scramble ON/OFF flag, and IP encoded data. The variable-length decoder 201 decodes the Huffman codes into quantization representative values.

A case will be explained below wherein the scramble ON/OFF flag is ON and the IP authentication result is OK.

The LUT 206 having inverse conversion characteristics with respect to the LUT 106 in FIG. 1 converts QPC[j] [i] (=QP'[j] [i]), and outputs QP[j] [i]. The selector 207 receives QP'[j] [i] at input a, and QP[j] [i] at input b. In this case, since the authentication result of the security controller 210 is OK, the selector 207 selects QP[j] [i] at input b, and outputs it to the dequantizer 202. The dequantizer 202 dequantizes using the quantization matrix QP[j] [i] which is the same as that used in the quantizer 101 in the encoding apparatus in FIG. 2, and outputs DCT coefficients. The inverse DCT device 203 receives the DCT coefficients output from the dequantizer 202, and outputs image data by computing inverse DCTs. In this case, the selector 204 selects input a, and outputs it to the frame memory 205. As a result, this decoding apparatus can play back a normal image.

A case will be explained below wherein the scramble ON/OFF flag is ON and the IP authentication result is NG.

The LUT 206 having inverse conversion characteristics with respect to the LUT 106 in FIG. 1 converts QPC[j] [i] (=QP'[j] [i]), and outputs QP[j] [i]. The selector 207 receives QP'[j] [i] at input a, and QP[j] [i] at input b. In this case, since the authentication result of the security controller 210 is NG, the selector 207 selects QP'[j] [i] at input a. As a result, the dequantizer 202 dequantizes using the quantization matrix QP'[j] [i] which is different from that used in the quantizer 101 in the encoding apparatus in FIG. 1, and outputs DCT coefficients to the inverse DCT device 203. The inverse DCT device 203 receives these DCT coefficients, and outputs image data by computing inverse DCTs. In this case, the selector 204 selects input a, and outputs it to the frame memory 205. As a result, this decoding apparatus can play back an image distorted by scrambling.

A case will be explained below wherein the scramble ON/OFF flag is OFF, and the IP authentication result is OK.

QPC[j] [i] (=QP[j] [i]) is input to input a of the selector 207. In this case, since the authentication result is OK, the security controller 210 controls the selector 207 to select input a using the switching signal 221, and to output QP[j][i] to the dequantizer 202. The dequantizer 202 dequantizes using this QP[j][i], and outputs DCT coefficients to the inverse DCT device 203. The inverse DCT device 203 receives these DCT coefficients and outputs image data by computing inverse DCTs. The selector 204 selects input a in accordance with the switching signal 221 indicating the authentication result=OK, and outputs it to the frame memory 205. As a result, a normal image is played back.

A case will be explained below wherein the scramble ON/OFF flag is OFF, and the IP authentication result is NG.

QPC[j][i] (=QP[j][i]) is input to input a of the selector 207. In this case, since the authentication result is NG, the selector 207, dequantizer 202, and inverse DCT device 203 do not operate, and the security controller 210 controls the selector 204 to select a black image at input b using the switching signal 221 and to output it to the frame memory 205. As a result, a black image is played back.

Figure 6:
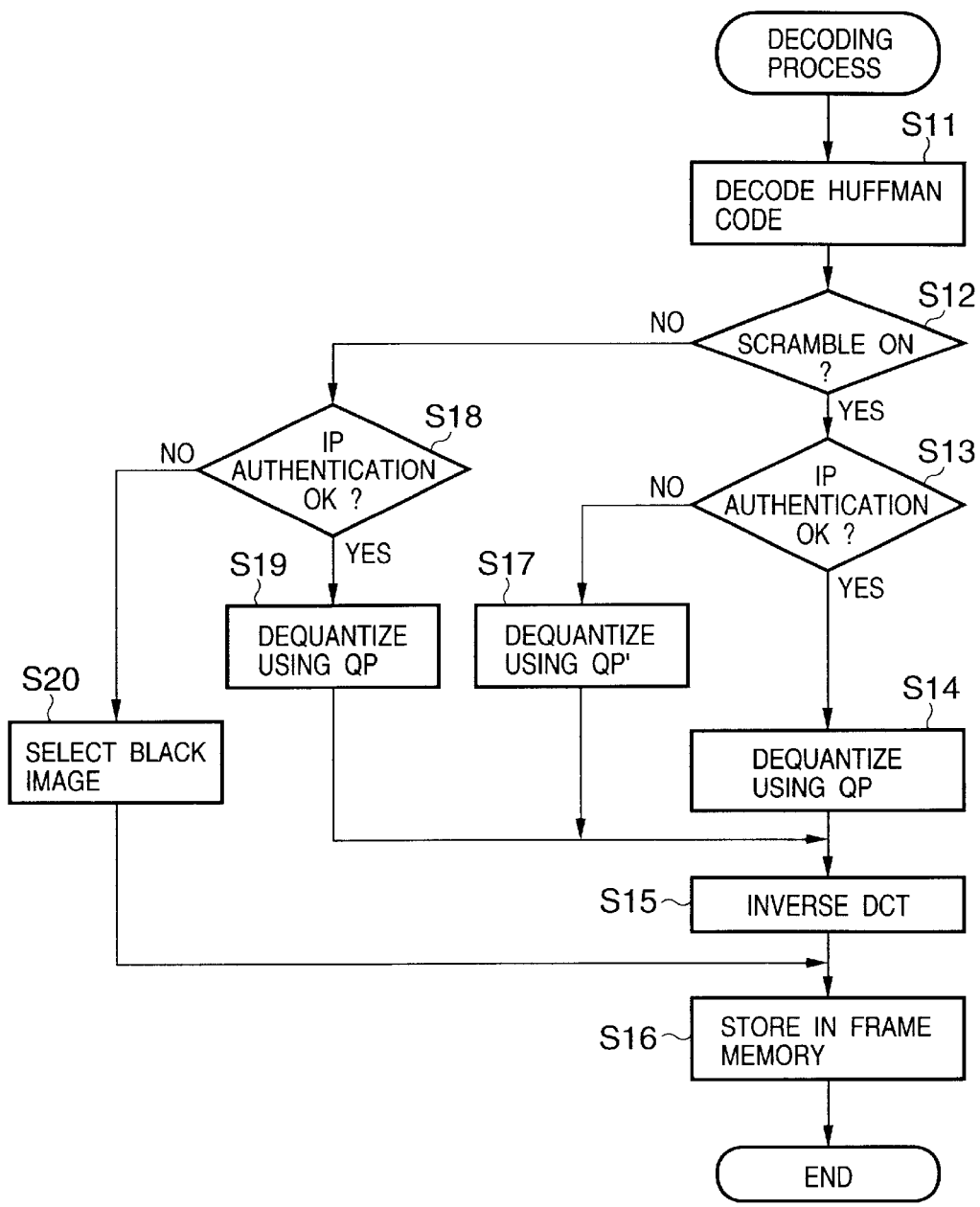
FIG. 6 is a flow chart showing a decoding process in the image decoding apparatus according to the first embodiment.

The flow of the decoding process in the decoding apparatus shown in FIG. 2 will be explained below with reference to the flow chart in FIG. 6.

In step S11, the variable-length decoder 201 decodes Huffman codes. It is then checked in step S12 if the encoded image signal has been encoded with scramble=ON. If YES in step S12, the flow advances to step S13 to check if the IP authentication result is OK. If YES in step S13, the flow advances to step S14, and the dequantizer 202 dequantizes using the quantization matrix QP obtained by converting the received quantization matrix QP' by the LUT 206. The dequantized DCT coefficients are converted into an original image signal by computing inverse DCTs (in this case, a normal image signal is played back) in step S15, and the image signal is stored in the frame memory 205 in step S16.

On the other hand, if the IP authentication result is not OK in step S13, the flow advances to step S17, and the dequantizer 202 dequantizes using the received quantization matrix QP'. The flow then advances to step S15. In this case, since dequantization is done using the quantization matrix QP' which is different from that used upon encoding, an image which is distorted by scrambling is played back.

If the scramble ON/OFF flag is OFF in step S12, the flow advance to step S18 to check if the IP authentication result is OK. If YES in step S18, the flow advances to step S19 to dequantize using the received quantization matrix QP. The flow advances to step S15 to decode a normal image signal by computing inverse DCTs, and the image signal is stored in the frame memory 205. On the other hand, if the IP authentication result is not OK in step S18, the flow advances to step S20, and the selector 207 selects a black image signal. The flow then advances to step S16, and the black image signal is stored in the frame memory 205.

FIG. 3 is a table for explaining the image decoding results in the image decoding apparatus according to the first embodiment, and shows the relationship among the authentication result of the IP authenticator 209 in the security controller 210, the inputs to be selected by the selectors 204 and 207, and playback images.

In this case, four different states are possible depending on the combinations of the scramble ON/OFF flag and IP authentication result, and three different playback image states (normal, distorted, and black image) can be consequently generated in accordance with the selection results of the selectors 204 and 207.

Modification of First Embodiment

The aforementioned LUTs 106 and 206 need only have one-to-one I/O correspondence, and may be implemented by preparing tables in place of the conversion formulas of the first embodiment.

In the first embodiment, JPEG has been exemplified. Also, the present invention can be applied to Motion JPEG as moving image or video coding.

The functions of the first embodiment may be implemented by software.

In the first embodiment, the IP is used as a password, but any other kinds of information may be used as long as they pertain to copyright protection. Also, the IP is fixed at 4 bytes, but may have other bit lengths. The decoding apparatus plays back a black image as an undecodable image, but other images may be played back.

The value to be scrambled in the quantization matrix QP[j][i] falls within the range of i=3 to 63, but other ranges may be used. By setting this range, the distortion amount of scrambling can be adjusted.

As described above, according to the first embodiment, since the limited quantization matrix QP[j][i] is scrambled in place of the entire bitstream, the processing load on the apparatus can be reduced.

QP[j][i] is control data for quantization, and when the scrambled bitstream is directly decoded, distortion is confined within blocks. In the first embodiment, an image which suffers so-called block distortion or mosquito distortion more than a normal image is played back, and the viewer who cannot descramble can only recognize an outline of an image.

Upon multiplexing the password as comment data, a conversion function of the LUT used for QP[j][i] mentioned above may be included. By setting such multi-level conversion functions, higher security can be assured.

Second Embodiment

Figure 7:
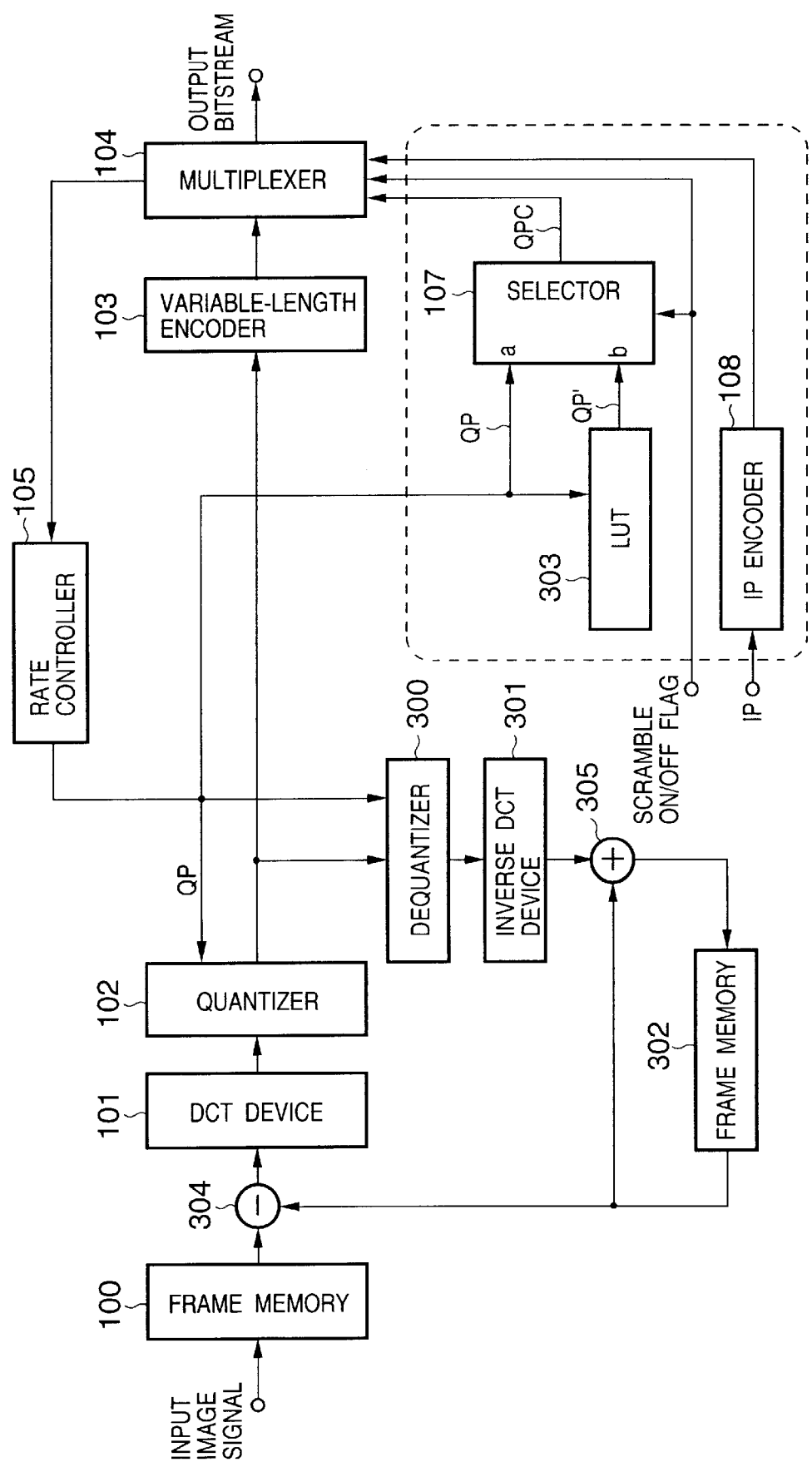
FIG. 7 is a block diagram showing the arrangement of an image encoding apparatus according to the second embodiment.
Figure 8:
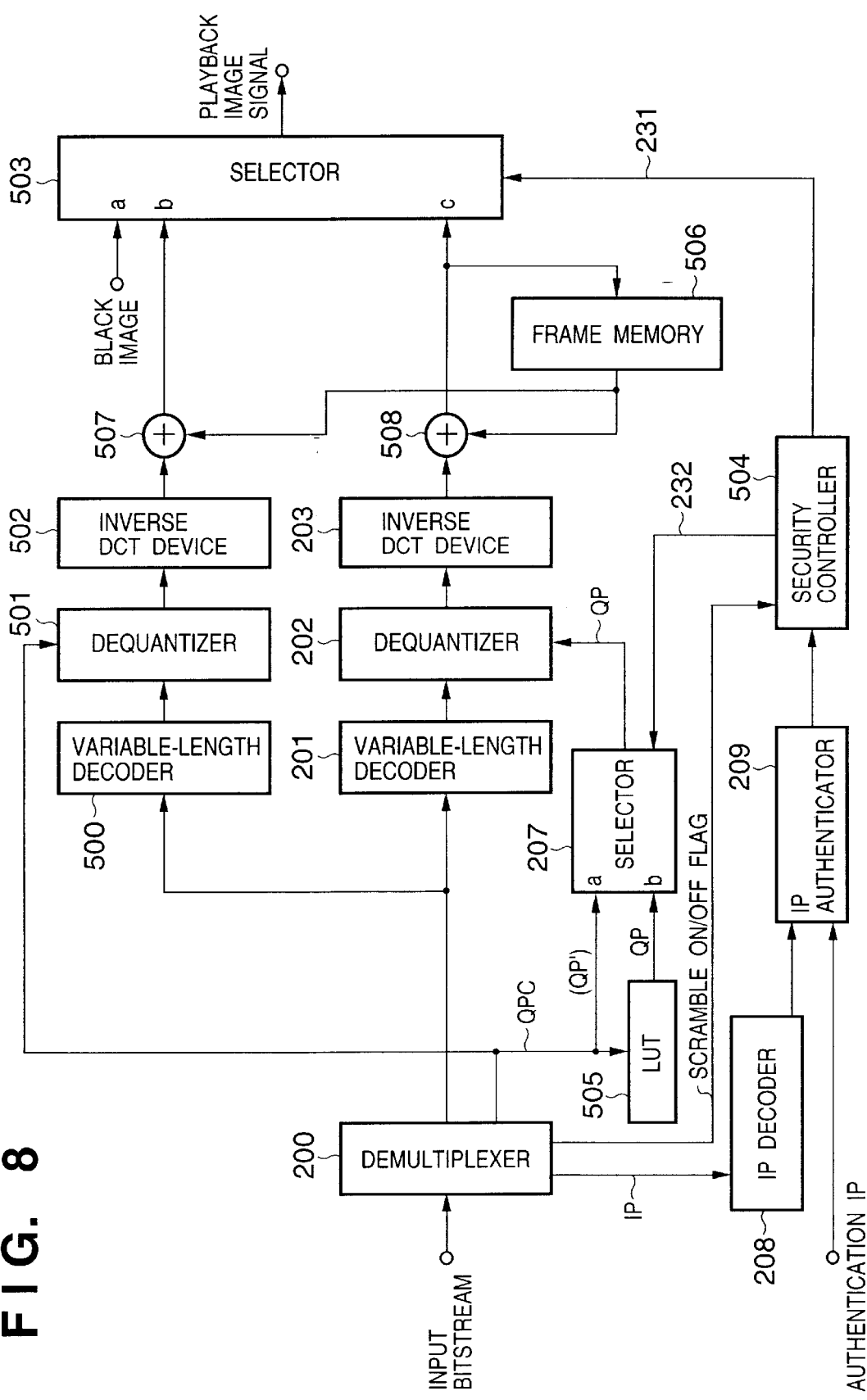
FIG. 8 is a block diagram showing the arrangement of an image decoding apparatus according to the second embodiment.

FIG. 7 is a block diagram showing a moving image encoding apparatus according to the second embodiment of the present invention, and FIG. 8 is a block diagram showing the arrangement of a corresponding moving image decoding apparatus. The second embodiment will exemplify a case wherein quantization parameters each having a fixed length=5 bits, which are present in units of VOPs (Video Object Planes) in MPEG-4, are scrambled. See ISO/IEC recommendations for details of MPEG-4.

Note that the same reference numerals in FIG. 7 denote the same building components as those in the first embodiment mentioned above, and a detailed description thereof will be omitted. In the second embodiment, the following building components are added to implement local decoding.

Referring to FIG. 7, reference numeral 300 denotes a dequantizer for dequantizing the output from the quantizer 102. Reference numeral 301 denotes an inverse DCT device for computing the inverse DCT of the output from the dequantizer 300. Reference numeral 302 denotes a frame memory for storing the locally decoded output from the inverse DCT device 301. The dequantizer 300, inverse DCT device 301, and frame memory 302 are used for inter-frame predictive coding. Reference numeral 303 denotes a look-up table (LUT) which converts a quantization matrix QP used in the quantizer 102 into scrambled QP'.

The LUT 303 converts the matrix by:

QP'=FFH XOR QP where XOR indicates an exclusive OR. Note that data to be scrambled is 5-bit data and, hence, both QP and QP' are 5-bit data.

In the second embodiment, the decoding apparatus shown in FIG. 8 uses the same conversion formula.

The operation in the image encoding apparatus with the above arrangement will be explained below.

Since the image encoding apparatus of the second embodiment is obtained by modifying the image encoding apparatus of the first embodiment to a moving image encoding apparatus according to MPEG-4, and the dequantizer 300, the inverse DCT device 301, the frame memory 302, and the contents of the LUT 106 are different from the first embodiment, only these components and their peripheral circuits will be explained below.

In the second embodiment, an input image signal is output as quantization representative values via the DCT device 101 and quantizer 102, the quantization representative values are encoded by the variable-length encoder 103, and the obtained codes are output to the multiplexer 104. The quantization representative values are converted into a local decoded image signal by the inverse DCT device 301 via the dequantizer 300, and that image signal is stored in the frame memory 302. The LUT 303 converts the quantization matrix QP from the rate controller 105 into QP'.

Figure 9:
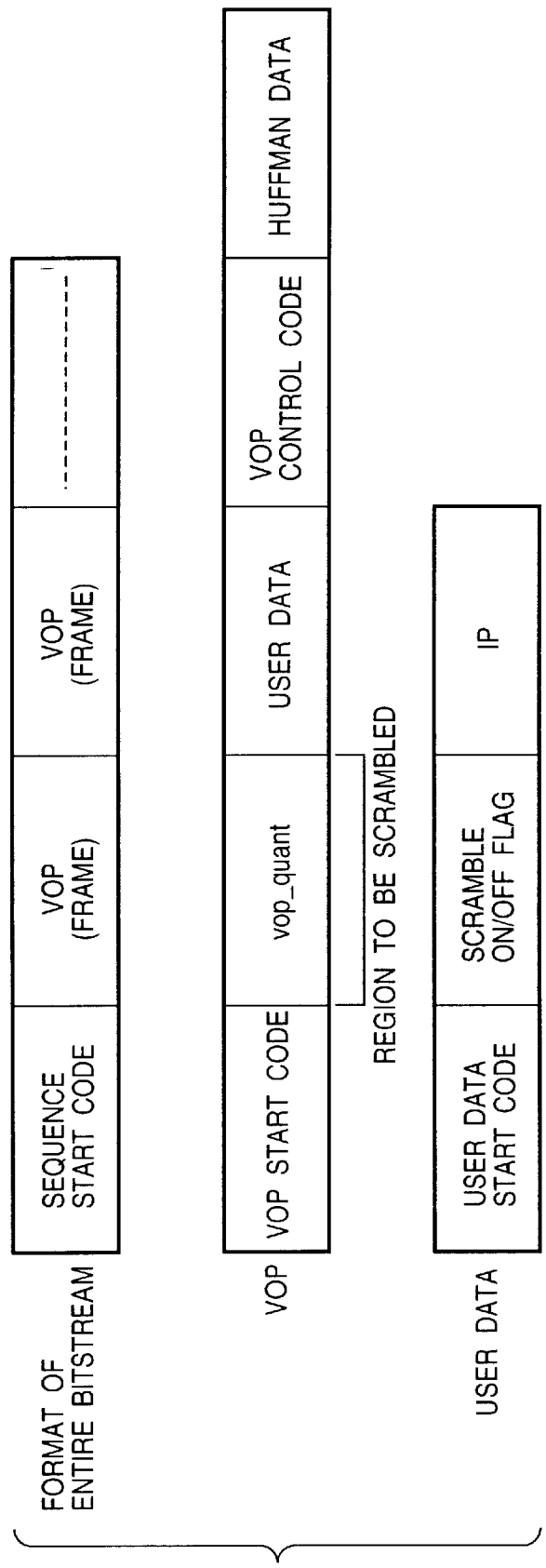
FIG. 9 is a view for explaining the format of a bitstream according to the second embodiment.

FIG. 9 is a view showing an outline of the format of the bitstream in the second embodiment.

In MPEG-4, since the code amount is controlled by a 5-bit quantization parameter vop_quant in a VOP layer, an object to be scrambled is vop_quant. User data formed by the output from the IP encoder 108 and scramble ON/OFF flag starts from a 32-bit user data start code, which is followed by a 1-bit scramble ON/OFF flag and 4-byte IP data. For example, when IP data contains text codes "ABCD" upon scramble=ON, a scramble ON/OFF flag=1 and IP=41H, 42H, 43H, and 44H (H indicates hexadecimal notation). Since vop_quant is present in each VOP, scramble control can be made in units of frames.

FIG. 8 is a block diagram showing the arrangement of the image decoding apparatus according to the second embodiment. The same reference numerals in FIG. 8 denote the same building components as in the first embodiment (FIG. 2) mentioned above, and a detailed description thereof will be omitted.

Reference numeral 500 denotes a variable-length decoder for decoding the output from the demultiplexer 200 by variable-length decoding. Reference numeral 501 denotes a dequantizer for dequantizing the output from the variable-length decoder 500 using encoded data QPC[j] [i] of the quantization matrix. Reference numeral 502 denotes an inverse DCT device for computing the inverse DCT of the output from the dequantizer 501. Reference numeral 503 denotes a selector for selecting one of the outputs from two sets of variable-length decoders, dequantizers, and inverse DCT devices, or a black image. A security controller 504 outputs switching signals 231 and 232 on the basis of the scramble ON/OFF flag from the demultiplexer 200 and the authentication result from the IP authenticator 209 so as to control the selectors 207 and 503.

In FIG. 8, the difference from the first embodiment described above is that two systems of variable-length decoders, dequantizers, and inverse DCT devices are prepared. The route of the variable-length decoder 500, dequantizer 501, and inverse DCT device 502 uses scrambled QP without descrambling it, while the route of the variable-length decoder 201, dequantizer 202, and the inverse DCT device 203 uses the descrambled QP.

The operation of the image decoding apparatus in FIG. 8 will be described below.

A case will be described below wherein the scramble ON/OFF flag is ON and the IP authentication result is OK.

In this case, the selector 107 in FIG. 7 selects and outputs the output (QP') from the LUT 303. An LUT 505 having inverse conversion characteristics converts QPC (=QP') and outputs QP. In this case, the selector 207 receives QP' at input a and QP at input b. Since the authentication result is OK, the security controller 504 controls the selector 207 to select QP at input b using the switching signal 232. As a result, the dequantizer 202 dequantizes using the quantization matrix QP which is the same as that used in the encoding apparatus, and outputs DCT coefficients. The inverse DCT device 203 receives these DCT coefficients and outputs image data. In this case, the selector 503 selects and outputs input c in accordance with the switching signal 231 from the security controller 504. As a result, a normal image is played back.

A case will be described below wherein the scramble ON/OFF flag is ON and the IP authentication result is NG.

In this case, the output from the encoding apparatus in FIG. 7 is the same as that described above. However, since the authentication result is NG, the security controller 504 controls the selector 207 to select QP' at input a using the switching signal 232. In this way, the dequantizer 202 dequantizes using the quantization matrix QP' which is different from that used upon encoding, and outputs DCT coefficients. The inverse DCT device 203 receives these DCT coefficients and outputs image data. In this case, the selector 503 selects and outputs input c in accordance with the switching signal 231 from the security controller 504. Hence, an image distorted by scrambling is played back.

A case will be described below wherein the scramble ON/OFF flag is OFF and the IP authentication result is OK.

Since the authentication result is OK, the security controller 504 controls the selector 207 to select input a (QP) using the switching signal 232, and output it to the dequantizer 202. The dequantizer 202 dequantizes using QP which is the same as the quantization matrix upon encoding, and outputs DCT coefficients. The DCT coefficients are transformed by the inverse DCT device 203, thus outputting a normal image signal. In this case, the selector 503 is set to select and output input b or c in accordance with the switching signal 231 from the security controller 504. As a result, a normal image is played back.

A case will be described below wherein the scramble ON/OFF flag is OFF and the IP authentication result is NG.

Since the authentication result is NG, the security controller 504 controls the selector 503 to select and output a black image at input a using the switching signal 231 from the security controller 504. As a result, a black image is played back.

FIG. 10 is a table for explaining the relationship among the security controller 504, the selection states of the selectors 207 and 503, and playback images in the image decoding apparatus according to the second embodiment.

Note that the flow charts of the encoding and decoding processes according to the second embodiment are substantially the same as those in the first embodiment mentioned above, and a description thereof will be omitted.

As described above, according to the second embodiment, the selectors 207 and 503 are controlled in accordance with the scramble ON/OFF flag and IP authentication result and, consequently, three different playback image states can be generated.

Modification of Second Embodiment

The aforementioned LUTs 303 and 505 need only have one-to-one I/O correspondence, and may be implemented by preparing tables in place of the conversion formulas of the second embodiment. The functions of the second embodiment may be implemented by software.

As described above, according to the second embodiment, since the limited QP is scrambled in place of the entire bitstream, the processing load on the apparatus can be reduced.

QP is control data for quantization, and when the scrambled bitstream is directly decoded, distortion is confined within blocks.

In the second embodiment, an image which suffers so-called block distortion or mosquito distortion more than a normal image is played back, and the viewer who cannot descramble can only recognize an outline of an image.

Upon multiplexing the password as user data, a conversion function of the LUT used for QP mentioned above may be included. By setting such multi-level conversion functions, higher security can be assured.

Since the frame memory 205 for storing a local decoded image is arranged for the variable-length decoder 500, dequantizer 501, and inverse DCT device 502 of the two systems of circuits, and can store a normally decoded image, distortion due to scrambling generated from the route of the variable-length decoder 201, dequantizer 202, and inverse DCT device 203 can be prevented from being accumulated in units of frames.

Third Embodiment

Figure 11:
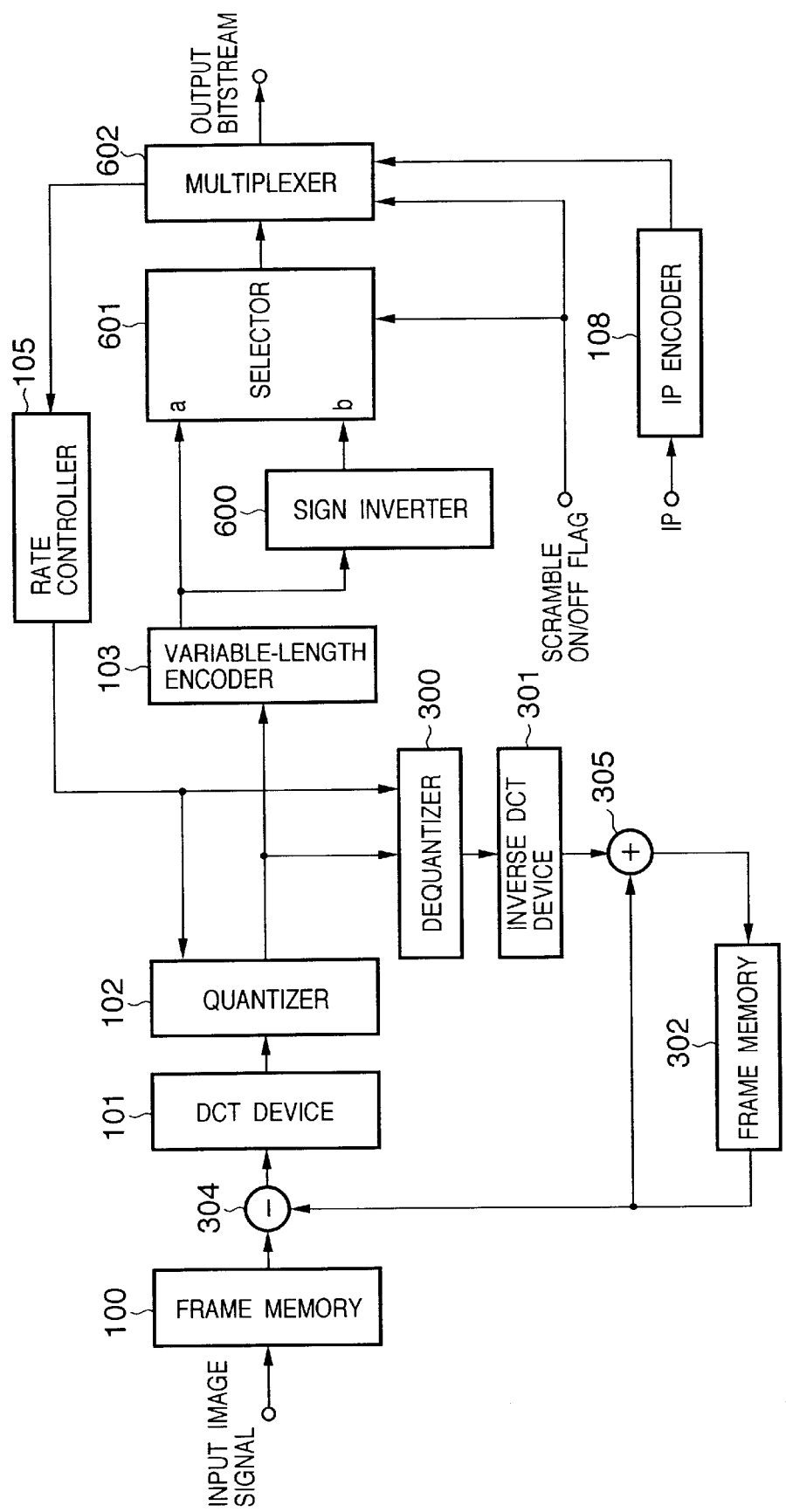
FIG. 11 is a block diagram showing the arrangement of an image encoding apparatus according to the third embodiment.
Figure 12:
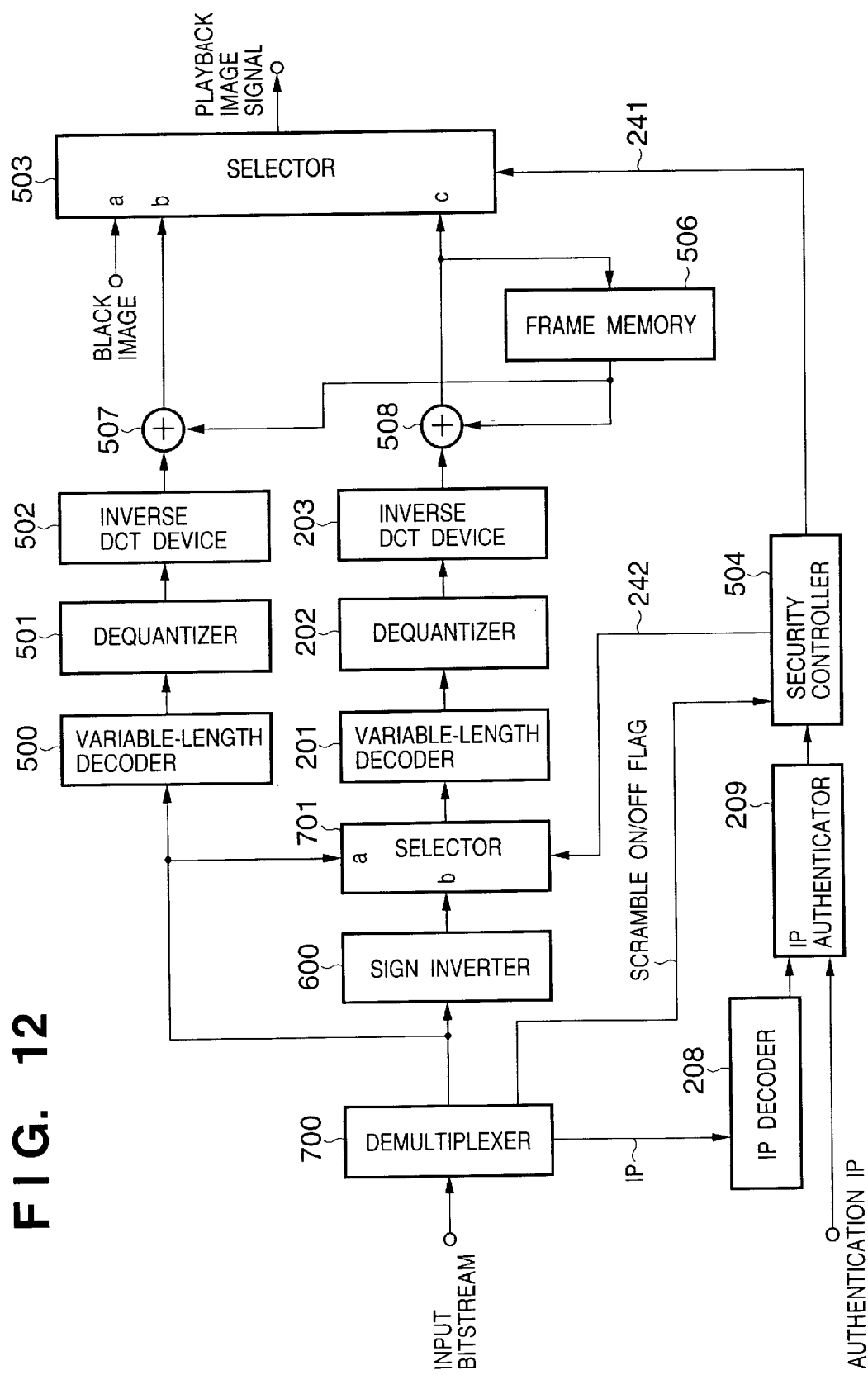
FIG. 12 is a block diagram showing the arrangement of an image decoding apparatus according to the third embodiment.

FIG. 11 is a block diagram showing the arrangement of a moving image encoding apparatus according to the third embodiment of the present invention, and FIG. 12 is a block diagram showing the arrangement of a corresponding moving image decoding apparatus. The third embodiment will exemplify a case wherein scrambling is implemented by inverting a sign bit of a Huffman code as encoded data of a DCT coefficient in MPEG-4.

The moving image encoding apparatus shown in FIG. 11 will be explained first. The same reference numerals in FIG. 11 denote the same building components as those in the first and second embodiments mentioned above, and a detailed description thereof will be omitted.

Reference numeral 600 denotes a sign inverter for receiving a Huffman code from the variable-length encoder 103, and inverting its sign. The sign bit of a Huffman code in MPEG-4 is 1 bit at the end of a bit sequence, and assumes "0" if it is positive; "1" if it is negative. Hence, the sign inverter 600 inverts this sign bit. If DCT[i] (i=0 to 63) represents a sequence of the contents of a DCT coefficient in a zigzag scan order, Huffman codes to be inverted are DCT coefficients with i=3 to 63.

Reference numeral 601 denotes a selector for selecting one of the output from the variable-length encoder 103 and the output from the sign inverter 600 in accordance with an externally input scramble ON/OFF flag, and outputting the selected output to a multiplexer 602. The multiplexer 602 multiplexes Huffman codes output from the selector 601, and user data including the externally input scramble ON/OFF flag and IP encoded data output from the IP encoder 108, and outputs multiplexed data as a bitstream.

The operation in the image encoding apparatus will be described below.

In the image encoding apparatus of the third embodiment shown in FIG. 11, since QP as the object to be scrambled in the moving image encoding apparatus of the second embodiment is replaced by the sign bit of a Huffman code, peripheral operations after variable-length encoding will be explained.

In the third embodiment, the sign inverter 600 generates a Huffman code, the sign bit of which is inverted from that of each Huffman code output from the variable-length encoder 103, simultaneously with the latter Huffman code. One of the output from the variable-length encoder 103 and the output from the sign inverter 600 is selected by the selector 601 in accordance with the scramble ON/OFF flag, and is input to the multiplexer 602.

The image decoding apparatus shown in FIG. 12 will be explained below.

FIG. 12 is a block diagram showing the arrangement of the moving image decoding apparatus according to the third embodiment of the present invention. This apparatus has two systems of variable-length decoders, dequantizers, and inverse DCT devices as in FIG. 8. The same reference numerals in FIG. 12 denote the same building components as those in the first and second embodiments mentioned above, and a detailed description thereof will be omitted.

Reference numeral 700 denotes a demultiplexer for demultiplexing the input bitstream into Huffman codes obtained by encoding DCT coefficients, and a scramble ON/OFF flag and IP encoded data which are multiplexed as user data. Reference numeral 701 denotes a selector for selecting one of the output from the demultiplexer 700 and the output from the sign inverter 600 in accordance with a switching signal 242 from a security controller 504 (to be described later). The demultiplexer 700 demultiplexes the input bitstream into Huffman codes, a scramble ON/OFF flag, and IP encoded data. The sign inverter 600 receives the Huffman codes and outputs sign-inverted Huffman codes. In the following description, normal Huffman codes will be referred to as normal codes, and sign-inverted Huffman codes will be referred to as inverted codes.

A case will be explained below wherein the scramble ON/OFF flag is ON and the IP authentication result is OK.

The selector 701 receives the inverted codes at input a and normal codes at input b. Since the authentication result is OK, the security controller 504 controls the selector 701 to select normal codes at input b using the switching signal 242. In this manner, normal Huffman codes are decoded by the variable-length decoder 201, and are dequantized by the dequantizer 202, thus outputting DCT coefficients. The inverse DCT device 203 receives the DCT coefficients, and outputs normal image data. In this case, since the selector 502 is instructed to select input c in accordance with a switching signal 241 from the security controller 504, the normal image signal is played back.

A case will be explained below wherein the scramble ON/OFF flag is ON and the IP authentication result is NG.

In this case, since scramble is ON, the selector 701 selects normal codes, the signs of which are restored, at input b in accordance with the switching signal from the security controller 504. The variable-length decoder 201, dequantizer 202, and inverse DCT device 203 receive inverted codes, and output normally decoded image data.

Since the authentication result is NG, the selector 701 is instructed to select inverted codes at input a by the switching signal 242. The variable-length decoder 201 decodes inverted Huffman codes, and the dequantizer 202 receives the data obtained by decoding the inverted codes, thus outputting DCT coefficients. The inverse DCT device 203 receives the DCT coefficients and outputs image data. In this case, the selector 503 is set to select and output input c by the switching signal 241 from the security controller 504. As a result, an image distorted by scrambling is played back.

A case will be explained below wherein the scramble ON/OFF flag is OFF and the IP authentication result is OK.

In this case, since the authentication result is OK, the security controller 504 controls the selector 701 to select input a using the switching signal 242, and the variable-length decoder 201 decodes normal codes. The dequantizer 202 dequantizes the decoded data to output DCT coefficients. The inverse DCT device 203 receives the DCT coefficients and outputs normal image data. In this case, the selector 503 is set to select and output input b or c by the switching signal 241 from the security controller 504. As a result, a normal image is played back.

A case will be explained below wherein the scramble ON/OFF flag is OFF and the IP authentication result is NG.

In this case, since the authentication result is NG, the security controller 504 controls the selector 503 to select a black image at input a using the switching signal 241. As a result, a black image is played back.

Figure 13:
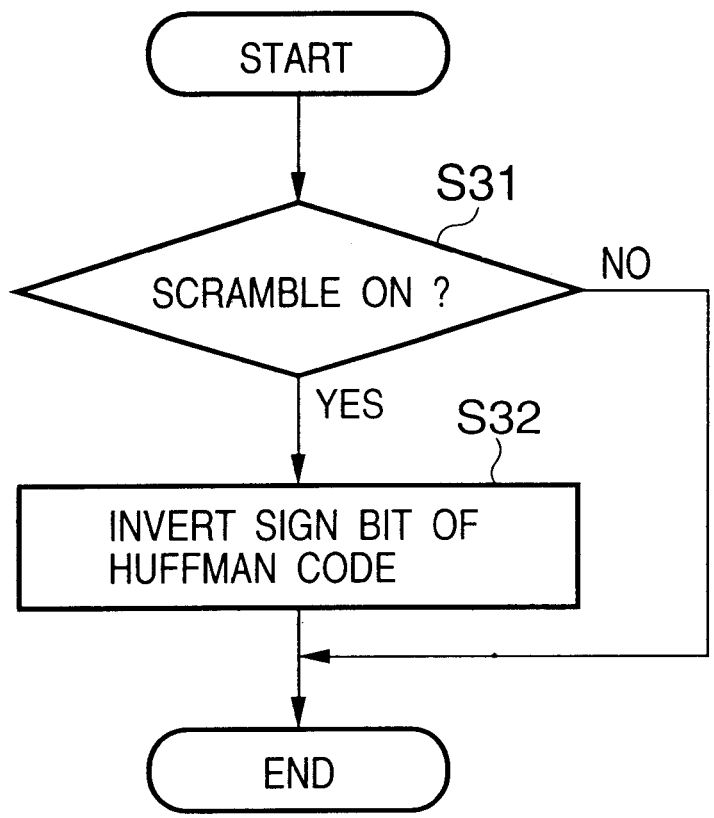
FIG. 13 is a flow chart showing an encoding process in the image encoding apparatus according to the third embodiment.

FIG. 13 is a flow chart for explaining the processing method of Huffman-encoded codes in the image encoding apparatus according to the third embodiment of the present invention, and corresponds to the process of the selector 601 in FIG. 11.

It is checked in step S31 if the scramble ON/OFF flag is ON. If YES in step S31, the flow advances to step S32 to invert the sign bit of each Huffman code and output the Huffman code.

Figure 14:
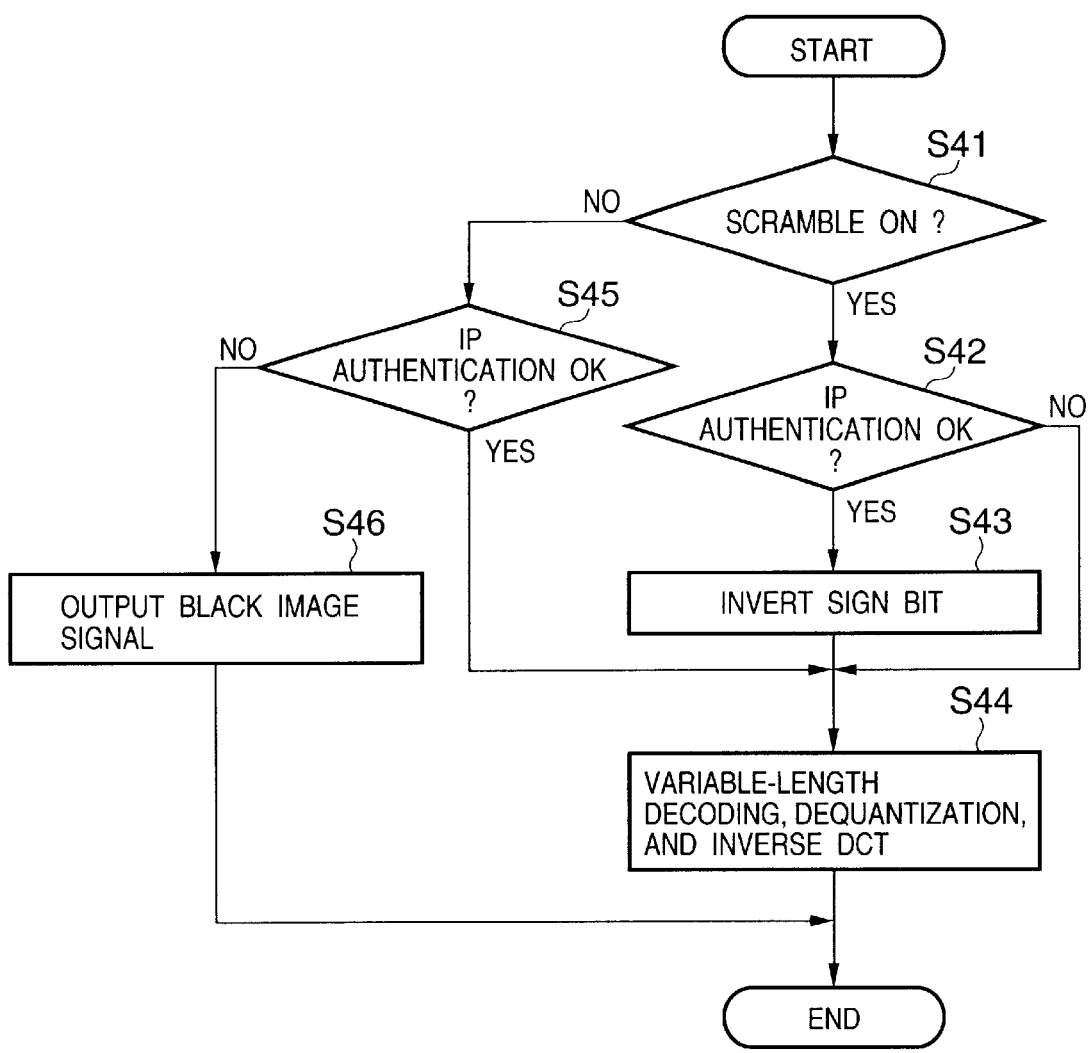
FIG. 14 is a flow chart showing a decoding process in the image decoding apparatus according to the third embodiment.

FIG. 14 is a flow chart showing the process in the image decoding apparatus according to the third embodiment.

It is checked in step S41 if the scramble ON/OFF flag contained in the input bitstream is ON. If YES in step S41, the flow advances to step S42 if the IP authentication result is OK. If YES in step S42, the flow advances to step S43, and the sign inverter 600 receives the sign-inverted codes. In step S44, these codes are decoded by the variable-length decoder 201, dequantizer 202, and inverse DCT device 203. As a result, a normal image is played back.

On the other hand, if the IP authentication result is not OK in step S42, the flow jumps to step S44 to execute a decoding process based on Huffman codes, the sign bits of which have been inverted, thus playing back an image which is distorted by scrambling.

If the scramble ON/OFF flag is OFF in step S41, the flow advances to step S45 to check if the IP authentication result is OK. If YES in step S45, the flow advances to step S44 to receive Huffman codes whose signs are not inverted and to decode the codes by the variable-length decoder 201, dequantizer 202, and inverse DCT device 203. As a result, a normal image is played back.

On the other hand, if the IP authentication result is not OK in step S45, the flow advances to step S46, and input a of the selector 503 is selected to play back a black image.

Modification of Third Embodiment

The respective functions of the third embodiment may be implemented by software.

The value to be scrambled in each Huffman code falls within the range of i=3 to 63, but other ranges may be used. By setting this range, the distortion amount of scrambling can be adjusted.

As described above, according to the third embodiment, since the sign bit of each Huffman code is scrambled in place of the entire bitstream, the processing load on the apparatus can be reduced.

Since the sign of a Huffman code is inverted in units of blocks, if the scrambled bitstream is directly decoded, distortion is confined within blocks.

In the third embodiment, an image which suffers so-called block distortion or mosquito distortion more than a normal image is played back, and the viewer who cannot descramble can only recognize an outline of an image.

Since the frame memory 205 for storing a local decoded image is arranged for the variable-length decoder 500, dequantizer 501, and inverse DCT device 502 of the two systems of circuits, and can store a normally decoded image, distortion due to scrambling generated from the route of the variable-length decoder 201, dequantizer 202, and inverse DCT device 203 can be prevented from being accumulated in units of frames.

To restate, according to the first to third embodiments, since limited control data as a part of a bitstream is scrambled, the processing load can be reduced compared to a case wherein the entire encoded data is to be scrambled. Since a decoded image is kept played back without being completely stopped, and distortion is confined within blocks, the viewer who cannot descramble recognizes only an outline of an image.

According to each of the above embodiments, since the stream contains IP encoded data and a flag for a frame which is to undergo copyright protection, the copyright of the contents provider for an arbitrary image part can be protected.

Furthermore, by combining the scramble ON/OFF flag and IP in the bitstream, a normal image and an image distorted by scrambling can be selectively played back.

Fourth Embodiment

Figure 15:
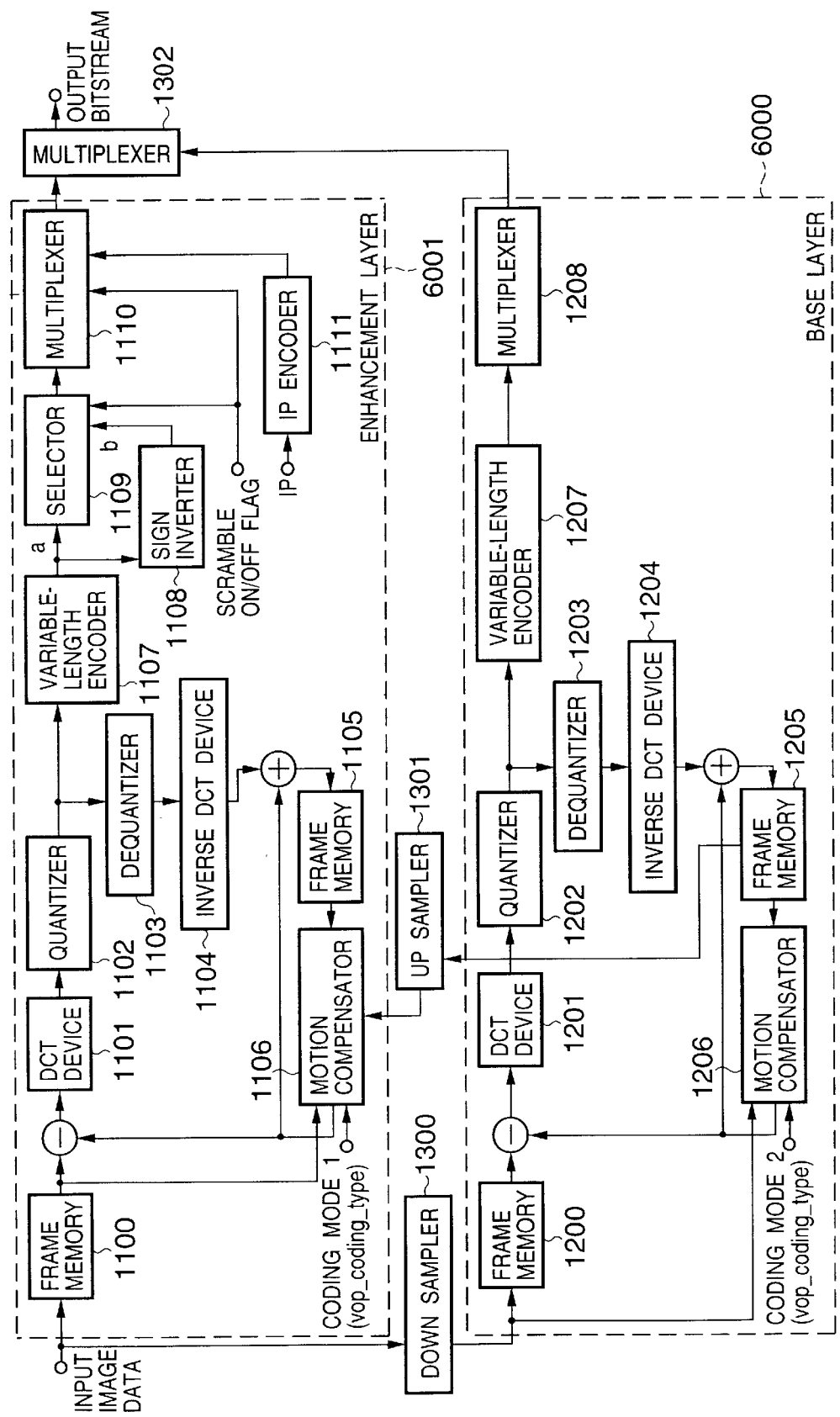
FIG. 15 is a block diagram showing the arrangement of principal part of an image encoding apparatus according to the fourth embodiment.
Figure 17:
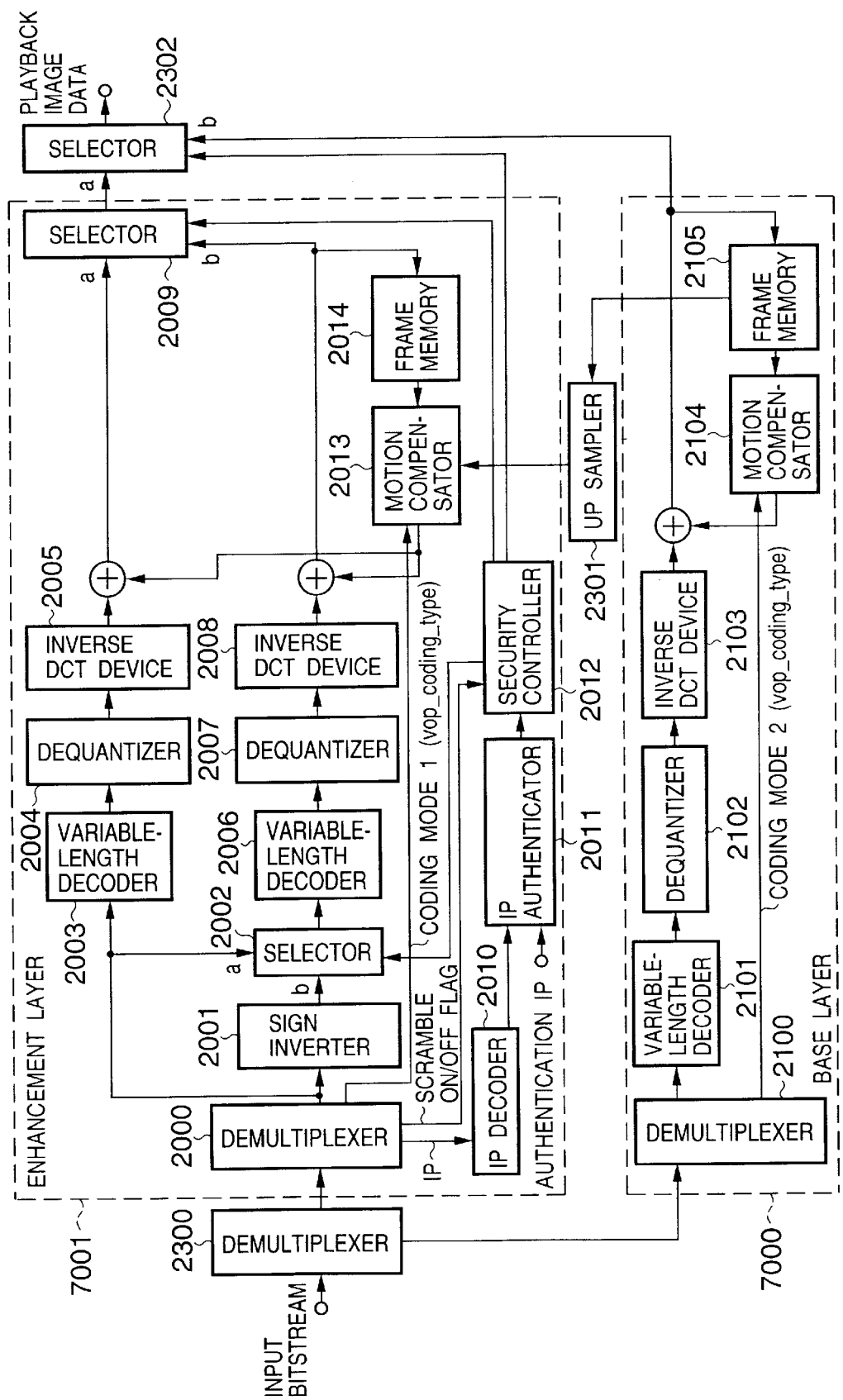
FIG. 17 is a block diagram showing the arrangement of principal part of an image decoding apparatus according to the fourth embodiment.

FIG. 15 is a block diagram showing the arrangement of a moving image encoding apparatus according to the fourth embodiment of the present invention, and FIG. 17 is a block diagram showing the arrangement of a moving image decoding apparatus for decoding codes encoded by the encoding apparatus. The fourth embodiment will exemplify a case wherein the apparatus has a spatial scalability function in MPEG-4, and an enhancement layer 6001 is scrambled by inverting the sign bit of each Huffman code obtained by encoding a DCT coefficient. See ISO/IEC recommendations for details of MPEG-4.

Referring to FIG. 15, reference numeral 1100 denotes a frame memory (FM) for storing input image data for one frame, and outputting macroblocks as encoding units. Note that luminance data is defined by four macroblocks as it is expressed by 16×16 pixels, and each of color difference data Cb and Cr is defined by one macroblock as it is expressed by 8×8 pixels. Reference numeral 1101 denotes a DCT device for transforming the input macroblocks in turn in units of blocks by computing two-dimensional discrete cosine transforms (DCTs) in units of 8×8 pixels (in units of blocks), and outputting DCT coefficients. Reference numeral 1102 denotes a quantizer for sequentially quantizing DCT coefficients in units of blocks and outputting their quantization representative values. Reference numeral 1103 denotes a dequantizer for dequantizing quantization representation values and outputting DCT coefficients. Reference numeral 1104 denotes an inverse DCT device for inversely transforming quantized DCT coefficients into original image data. Reference numeral 1105 denotes a frame memory for storing a local decoded image. Reference numeral 1106 denotes a motion compensator for receiving input image data from the frame memory 1100 and local decoded image data from the frame memory 1105 and an up sampler 1301 (to be described later), detecting motion vectors in units of macroblocks, and outputting a predicted image.

Reference numeral 1107 denotes a variable-length encoder for encoding quantization representative values by Huffman coding, and outputting Huffman codes. Reference numeral 1108 denotes a DCT sign inverter for inverting the sign of each Huffman code from the variable-length encoder 1107. The sign bit of a Huffman code in MPEG-4 is 1 bit at the end of a bit sequence, and assumes "0" if it is positive; "1" if it is negative. Hence, the DCT sign inverter 1108 inverts this sign bit as in the sign inverter 600 of the third embodiment mentioned above. If DCT[i] (i=0 to 63) represents a sequence of the contents of a DCT coefficient in a zigzag scan order, Huffman codes to be inverted in the fourth embodiment are DCT coefficients with i=3 to 63.

Reference numeral 1109 denotes a selector for selecting one of the output from the variable-length encoder 1107 and the output from the DCT sign inverter 1108 in accordance with an externally input scramble ON/OFF flag. Reference numeral 1110 denotes a multiplexer for multiplexing Huffman codes output from the selector 1109, user data containing the externally input scramble ON/OFF flag, and an IP encoded code output from an IP encoder 1111, and outputting multiplexed data as a bitstream. The IP encoder 1111 externally receives information for protecting a copyright IP (Intellectual Property) of image data, and outputs IP encoded codes. In the fourth embodiment, this IP is a password.

The arrangement between layers in FIG. 15 will be explained below.

Reference numeral 1300 denotes a down sampler for down-sampling an input image. In the fourth embodiment, the down sampling rate in the down sampler 1300 is "½". Reference numeral 1301 denotes an up sampler for up-sampling a local decoded image in a frame memory 1205 (to be described later). In the fourth embodiment, the up sampling rate in the up sampler 1301 is "2". Reference numeral 1302 denotes a multiplexer for multiplexing bitstreams of an enhancement layer 6001 and a base layer 6000 in spatial scalability.

The arrangement of the base layer 6000 in FIG. 15 will be described below.

In the base layer 6000, functional blocks having the same names are the same as those in the enhancement layer 6001 except that the input of this layer is the output from the down sampler 1300. Reference numeral 1200 denotes a frame memory for storing input image data for one frame, and outputting macroblocks as encoding units. Reference numeral 1201 denotes a DCT device for computing two-dimensional discrete cosine transforms (DCTs) in units of 8×8 pixels (in units of blocks). Reference numeral 1202 denotes a quantizer for quantizing in units of blocks and outputting quantization representative values. Reference numeral 1203 denotes a dequantizer for dequantizing quantization representation values and outputting DCT coefficients. Reference numeral 1204 denotes an inverse DCT device for transforming DCT coefficients into image data by computing their inverse DCTs. Reference numeral 1205 denotes a frame memory for storing a local decoded image. Reference numeral 1206 denotes a motion compensator for receiving an input image from the frame memory 1200 and a local decoded image from the frame memory 1205, detecting motion vectors in units of macroblocks, and outputting a predicted image. Reference numeral 1207 denotes a variable-length encoder for encoding quantization representative values by Huffman coding, and outputting Huffman codes. Reference numeral 1208 denotes a multiplexer for multiplexing Huffman codes from the variable-length encoder 1207 and outputting multiplexed data as a bitstream.

The operation of the enhancement layer 6001 shown in the upper half of FIG. 15 will be described first.

In the fourth embodiment, intra-frame coding will be referred to as an I-VOP (Video Object Plane) coding mode, inter-frame predictive coding that predicts from one predicted image as a P-VOP coding mode, and inter-frame predictive coding that predicts from two predicted images as a B-VOP coding mode.

The frame memory 1100 converts an input image into macroblocks as encoding units, and outputs the macroblocks. Predicted image data from the motion compensator 1106 is subtracted from image data output from the frame memory 1100 by a subtractor, and the difference data is input as prediction error image data to the DCT device 1101. The DCT device 1101 transforms input prediction errors of macroblocks into DCT coefficients in units of blocks. The quantizer 1102 outputs the DCT coefficients as desired quantization representative values in units of blocks. The quantization representative values are decoded as prediction error image data via the dequantizer 1103 and inverse DCT device 1104. The prediction error image data is added to predicted image data from the motion compensator 1106 by an adder, and the sum data is stored as local decoded image data in the frame memory 1105. Note that the motion compensator 1106 predicts in accordance with externally designated coding mode 1 in units of frames, and outputs predicted image data.

The variable-length encoder 1107 that receives quantization representative values encodes them by Huffman coding, and outputs Huffman codes. The selector 1109 directly receives these Huffman codes at one terminal (a), and also (scrambled) Huffman codes, the sign bits of which have been inverted by the DCT sign inverter 1108, at the other terminal (b). The selector 1109 selects terminal (a), i.e., the output from the variable-length encoder 1107 in accordance with the externally input scramble ON/OFF flag when the scramble ON/OFF flag is OFF; it selects terminal (b), i.e., the Huffman codes with inverted sign bits when the scramble ON/OFF flag is ON. The multiplexer 1110 multiplexes and outputs the output from the selector 1109, scramble ON/OFF flag, and IP encoded data output from the IP encoder 1111.

The operation of the base layer 6000 shown in the lower half in FIG. 15 will be explained below.

An image down-sampled by the down sampler 1300 is input to and stored in the frame memory 1200. The DCT device 1201, quantizer 1202, dequantizer 1203, inverse DCT device 1204, frame memory 1205, motion compensator 1206 that receives coding mode 2 in units of frames, and variable-length encoder 1207 operate in the same manner as in the corresponding blocks in the aforementioned enhancement layer 6001. The multiplexer 1208 multiplexes the output from the variable-length encoder 1207.

The operation between these base and enhancement layers 6000 and 6001 as well as that of the up sampler 1301 will be explained below.

Figure 16:
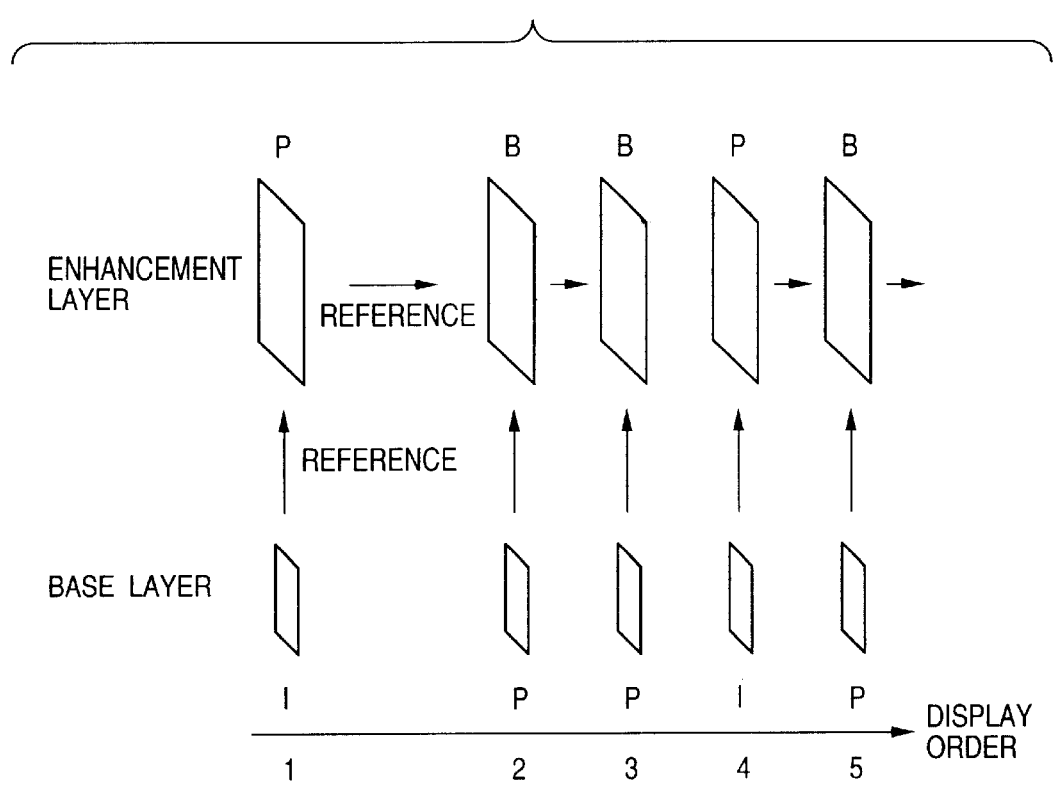
FIG. 16 is a view showing the relationship among VOPs in base and enhancement layers based on spatial scalability according to the fourth embodiment.

FIG. 16 is a view for explaining the relationship among VOPs in the base and enhancement layers based on spatial scalability according to the fourth embodiment.

The first frame of an input image is down-sampled by the down sampler 1300, the output from the down sampler 1300 is encoded by I-VOP (intra-frame) coding in the base layer, and a local decoded image is stored in the frame memory 1205.

In the enhancement layer 6001, the up sampler 1301 up-samples an image in the frame memory 1205, and the output from the up sampler 1301 is input as a reference image to the motion compensator 1106 and is encoded by P-VOP (inter-frame prediction that predicts from one predicted image) coding.

The second frame is encoded by P-VOP coding with reference to the local decoded image stored in the frame memory 1205 upon encoding the first frame in the base layer 6000. On the other hand, in the enhancement layer 6001, the local decoded image stored in the frame memory 1105 upon encoding the first frame and data obtained by up-sampling image data in the frame memory 1205 by the up sampler 1301 are input to the motion compensator 1106, and are encoded by B-VOP (inter-frame prediction that predicts from two predicted images) coding.

The third frame is processed in the same manner as in the second frame and, after that, operations for these three frames repeat themselves. Note that "I" in FIG. 16 indicates I-VOP (intra-frame) coding, "P" P-VOP coding, and "B" B-VOP coding.

FIG. 17 is a block diagram showing the arrangement of an image decoding apparatus according to the fourth embodiment. The arrangement of an enhancement layer 7001 in FIG. 17 will be described first.

Reference numeral 2000 denotes a demultiplexer for demultiplexing a bitstream input to the enhancement layer 7001 into Huffman codes, coding mode 1, a scramble ON/OFF flag, and IP encoded codes. Reference numeral 2010 denotes an IP decoder for decoding the IP encoded codes from the demultiplexer 2000 to obtain an IP. Reference numeral 2011 denotes an IP authenticator for authenticating by comparing the IP decoded by the IP decoder and an externally input authentication IP. Reference numeral 2012 denotes a security controller for controlling selectors 2002 and 2009 (to be described later) on the basis of the scramble ON/OFF flag from the demultiplexer 2000 and the authentication result from the IP authenticator 2011.

Reference numeral 2001 denotes a DCT sign inverter for inverting the signs of DCT coefficients of Huffman codes. The selector 2002 selects and outputs one of the output from the demultiplexer 2000 (input a) and the output from the DCT sign inverter 2001 (input b) in accordance with a select signal from the security controller 2012. Reference numerals 2003 and 2006 denote variable-length decoders for converting Huffman codes into quantization representative values. Reference numerals 2004 and 2007 denote dequantizers for dequantizing quantization representation values and outputting DCT coefficients. Reference numerals 2005 and 2008 denote inverse DCT devices for transforming DCT coefficients into an image. Reference numeral 2014 denotes a frame memory for storing a local decoded image. Reference numeral 2013 denotes a motion compensator for making motion compensation in units of macroblocks with reference to the output from the frame memory 2014 and the local decoded image from an up sampler 2301 (to be described later), and outputting a predicted image. The selector 2009 selects and outputs one of the output from the inverse DCT device 2005 (input a) and the output from the inverse DCT device 2008 (input b) in accordance with a select signal from the security controller 2012.

The arrangement between a base layer and the enhancement layer in FIG. 17 will be described below.

Reference numeral 2300 denotes a demultiplexer for distributing the input bitstream to the base and enhancement layers. Reference numeral 2301 denotes an up sampler for receiving and up-sampling a local decoded image from a frame memory 2105 (to be described later). A selector 2302 selects one of the input from the enhancement layer 7001 (input a) and the input from a base layer 7000 (input b) on the basis of a select signal from the security controller 2012.

The arrangement of the base layer 7000 in FIG. 17 will be described below.

Reference numeral 2100 denotes a demultiplexer for receiving and demultiplexing the bitstream of the base layer into Huffman codes and coding mode 2, and outputting the Huffman codes to a variable-length decoder 2101 and coding mode 2 to a motion compensator 2104. The variable-length decoder 2101 converts Huffman codes into quantization representative values. Reference numeral 2102 denotes a dequantizer for dequantizing quantization representation values and outputting DCT coefficients. Reference numeral 2103 denotes an inverse DCT device for transforming DCT coefficients into original image data. The frame memory 2105 stores local decoded image data. Reference numeral 2104 denotes a motion compensator for receiving local decoded image data from the frame memory 2105, making motion compensation in units of macroblocks, and outputting a predicted image.

The operation based on the aforementioned arrangement will be explained below.

An encoded input bitstream is distributed by the demultiplexer 2300 to the enhancement and base layers. In the base layer 7000, the demultiplexer 2100 demultiplexes the bitstream into Huffman codes and coding mode 2. The Huffman codes are decoded into image data via the variable-length decoder 2101, dequantizer 2102, and inverse DCT device 2103. In I-VOP (intra-frame) coding, local decoded image data is directly stored in the frame memory 2105, and is supplied to input b of the selector 2302. In P-VOP (inter-frame prediction) coding, predicted image data output from the motion compensator 2104 is added to the output from the inverse DCT device 2103, and the sum data is stored in the frame memory 2105 and is supplied to input b of the selector 2302.

On the other hand, in the enhancement layer 7001, the demultiplexer 2000 demultiplexes the bitstream into Huffman codes, a scramble ON/OFF flag, IP, and coding mode 1. The DCT sign inverter 2001 outputs sign-inverted Huffman codes.

In the following description, normal Huffman codes will be referred to as normal codes, and sign-inverted Huffman codes as inverted codes. If DCT[i] (i=0 to 63) represents a sequence of the contents of a DCT coefficient in a zigzag scan order, Huffman codes to be inverted in the fourth embodiment are DCT coefficients with i=3 to 63.

The relationship among VOPs in the base and enhancement layers based on spatial scalability in the fourth embodiment is the same as that in the encoding apparatus shown in FIG. 15.

(A) A case will be explained first wherein the scramble ON/OFF flag is ON and the IP authentication result is OK.

The selector 2002 receives sign-inverted Huffman codes at input a, and normal codes whose signs have been restored by the sign inverter 2001 at input b. Since the authentication result is OK, the security controller 2012 controls the selector 2002 to select normal codes at input b. The variable-length decoder 2006, dequantizer 2007, and inverse DCT device 2008 receive the normal codes and outputs normal prediction error image data as a result of their processes.

The motion compensator 2013 outputs a predicted image based on the output from the frame memory 2014 and the output from the up sampler 2301 in accordance with coding mode 1 . In case of P-VOP coding, a prediction error image from the inverse DCT device 2008 and predicted image data from the motion compensator 2013 are added to each other, and normal image data is supplied to input b of the selector 2009. At the same time, the normal image data is stored in the frame memory 2014. The selector 2009 selects and outputs input b in accordance with a select signal from the security controller 2012, and the selector 2302 selects input a as the output from the enhancement layer 7001. As a result, the image decoding apparatus according to the fourth embodiment can play back an image with a high spatial resolution.

(B) A case will be described below wherein the scramble ON/OFF flag is ON and the IP authentication result is NG.

In this case, since the scramble ON/OFF flag is ON, the selector 2002 selects normal codes b where the sign is restored by the sign inverter 2001. The variable-length decoder 2003, dequantizer 2004, and inverse DCT device 2005 receive the sign-inverted Huffman codes, and output a decoded image thereof.

Since coding mode 1 is set, the motion compensator 2013 outputs a predicted image based on outputs of the frame memory 2014 and the up sampler 2301. Predicted image data from the motion compensator 2013 is added to the predicted image from the inverse DCT device 2005, and the result is input to a of the selector 2009. The selector 2009 selects and outputs input a in accordance with control data from the security controller 2012. The selector 2302 selects input a as the output from the enhancement layer 7001 in accordance with control data from the security controller 2012. As a result, the decoding apparatus according to the fourth embodiment plays back an image which is distorted by scrambling.

(C) A case will be described below wherein the scramble ON/OFF flag is OFF and the IP authentication result is OK.

Since the authentication result is OK, the security controller 2012 controls the selector 2002 to select input a and to output normal codes. The variable-length decoder 2006, dequantizer 2007, and inverse DCT device 2008 receive the normal codes and output a normal image. At this time, since the input bitstream is not scrambled, the selector 2009 receives identical normal image data at both inputs a and b. The selector 2009 selects and outputs input a or b. The selector 2302 selects input a as the output from the enhancement layer 7001. As a result, an image with a high spatial resolution can be played back.

(D) A case will be described below wherein the scramble ON/OFF flag is OFF and the IP authentication result is NG.

Since the authentication result is NG, the security controller 2012 controls the selector 2302 to select and output input b as the base layer 7000. As a result, the image decoding apparatus according to the fourth embodiment plays back an image with a low spatial resolution since it decodes and plays back only an image encoded by intra-frame coding and an image encoded by P-VOP (inter-frame prediction) coding in the base layer.

FIG. 18 shows the relationship among the selection states of the selectors 2302, 2009, and 2002 by the security controller 2012, and playback images according to the fourth embodiment.

In this embodiment, the three selectors 2002, 2009, and 2302 are controlled on the basis of the scramble ON/OFF flag and IP authentication result, and three different playback image states (high resolution, low resolution, and distorted) can be consequently generated.

Multi-layered Spatial Scalability Arrangement

Figure 19:
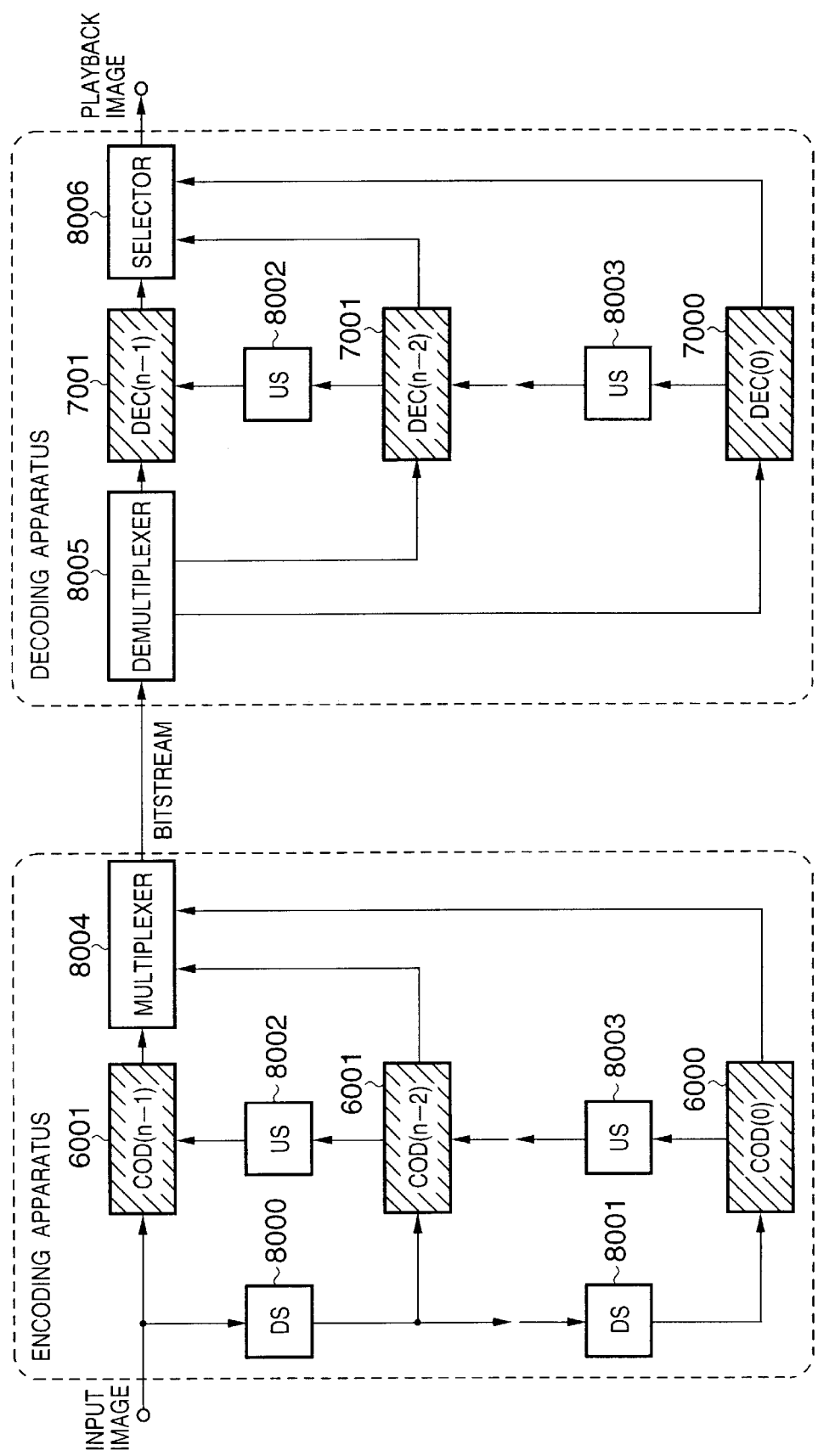
FIG. 19 is a diagram showing the arrangement for multi-layered spatial scalability according to the fourth embodiment.

FIG. 19 shows the arrangement of multi-layered encoding and decoding apparatuses with the spatial scalability function shown in FIGS. 15 and 17. Note that the number of layers is arbitrary, and is indicated by "n" in FIG. 19.

Referring to FIG. 19, a block 6000 corresponds to the base layer in FIG. 15, and blocks 6001 correspond to the enhancement layer in FIG. 15. Also, a block 7000 corresponds to the base layer in FIG. 17, and blocks 7001 correspond to the enhancement layer in FIG. 17. Reference numerals 8000 and 8001 denote down samplers. Reference numerals 8002 and 8003 denote up samplers. In these up samplers, the sampling rates corresponding to the number of layers can be set. Note that the layers and the sampling rate must correspond to each other. For example, the down sampling rate is set at "½", and the up sampling rate is set at "2". Reference numeral 8004 denotes a multiplexer for multiplexing bitstreams from multi-layers into one bitstream. Reference numeral 8005 denotes a demultiplexer for demultiplexing one bitstream in units of layers. Reference numeral 8006 denotes a selector for selecting a playback layer in accordance with the authentication results of the respective enhancement layers.

Multi-layered Spatial Scalability Operation

In the encoding apparatus shown in FIG. 19, copyright information and a scramble ON/OFF flag are designated for each enhancement layer. The decoding apparatus decodes and plays back an image with a resolution in accordance with the scramble ON/OFF flag and copyright authentication result. When a given enhancement layer is scrambled, its upper layers must be scrambled.

Note that the functions of the fourth embodiment may be implemented by software.

Figure 20:
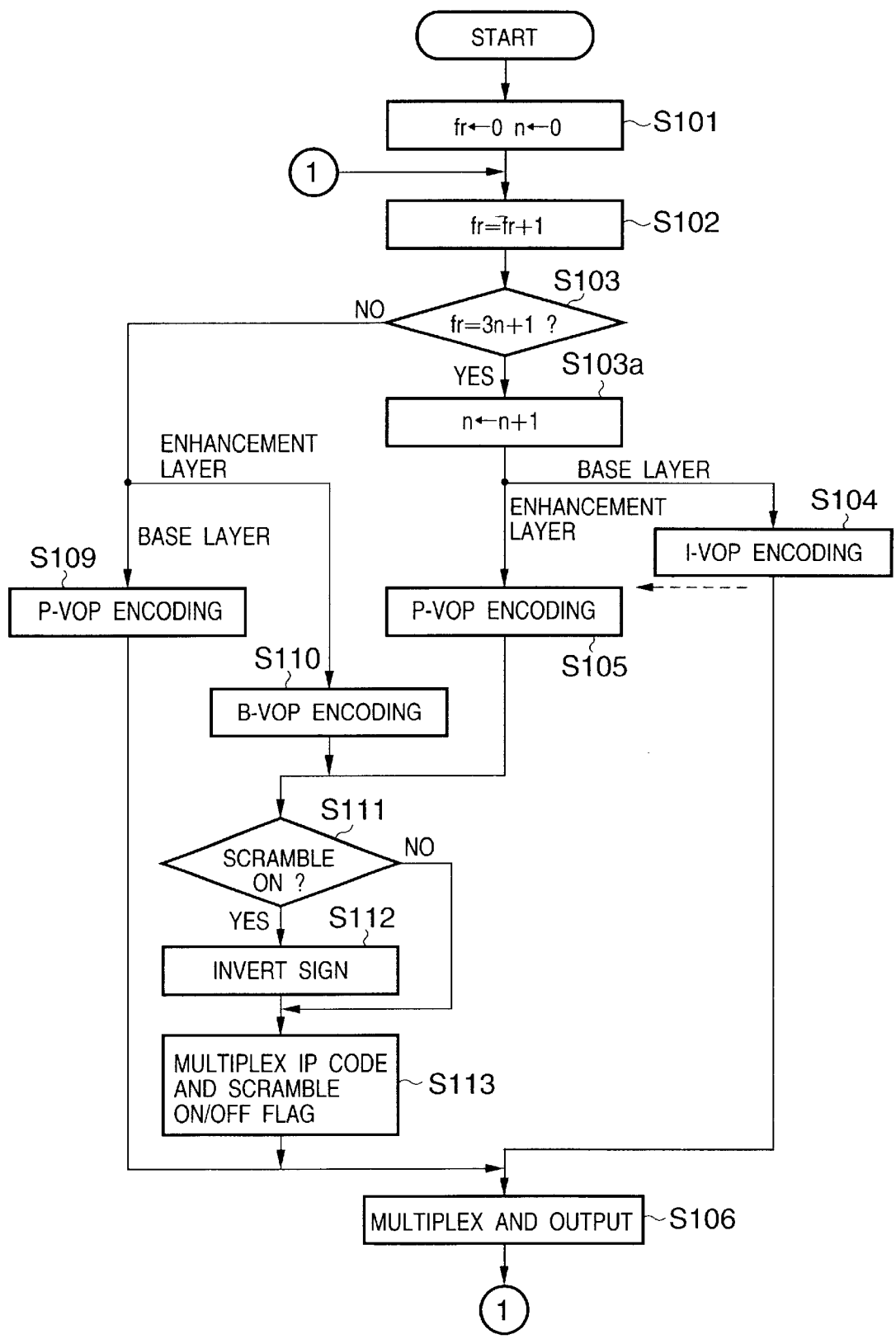
FIG. 20 is a flow chart for explaining an image encoding process according to the fourth embodiment.
Figure 21:
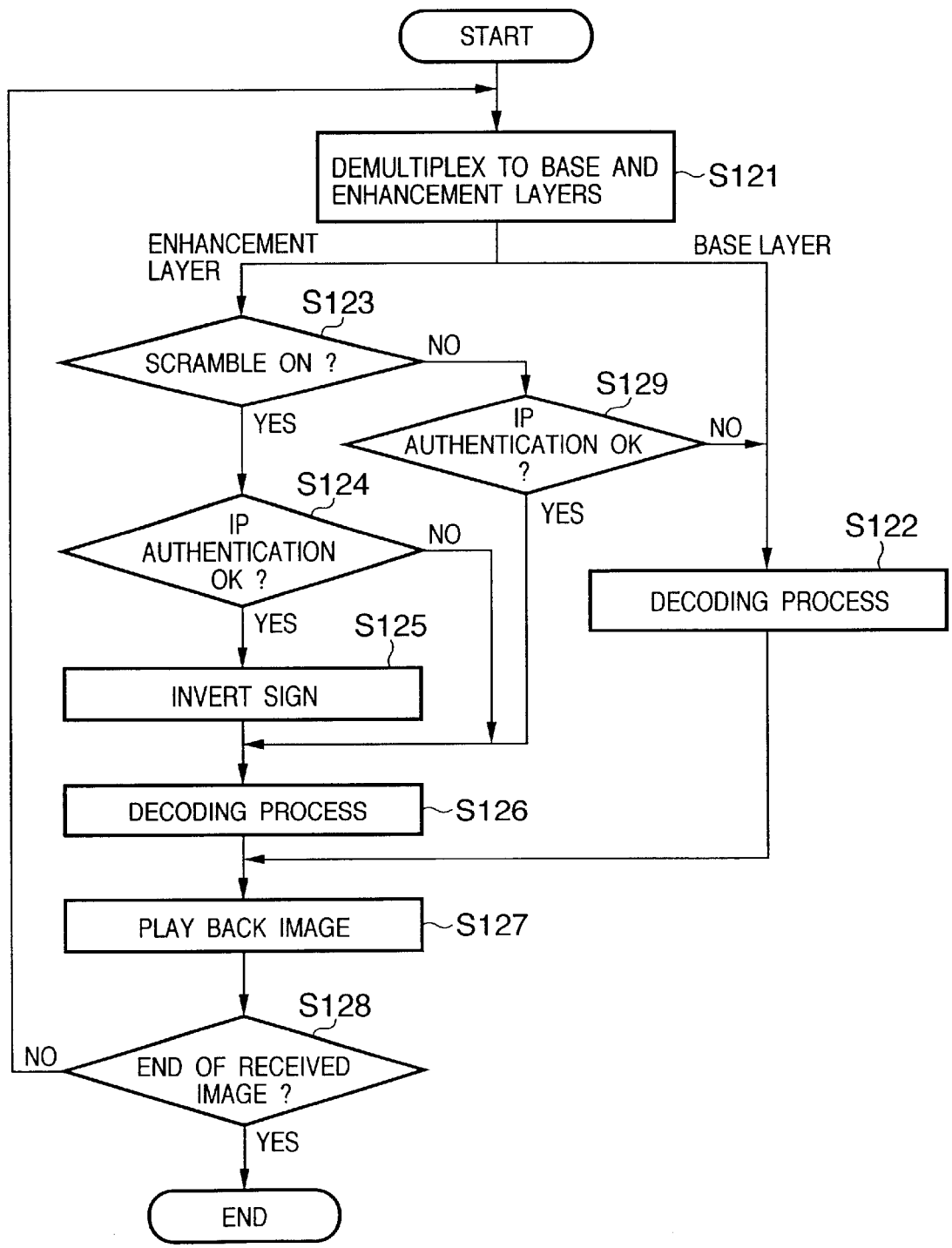
FIG. 21 is a flow chart showing an image decoding process according to the fourth embodiment.

FIG. 20 is a flow chart showing an image encoding process according to the fourth embodiment, and FIG. 21 is a flow chart showing a decoding process of the encoded image.

The encoding process shown in FIG. 20 will be explained first. This process starts upon receiving image data for one frame. In step S101, the values of counter fr for counting the number of frames, and counter n are reset to "0". Note that these counters may be omitted if signals of coding modes 1 and 2 in FIG. 15 are available. The flow advances to step S102 to increment frame counter fr by "+1". It is checked in step S103 if the value of frame counter fr is "3n+1", i.e., if the frame number in FIG. 16 changes like "1", "4", "7", . . . , "3n+1". If YES in step S103 and the output from the base layer is to be processed, the flow advances to step S104 after n is incremented by "+1" in step S103a; if the output from the enhancement layer is to be processed, the flow advances to step S105 after n is incremented by "+1" in step S103a. In step S104, intra-frame coding (I-VOP) is executed. In step S105, inter-frame predictive coding (P-VOP) for predicting from one predicted image based on codes encoded in step S104 is executed, and the flow advances to step S111 (to be described later). On the other hand, image data of the frame encoded in step S104 is multiplexed and output as an output bitstream in step S106. The flow then returns to step S102.

On the other hand, if the value of frame counter fr is not "3n+1" and the output from the base layer is to be processed, i.e., if the frame of interest is to undergo inter-frame predictive coding in the base layer, the flow advances to step S109. In step S109, inter-frame predictive coding (P-VOP) for predicting from one predicted image is executed, and the flow then advances to step S106. On the other hand, if the frame of interest is to undergo inter-frame predictive coding in the enhancement layer, inter-frame predictive coding (B-VOP) for predicting from two predicted images is executed in step S110. It is checked in step S111 if the scramble ON/OFF flag is ON. If YES in step S111, the flow advances to step S112 to invert the sign bit of each Huffman code. Note that Huffman codes to be inverted of a DCT coefficient sequence (i=0 to 63) are DCT coefficients with i=3 to 63. After step S112 is executed, or if the scramble ON/OFF flag is OFF in step S111, the flow advances to step S113 to multiplex IP codes obtained by encoding the IP, the scramble ON/OFF flag, the coding mode (I-VOP, P-VOP, B-VOP), and codes encoded by inter-frame predictive coding. The multiplexed data is multiplexed with the codes encoded in the base layer in step S106, and the multiplexed data is output. The flow then returns to step S102.

FIG. 21 is a flow chart showing an image decoding process according to the fourth embodiment.

This process starts upon receiving a code stream encoded by the encoding apparatus shown in FIG. 15. In step S121, the input bitstream is distributed to the base and enhancement layers. Codes input to the base layer undergo a decoding process of predictive codes by means of variable-length decoding, dequantization, inverse DCT, and motion compensation in step S122.

On the other hand, in case of the enhancement layer, it is checked in step S123 if the scramble ON/OFF flag is ON. If YES in step S123, the flow advances to step S124 to check if an IP authentication result is OK. If YES in step S124, since the user is authentic in terms of copyrights and the like, the flow advances to step S125 to invert the signs of Huffman codes to descramble them. The flow advances to step S126 to execute P-VOP and B-VOP decoding processes using the variable-length decoder, dequantizer, inverse DCT device, and motion compensator. The flow advances to step S127 to output and display image data that has been decoded and played back. In this case, a high-resolution image can be displayed.

If the IP authentication result is not OK in step S124, the flow jumps to step S126 while skipping the sign inversion process (step S125) to decode a scrambled image, and that image is played back in step S127. In this case, an image which is distorted by scrambling is played back.

If the scramble ON/OFF flag is OFF in step S123, the flow advances to step S129 to check if the IP authentication result is OK. If YES in step S129, the flow advances to step S126 to decode and play back a non-scrambled image.

If the IP authentication result is not OK in step S129, the flow advances to step S122 to execute an I-VOP or P-VOP decoding process, and an image is played back (at a low resolution) in step S127. The aforementioned process is repeated until all decoding processes of the received image are completed in step S128.

In the fourth embodiment, DCT coefficients of Huffman codes within the range of i=3 to 63 are scrambled. However, other ranges may be set. By setting such range, distortion of scrambling can be adjusted.

In the fourth embodiment, color signal format 420 has been exemplified, but other color signal formats may be used. Furthermore, the format of frame modes is not limited to that shown in FIG. 16.

In the fourth embodiment, the down sampling rate is set at "½", and the up sampling rate is set at "2". However, any other values may be used as long as these rates correspond to frames.

As described above, in the image encoding and decoding apparatuses with the spatial scalability function according to the fourth embodiment, since the enhancement layer is scrambled, the decoding apparatus can generate a distorted image as needed to protect the copyrights of a moving image.

Also, since the sign bit of each Huffman code is scrambled in place of the entire bitstream, the processing load on the apparatus can be reduced.

Since the sign of a Huffman code is inverted in units of blocks, if the scrambled bitstream is directly decoded, distortion is confined within blocks. In the fourth embodiment, an image which suffers so-called block distortion or mosquito distortion more than a normal image is played back, and the viewer who cannot descramble can only recognize an outline of an image.

The moving image decoding apparatus comprises two systems of variable-length decoders, dequantizers, and inverse DCT devices for the frame memory 2014 for storing a local decoded image, and the frame memory 2014 stores a normally decoded image output from the route of the variable-length decoder 2006, dequantizer 2007, and inverse DCT device 2008. For this reason, distortion by scrambling generated from the other route of the variable-length decoder 2003, dequantizer 2004, and inverse DCT device 2005 can be prevented from being accumulated in units of frames.

The present invention can applied to three or more layers.

Fifth Embodiment

Figure 22:
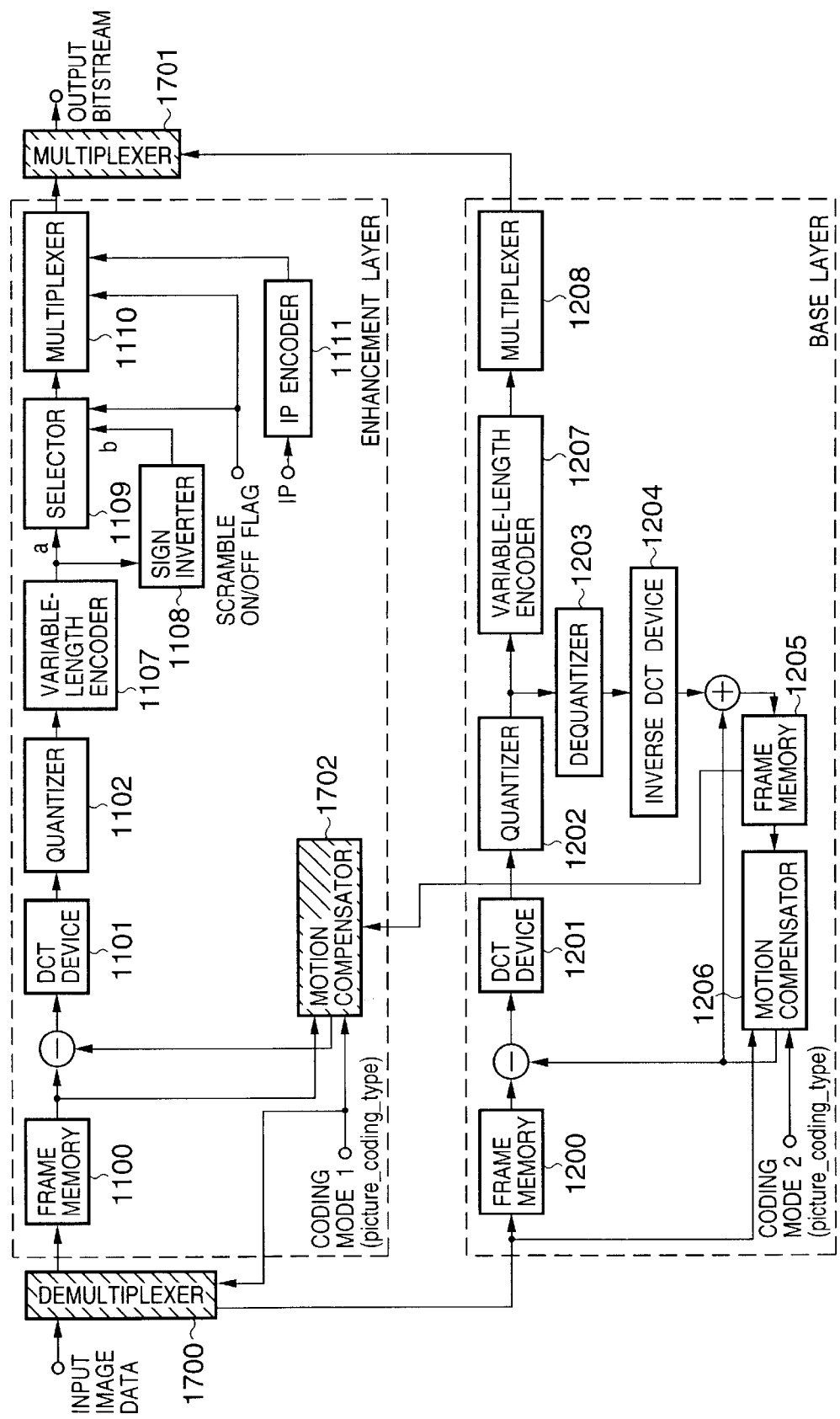
FIG. 22 is a block diagram showing the arrangement of principal part of an image encoding apparatus according to the fifth embodiment.
Figure 25:
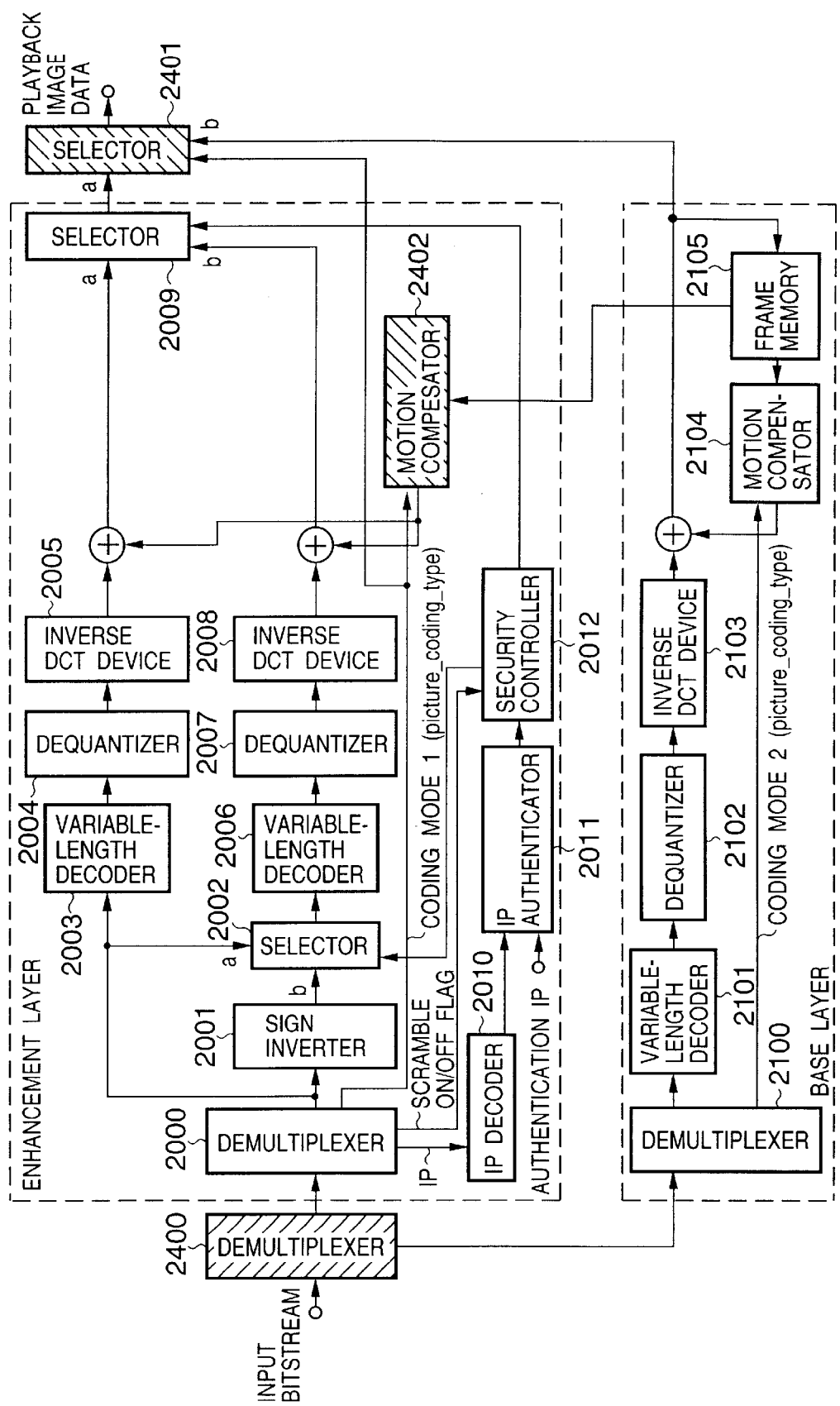
FIG. 25 is a block diagram showing the arrangement of principal part of an image decoding apparatus according to the fifth embodiment.

FIG. 22 is a block diagram showing the arrangement of a moving image encoding apparatus according to the fifth embodiment, and FIG. 25 is a block diagram showing the arrangement of a corresponding moving image decoding apparatus. The fifth embodiment will exemplify a case wherein the apparatus has a temporal scalability function in MPEG-2, and its enhancement layer is scrambled by inverting the sign bit of each Huffman code obtained by encoding a DCT coefficient. See ISO/IEC recommendations for details of MPEG-2.

FIG. 22 is a block diagram showing the arrangement of a moving image encoding apparatus according to the fifth embodiment. Note that the same reference numerals in FIG. 22 denote the same building components as those in the fourth embodiment mentioned above, and a detailed description thereof will be omitted. Hence, in the fifth embodiment, the differences from the aforementioned fourth embodiment will be explained in detail.

Reference numeral 1700 denotes a demultiplexer which assigns an input image to enhancement and base layers in units of frames, and makes ordering (to rearrange frames) at the same time. Reference numeral 1702 denotes a motion compensator for receiving an input image from the frame memory 1100 and local decoded image data from the frame memory 1205 of the base layer, detecting motion vectors in units of macroblocks, and outputting a predicted image. Reference numeral 1701 denotes a multiplexer for multiplexing bitstreams of the enhancement and base layers in temporal scalability.

The operation based on the aforementioned arrangement will be explained below.

In the fifth embodiment, intra-frame coding will be referred as an I-Picture coding mode, inter-frame predictive coding that predicts from one predicted image as a P-Picture coding mode, and inter-frame predictive coding that predicts from two predicted images as a B-Picture coding mode.

An input image is distributed by the demultiplexer 1700 to the base and enhancement layers according to externally input coding mode 1 in units of frames.

Figure 23:
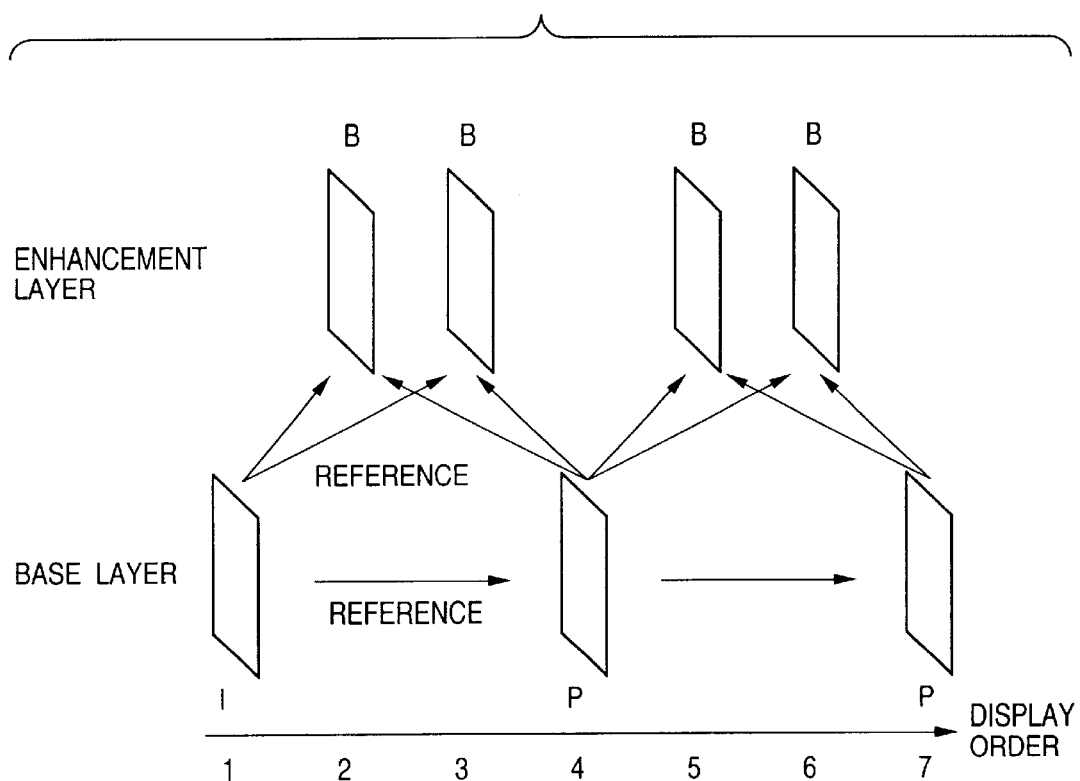
FIG. 23 is a view showing the frame display order in base and enhancement layers based on spatial scalability according to the fifth embodiment.
Figure 24:
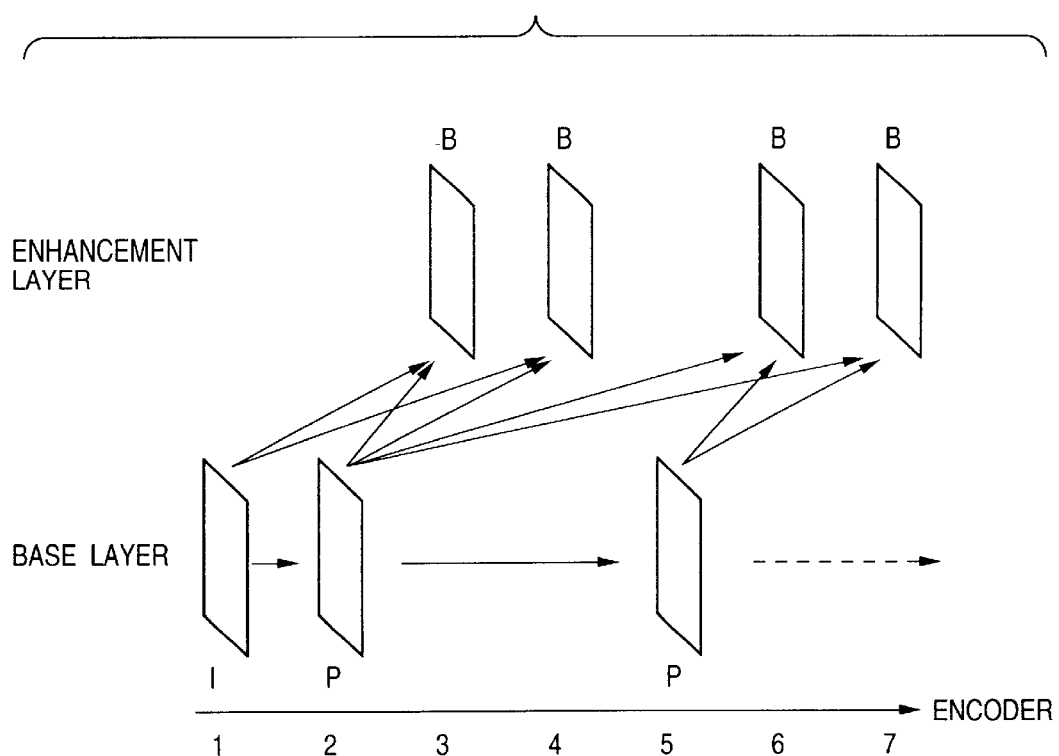
FIG. 24 is a view showing the frame encoding order in base and enhancement layers based on spatial scalability according to the fifth embodiment.

FIGS. 23 and 24 show the relationship among frames in the base and enhancement layers based on temporal scalability in the fifth embodiment. FIG. 23 shows the order of frames of an input image, and FIG. 24 shows the order of frames after the frames are rearranged by the demultiplexer 1700. Note that an input image is assigned to the respective layers in the order shown in FIG. 23.

The first frame of an input image is input to the base layer and undergoes I-Picture coding, and a local decoded image is stored in the frame memory 1205. The second frame is then input to the base layer, and undergoes P-Picture coding with reference to the local decoded image stored in the frame memory 1205. The third frame is input to the enhancement layer, and is converted into macroblocks in the frame memory 1100.

The motion compensator 1702 receives the output from the frame memory 1100, and makes motion compensation based on reference images of two frames, i.e., the first and second frames, stored in the frame memory 1205 of the base layer. That is, B-Picture coding is done. The fourth frame undergoes B-Picture coding like the third frame and, after that, operations are repeated according to frame modes.

A moving image decoding apparatus shown in FIG. 25 will be described below. The same reference numerals in FIG. 25 denote the same building components as those in the fourth embodiment mentioned above, and a detailed description thereof will be omitted. Hence, in the fifth embodiment, the differences from the fourth embodiment will be explained.

Reference numeral 2400 denotes a demultiplexer for distributing an input bitstream to the base and enhancement layers. Reference numeral 2402 denotes a motion compensator for receiving local decoded image data from the frame memory in the base layer, and outputting predicted images in units of macroblocks. Reference numeral 2401 denotes a selector for selecting one of the output from the enhancement layer (input a) and the output from the base layer (input b) in accordance with coding mode 1 from the demultiplexer 2000. The selector 2401 reorders (rearranges) frames of an image to a display order at the same time.

In the aforementioned arrangement, the input bitstream is distributed to the enhancement and base layers by the demultiplexer 2400. The relationship among frames in the base and enhancement layers in this embodiment is the same as that shown in FIG. 24.

The bitstreams of the first and second frames are input to the base layer so as to decode the first frame as I-Picture and the second frame as P-Picture. The bitstream of the third frame is input to the enhancement layer and is decoded as B-Picture with reference to two images of the first and second frames which are already stored in the frame memory 2105 by the motion compensator 2402. The bitstream of the fourth frame is input to the enhancement layer and is decoded in the same manner as in the third frame. After that, operations are repeated according to frame modes.

The selector 2401 selects the enhancement layer (input a) or base layer (input b) in accordance with coding mode 1 from the demultiplexer 2000, and reorders frames to output a decoded image.

In FIG. 18 mentioned above, if the selector 2302 is replaced by the selector 2401, the relationship between the selectors and playback images is the same as that in FIG. 18. Note that the resolution of a playback image in this case is determined by the time frequency. That is, a low-resolution image indicates an image of only the base layer, and a high-resolution image indicates an image including the enhancement layer.

As described above, according to the fifth embodiment, in the image encoding and decoding apparatuses with the temporal scalability function, since the enhancement layer is scrambled, the decoding apparatus can generate distortion in units of frames as needed, thus protecting the copyrights of a moving image.

Since the sign bit of each Huffman code is scrambled in place of the entire bitstream, the processing load on the apparatus can be reduced.

Since only the enhancement layer is scrambled, when both the layers are successively played back, and images of the enhancement layer, which are distorted by scrambling, are played back, non-distorted and distorted images are alternately played back. As a result, the viewer who cannot descramble can only recognize an outline of an image.

As in spatial scalability, the present invention can be implemented in three or more layers.

Note that the processes according to the fifth embodiment can be implemented by software as in the aforementioned fourth embodiment. Since the flow charts showing the flows of processes in such case are basically the same as those in the fourth embodiment, a description thereof will be omitted.

Sixth Embodiment

Figure 26:
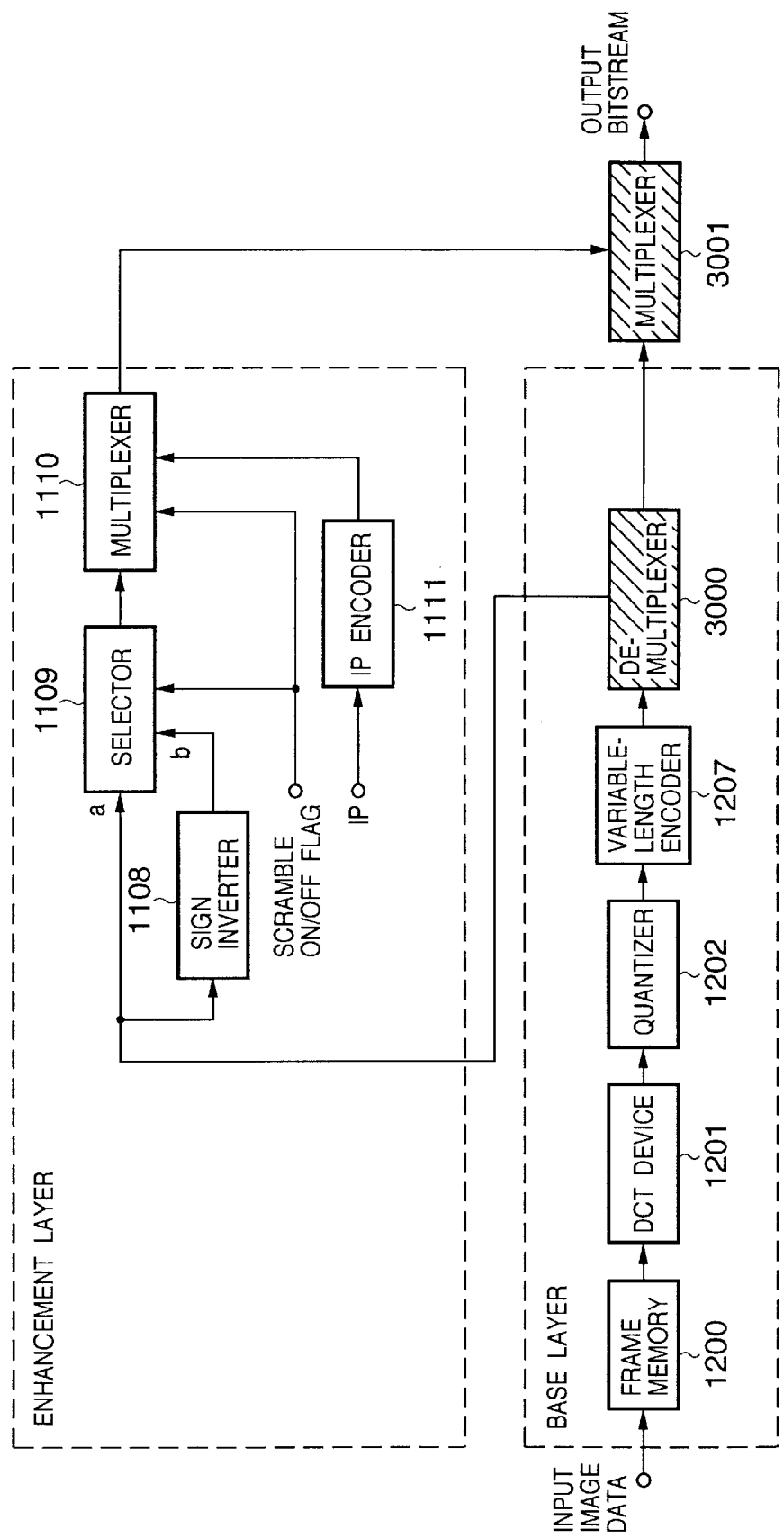
FIG. 26 is a block diagram showing the arrangement of principal part of an image encoding apparatus according to the sixth embodiment.
Figure 27:
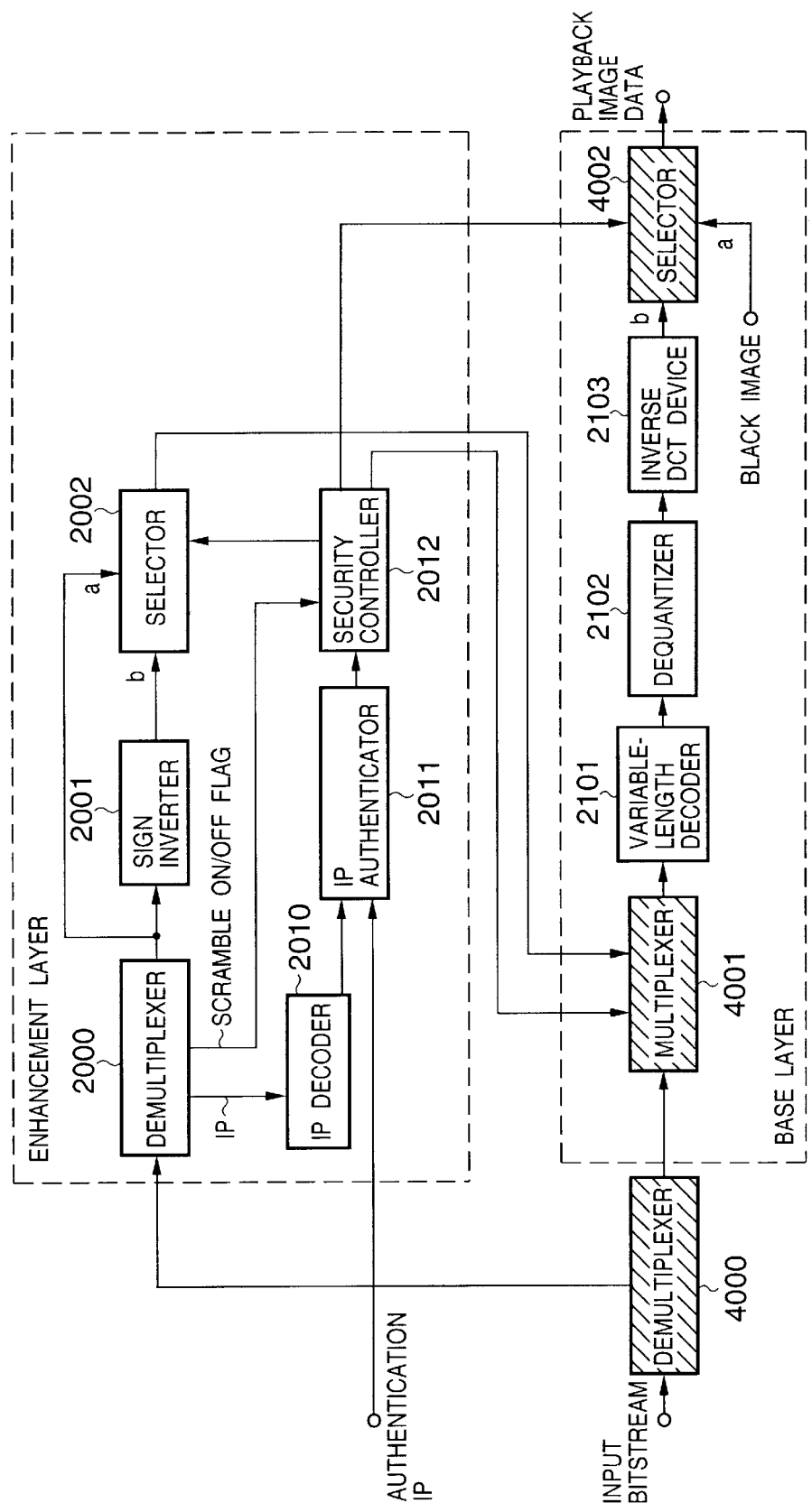
FIG. 27 is a block diagram showing the arrangement of principal part of an image decoding apparatus according to the sixth embodiment.

FIG. 26 is a block diagram showing the arrangement of an image encoding apparatus according to the sixth embodiment of the present invention, and FIG. 27 is a block diagram showing the arrangement of a corresponding image decoding apparatus. The sixth embodiment will exemplify a case wherein the apparatus has a function similar to spatial scalability of MPEG in intra-frame coding, and the enhancement layer is scrambled by inverting the sign bit of each Huffman code obtained by encoding a DCT coefficient.

The same reference numerals in FIG. 26 denote the same building components as those in the fourth embodiment, and a detailed description thereof will be omitted. Hence, in the sixth embodiment, the differences from the fourth embodiment will be explained.

Reference numeral 3000 denotes a separator for separating low- and high-frequency components of the DCT from the output of the variable-length encoder 1207 in correspondence with intra-block positions. Reference numeral 3001 denotes a multiplexer for multiplexing the codes of respective layers separated by the separator 3000.

If DCT[i] (i=0 to 63) represents a sequence of the contents of a DCT coefficient in a zigzag scan order, a Huffman code to be output from the separator 3000 of the sixth embodiment to the enhancement layer falls with the range of i=3 to 63.

Referring to FIG. 26, an input image is converted into macroblocks in the frame memory 1200, and these macroblocks are converted into variable-length encoded codes via the DCT device 1201, quantizer 1202, and variable-length encoder 1207. The encoded codes are separated by the separator 3000 in units of components in each block, low-frequency components are output to the multiplexer 3001, and other components are output to the DCT sign inverter 1108 and selector 1109.

The same reference numerals in an image decoding apparatus shown in FIG. 27 denote the same building components as those in the fourth embodiment, and a detailed description thereof will be omitted. Hence, in the sixth embodiment, the differences from the fourth embodiment will be explained.

Reference numeral 4000 denotes a separator for separating the input bitstream to the enhancement and base layers. Reference numeral 4001 denotes a multiplexer for multiplexing codes of the two layers. Reference numeral 4002 denotes a selector for selecting one of a black image (input a) and the output from the inverse DCT device 2103 in accordance with a select signal from the security controller 2012.

The operation of the decoding apparatus based on the aforementioned arrangement will be explained below.

An input bitstream is separated by the separator 4000 to the enhancement and base layers. In the following description, normal Huffman codes will be referred to as normal codes, and sign-inverted Huffman codes will be referred to as inverted codes. If DCT[i] (i=0 to 63) represents a sequence of the contents of a DCT coefficient in a zigzag scan order, a Huffman code to be output from the separator 4000 of the sixth embodiment to the enhancement layer falls with the range of i=3 to 63.

(A) When scramble ON/OFF flag is ON and IP authentication result is OK:

Since the authentication result is OK, the security controller 2012 controls the selector 2002 to select normal codes at input b. The multiplexer 4001 multiplexes low-frequency component codes from the separator 4000 and high-frequency component codes from the selector 2002. The variable-length decoder 2101, dequantizer 2102, and inverse DCT device 2103 receive normal codes. As a result, a normal image can be decoded. The selector 4002 selects and outputs input b in accordance with a select signal from the security controller 2012. Hence, the decoding apparatus of this embodiment plays back a normal image (high-resolution).

(B) When scramble ON/OFF flag is ON and IP authentication result is NG:

Since the authentication result is NG, the security controller 2012 controls the selector 2002 to select inverted codes at input a. For this reason, the inverse DCT device 2103 outputs playback image data with inverted codes as high-frequency components. The selector 4002 selects and outputs input b in accordance with a select signal from the security controller 2012. As a consequence, an image which is distorted by scrambling is played back.

(C) When scramble ON/OFF flag is OFF and IP authentication result is OK:

Since the authentication result is OK, the security controller 2012 controls the selector 2002 to select input a and to output normal codes. For this reason, all frequency components are normal, and normal playback image data is output from the inverse DCT device 2103. The selector 4002 selects and outputs input b in accordance with a select signal from the security controller 2012. As a result, a normal image can be played back.

(D) When scramble ON/OFF flag is OFF and IP authentication result is NG:

Since the authentication result is NG, the security controller 2012 controls the selector 4002 to select and output a black image (input a). As a result, a black image is played back.

FIG. 28 shows the relationship among the selection states of the selectors 4002 and 2002 by the security controller 2012, and playback images in the sixth embodiment.

In this way, the two selectors 2002 and 4002 are controlled using the scramble ON/OFF flag and IP authentication result, and three different playback image states can be consequently generated.

As described above, the sixth embodiment can be implemented by both the still and moving image encoding and decoding apparatuses since intra-frame coding is adopted.

In the image encoding and decoding apparatuses with the spatial scalability function, since the enhancement layer is scrambled, the decoding apparatus can generate distortion in units of frames as needed, thus protecting the copyrights of an image.

Since the signs of Huffman codes are inverted in units of blocks, if the scrambled bitstream is directly decoded, distortion is confined within blocks. In this embodiment, an image which suffers so-called block distortion or mosquito distortion more than a normal image is played back, and the viewer who cannot descramble can only recognize an outline of an image.

As described above, according to the fourth to sixth embodiments, in the image encoding and decoding apparatuses with a scalability function, since the bitstream contains IP encoded codes and additional information used in copyright protection, the copyrights of the contents provider can be protected for a part of a desired image.

Also, according to the fourth to sixth embodiments, since some limited codes of the bitstream are scrambled, the processing load can be reduced compared to a case wherein all encoded codes are to be scrambled. Since distortion produced by scrambling is confined within each block, the viewer who cannot descramble can only recognize an outline of an image.

Seventh Embodiment

Figure 29:
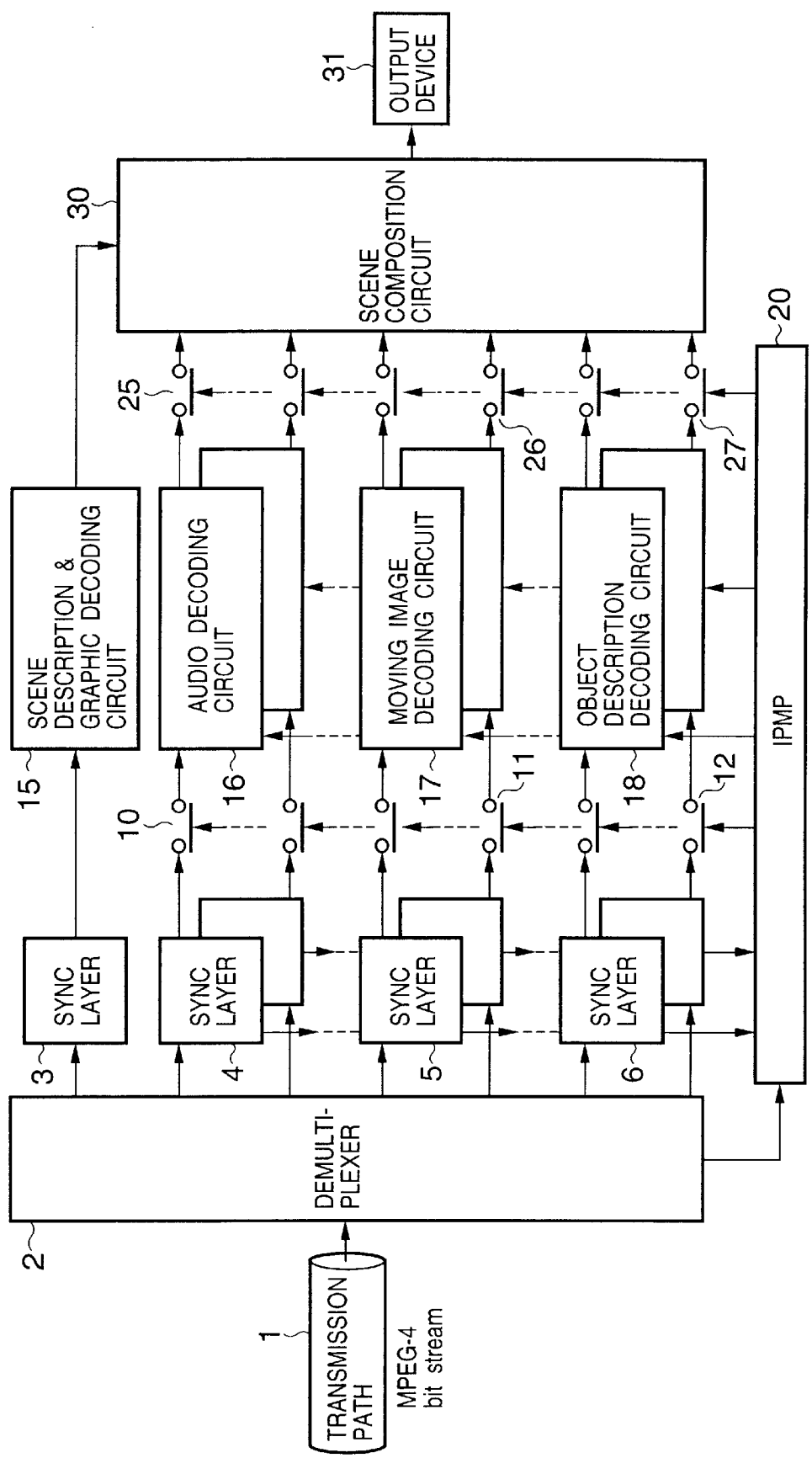
FIG. 29 is a block diagram showing the overall arrangement of a data processing apparatus according to the seventh embodiment.

FIG. 29 is a schematic block diagram showing the arrangement of a data processing apparatus (MPEG-4 player) according to the seventh embodiment. Referring to FIG. 29, reference numeral 1 denotes a transmission path represented by various kinds of networks. The transmission path 1 of this embodiment is a network in which an MPEG-4 bitstream is sent. Note that the transmission path 1 of this embodiment not only indicates a so-called communication path, but also include a storage medium itself such as a DVD-RAM or the like.

Upon receiving an MPEG-4 bitstream sent from the network or played back from a recording medium, the MPEG-4 player of this embodiment inputs it to a demultiplexer 2. The demultiplexer 2 demultiplexes the received MPEG-4 bitstream into scene description data including graphic data, audio object data, moving image object data, object description data, and the like, and inputs them to processing circuits 3 to 6 of respective sync layers.

Note that audio object data has undergone high-efficiency (compression) coding such as known CELP (Code Excited Linear Prediction) coding, transform-domain weighted interleave vector quantization (TWINVQ) coding, or the like. Also, the moving image object data has undergone high-efficiency coding by, e.g., known MPEG-2, H.263, or the like. The object description data includes, e.g., animation or the like and is similarly encoded in a format suitable for each description data.

In the sync layer processing circuits 3 to 6, since the scene description data, audio objects, moving image objects, object description data, and the like have undergone coding such as high-efficiency (compression) coding or the like, they are decoded by decoding circuits 15 to 18 in units of objects. Note that the scene description data contains graphic data, which are synchronized according to time information called time stamps appended to the bitstream.

Note that this embodiment assumes an apparatus which can decode even when the MPEG-4 bitstream contains a plurality of different types of objects in each of audio objects, moving image objects, and object description data. For this reason, a plurality of sets of sync layer processing circuits and decoding circuits are prepared in correspondence with audio objects, moving image objects, and object description data.

The audio objects, moving image objects, and object description data respectively decoded by the decoding circuits 16, 17, and 18 are input to a scene composition circuit 30 to play back scenes, and the graphic data from the decoding circuit 15 are processed. A finally obtained multimedia data sequence is supplied to an output device 31 represented by a display, printer, or the like, and is visualized.

In the received data stream in the seventh embodiment, since control for switching playback quality for copyright protection of individual audio and moving image objects that form a scene is required, Intellectual Property Management and Protection (to be abbreviated as IPMP hereinafter) information described in, e.g., Japanese Patent Application No. 10-295937 filed previously is appended to a bitstream.

In the apparatus of this embodiment, this IPMP information is extracted by the demultiplexer 2 and is supplied to an IPMP controller 20. The IPMP controller 20 processes decoded data at access points 25, 26, and 27 in FIG. 29 as needed. In this fashion, when a bitstream containing copyrighted contents is input, it can be played back while lowering its quality.

Figure 30:
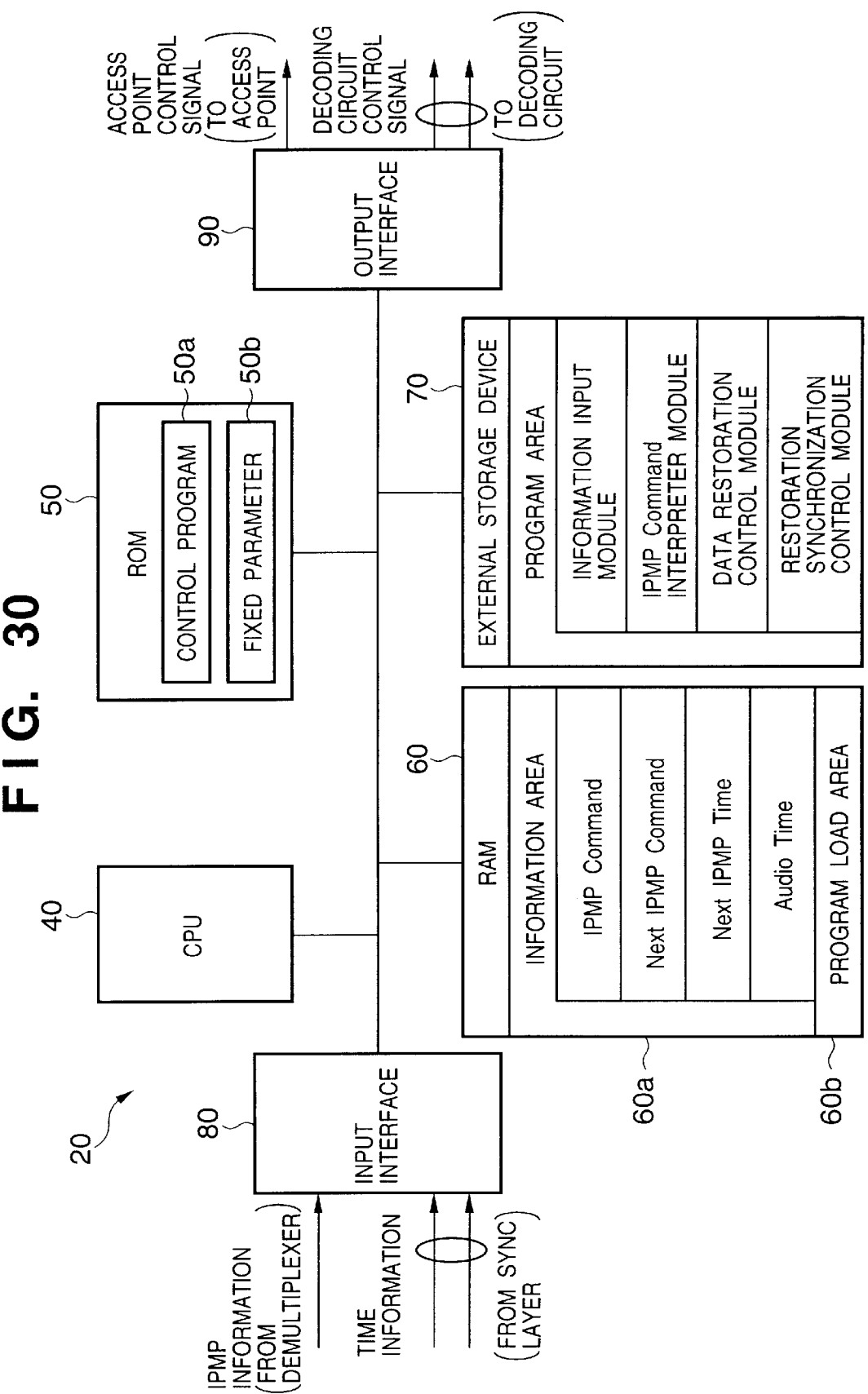
FIG. 30 is a block diagram showing the arrangement of an IPMP controller 20 according to the seventh embodiment.

FIG. 30 is a block diagram showing an example of the arrangement of the IPMP controller 20 in FIG. 29.

Referring to FIG. 30, reference numeral 40 denotes a CPU for arithmetic operations and control, which controls the IPMP controller 20; and 50, a ROM for storing a fixed control program 50a, fixed parameters 50b, and the like. Reference numeral 60 denotes a RAM which is used by the CPU 40 as a temporary storage, and includes an information area 60a for storing information such as commands, time, and the like, and a program load area 60b that stores a program loaded from an external storage device 70. Reference numeral 70 denotes an external storage device which uses an external storage medium such as a floppy disk, CD-ROM, or the like, and stores the program to be loaded onto the program load area 60b.

Reference numeral 80 denotes an input interface which inputs IPMP information from the demultiplexer 2, and time information from the sync layers 4 to 6. Reference numeral 90 denotes an output interface for outputting access point control signals to access points 10 to 12, and decoding circuit control signals to the decoding circuits 16 to 18.

In the seventh embodiment, the IPMP controller 20 has been exemplified as an independent processor element, but may be implemented by controlling some or all components of the MPEG-4 player or by software, as is known to those who are skilled in the art.

Operation Example of MPEG-4 Player of this Embodiment

The operation of the apparatus of the seventh embodiment, especially, the operation using IPMP information, will be explained in detail below using the flow charts shown in FIGS. 31 and 32.

Figure 31:
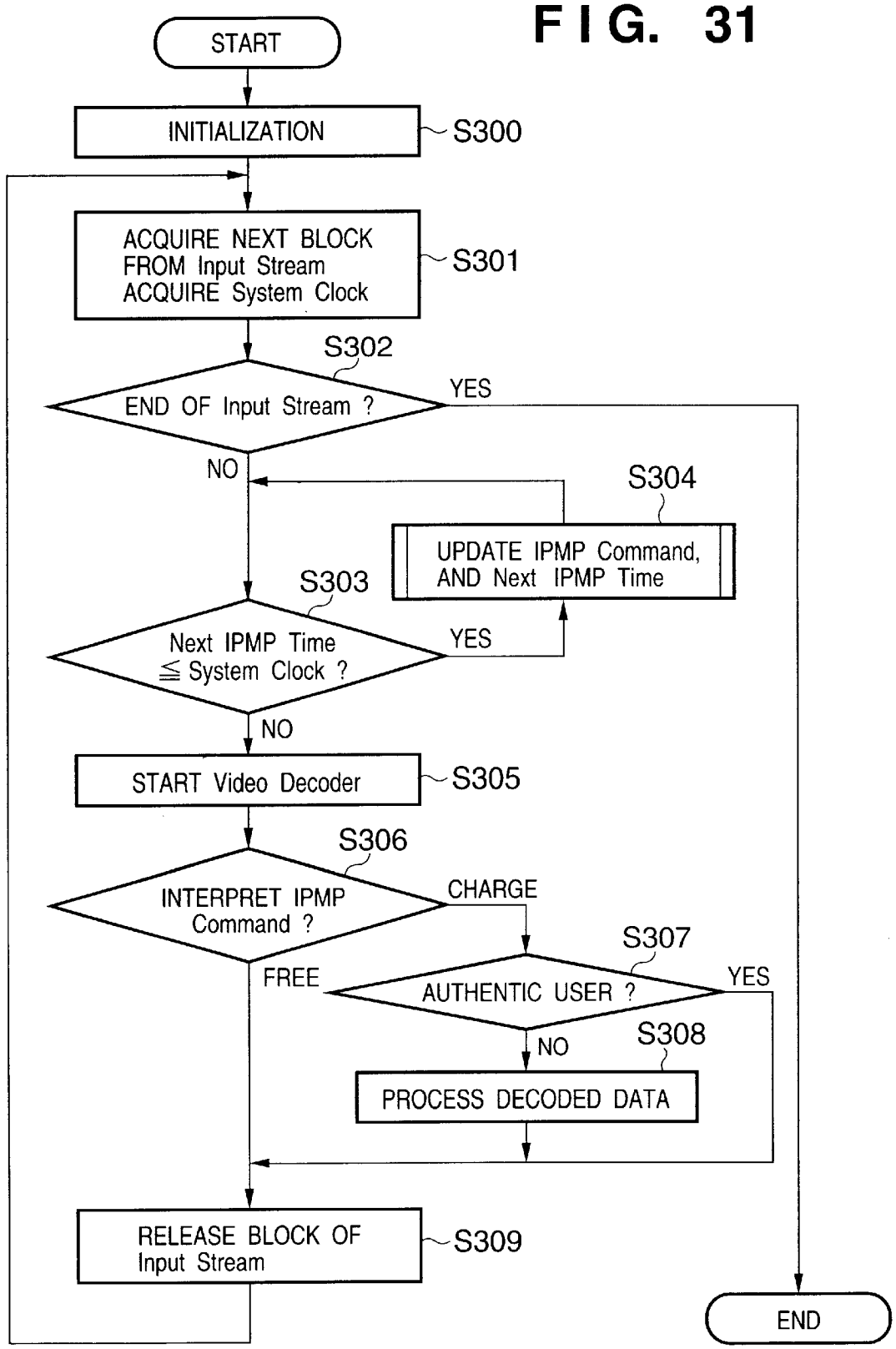
FIG. 31 is a flow chart for explaining the operation of the IPMP controller 20 according to the seventh embodiment.
Figure 32:
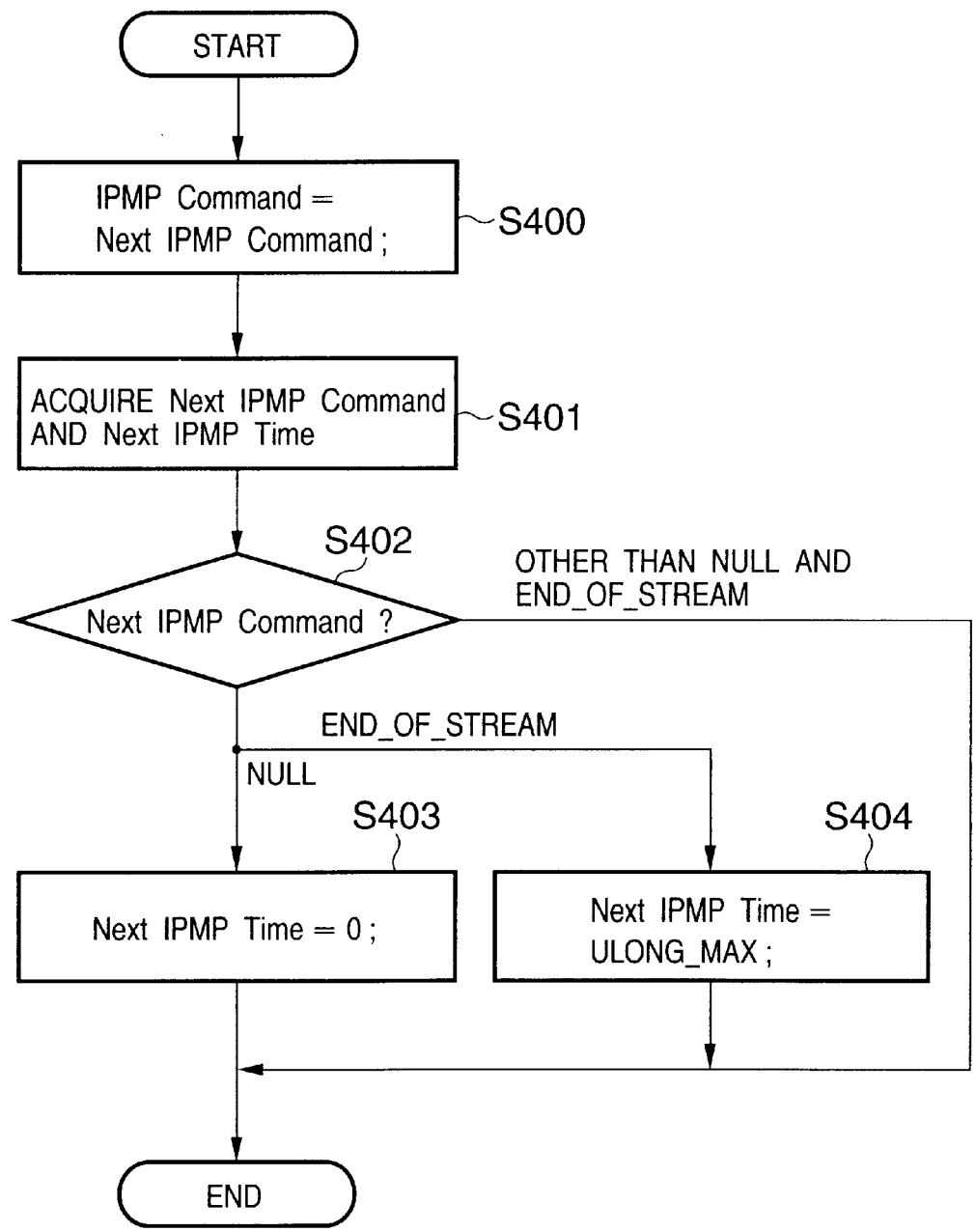
FIG. 32 is a flow chart showing the process in step S304 in the flow chart shown in FIG. 31.

FIG. 31 is a flow chart for explaining the operation of the IPMP controller 20 when the MPEG-4 player receives an MPEG-4 bitstream. Assume that the MPEG-4 bitstream is made up of a bitstream of moving image data in units of packets, and a bitstream of IPMP information for the moving image data. Hence, an input stream in FIG. 31 is a bitstream of moving image data.

Initialization is made in step S300. In this step, the IPMP controller 20 resets IPMP Command indicating the current playback control method to "NULL" and also Next IPMP Command indicating the next playback control method to "NULL", and resets Next IPMP time indicating a block acquisition time from an IPMP stream to "0".

In step S301, the IPMP controller 20 acquires the next packet from the input moving image stream demultiplexed by the demultiplexer 2. On the other hand, the IPMP controller 20 extracts time clocks of this system, and stores the time information as System Clock.

It is checked in step S302 if the Input Stream (moving image stream) has reached its end. If the end of the stream is detected, the processing ends; otherwise, the flow advances to step S303.

In step S303, Next IPMP time and System Clock are compared. If it is determined that Next IPMP time has become equal to or smaller than System Clock, the flow advances to step S304 to acquire new IPMP packet information.

Acquisition of IPMP Command and IPMP time and updating of IPMP Command, Next IPMP Command, and Next IPMP Time in step S304 will be explained below with reference to the flow chart in FIG. 32.

In step S400, Next IPMP Command is stored as IPMP command. In step S401, Next IPMP Time and Next IPMP Command are acquired from the IPMP stream as data of the next moving image playback method. Note that Next IPMP Time and Next IPMP Command are acquired as a pair of parameters, as shown in FIG. 33. FIG. 33 shows an example of IPMP information. As shown in FIG. 33, Next IPMP time is numerical value data and is time information (unit: msec) used for synchronization with other objects. On the other hand, Next IPMP Command is a command used to set if the object of interest incurs charge or is free of charge, as shown in FIG. 33.

In step S402, the contents of acquired Next IPMP Command are checked. If the contents indicate neither "NULL" nor "END_OF_STREAM" indicating the end of the stream, the processing ends. If Next IPMP Command is "NULL", the flow advances to step S403 to set information of Next IPMP Time at "0", thus ending the processing. On the other hand, if Next IPMP Command is "END_OF_STREAM", the flow advances to step S404 to set the value of Next IPMP Time to be a maximum value (ULONG_MAX=0fffffff), thus ending the processing.

Referring back to FIG. 31, if Next IPMP Time is not equal to or smaller than System Clock in step S303, since IPMP Command and Next IPMP Time need not be updated, the flow advances to step S305.

In step S305, the moving image decoding circuit 17 is started or its operation is continued, and the flow advances to step S306 and subsequent steps. In step S306, IPMP Command set in step S304 is interpreted and authenticated to check if IPMP Command is a command "FREE . . . " that allows free playback of a moving image object or a command "CHARGE . . . " that allows playback only when a given fee is paid. For example, in IPMP information shown in FIG. 33, a command "FREE 1ST IPMP PACKET" at time 0 msec is determined to be a free playback command. On the other hand, a command "CHARGE SECOND IPMP PACKET" at time 1,000 msec is determined to be a charged playback command. Hence, playback of objects appended with IPMP information shown in FIG. 33 is free from time of 0 msec to time of 1,000 msec, but a given fee must paid after that time.

If it is determined in step S306 that the object of interest is free of charge, since no special process for lowering image quality, adding noise or blurred portions, or displaying a still image upon playing back moving image objects is required, the flow advances to step S309. In step S309, the packet of the stream acquired in step S301 is released, and the flow returns to step S301 to acquire the next packet.

On the other hand, if it is determined in step S306 that the object of interest is chargeable, the flow advances to step S307. It is checked in step S307 if the user is authentic or the user has paid a required fee. This checking step can be implemented by a user interactive method of, e.g., prompting the user to input a password of which only an authentic user is informed in advance or to insert a smart card. Note that such authentication method is known, and a detailed description thereof will be omitted.

If it is determined in step S307 that the user is authentic (or the user has paid a given fee), since data decoded by the moving image decoding circuit 17 need only be directly used upon playing back that object as in free playback, the flow advances to step S309.

On the other hand, if it is determined in step S307 that the user is not authentic (the user has not paid a given fee), the flow advances to step S308 to control playback quality of that object. In step S308, data decoded in step S305 is processed to control playback quality. How to process the data can be determined by the IPMP controller 20 depending on the format of the IPMP information.

More specifically, the IPMP information describes IPMP object type designation at its beginning, which has the following specification in FDIS of MPEG-4 Part1: Systems:

```
class IPMP_Descriptor()extends Base
Descriptor:bit (8) IPMP_DescrTag{
        bit(8) IPMP_Descriptor ID:
        unsigned int(16)IPMPS_Type:
        if(IPMPS_Type==0) {
            bit(8) URLString[size Of Instance-3]:
        } else {
            bit(8) IPMP data[size Of Instance-3];
        }
}
```

If IPMPS_Type=0, information for protecting and managing copyrights is present at a location designated by the URL; if IPMPS_Type is other than 0, a description of information for protecting and managing copyrights follows. Hence, the playback control method of the object of interest can be determined using IPMPS_Type in the above description.

For example, if IPMPS_Type=1 as in an example shown in FIG. 34, noise is added to the payload of decoded data, thus lowering the quality of a moving image or audio to be played back. If IPMPS_Type=2, the payload of decoded data is cleared to black out a moving image or inhibit audio playback. If IPMPS_Type=3, a given still image is read from the memory, is written in a decoded data buffer, and is displayed in place of playing back a moving image. If IPMPS_Type=4, the payload of decoded data is processed to add a blurred or mosaic pattern to a moving image. If IPMPS_Type=5 or 6, a moving image is played back with lower quality by, e.g., decreasing the pixel resolution or the number of gray levels of luminance by processing decoded moving image data. If IPMPS_Type=7, audio data is played back with lower quality by decreasing the frequency resolution by processing decoded audio data.

IPMPS_Type is set in advance by the copyright holder or contents provider, and the IPMP controller 20 can determine the playback method of corresponding data by identifying IPMPS_Type in IPMP information.

When the user who is not authentic or has not paid a given fee plays back the chargeable object, decoded data is processed in step S308, and the flow advances to step S309. For this reason, the playback quality of that object is different from that for an authentic user.

In this embodiment, the MPEG-4 bitstream is made up of a bitstream of moving image data in units of packets, and a bitstream of IPMP information for that moving image data. In addition to moving image data, IPMP information can be appended to object data that form the moving image data or audio data. Also, an object which is to undergo playback quality control (e.g., by adding a noise or mosaic pattern) is not limited to moving image data, but the present invention can be applied to object data that form the moving image data or audio data.

As described above, according to this embodiment, upon decoding and playing back information from a data stream that contains a plurality of object streams, the playback quality of copyrighted objects can be controlled (e.g., lowered) depending on whether the user is authentic or has paid a given fee, i.e., whether or not the user is permitted to play back the data.

That is, upon demultiplexing and playing back respective object streams from a data stream that contains a plurality of object streams each having predetermined information, playback of object data appended with IPMP information can be differentiated by playing back the data with different qualities between an authentic user (or the user who has paid a given fee) and an authentic user (or the user who has not paid the fee).

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many widely different embodiments of the present invention can be made without departing form the spirit and scope thereof, it is to be understood that the invention is not limited to the specific embodiments thereof except as defined in the claims.

What is claimed is:

1. An image processing apparatus for receiving and encoding an image signal, comprising:

encoding means for encoding an input image signal in units of blocks, by using a quantizing parameter, and outputting encoded codes;

conversion means for converting the quantizing parameter in accordance with scramble information indicating the presence/absence of scrambling;

authentication data input means for inputting authentication data; and multiplexing means for multiplexing and outputting at least the encoded codes output from said encoding means, the quantizing parameter processed by said conversion means, the scramble information, and the authentication data.

2. The apparatus according to claim 1, wherein said block encoding means comprises:

DCT means for computing discrete cosine transforms of the input image signal;

quantization means for quantizing DCT coefficients obtained by said DCT means in accordance with the quantizing parameter; and variable-length encoding means for variable-length encoding quantization results of said quantization means.

3. The apparatus according to claim 1, wherein the scramble information indicates the presence/absence of scrambling in units of blocks.

4. The apparatus according to claim 1, wherein said conversion means comprises:
   generating means for receiving the quantizing parameter and generating a converted quantizing parameter; and
   selection means for selecting one of the quantizing parameter and the converted quantizing parameter in accordance with the scramble information.

5. The apparatus according to claim 4, wherein said generating means has a table for receiving the quantizing parameter and outputting the converted quantizing parameter.

6. The apparatus according to claim 2, wherein the quantizing parameter is a quantization matrix, and said conversion means changes values of the quantization matrix.

7. The apparatus according to claim 6, wherein said conversion means inverts bits of quantization coefficient values corresponding to DCT coefficients of not less than a predetermined spatial frequency.

8. The apparatus according to claim 1, wherein said encoding means executes inter-frame predictive coding.

9. An image processing apparatus comprising:
   receiving means for receiving an encoded image signal, a quantizing parameter, authentication data, and scramble information indicating the presence/absence of scrambling, wherein the encoded image signal is obtained by quantizing and encoding image data in units of blocks;
   authentication data input means for inputting authentication data;
   discrimination means for discriminating if the authentication data input by said authentication data input means matches authentication data received by said receiving means;
   parameter conversion means for converting the quantizing parameter on the basis of the scramble information and a discrimination result of said discrimination means; and
   decoding means for decoding the encoded image signal in units of blocks in accordance with the quantizing parameter output from said parameter conversion means.

10. The apparatus according to claim 9, wherein said parameter conversion means outputs the quantizing parameter without any conversion to said decoding means when the scramble information indicates the presence of scrambling, and the discrimination result of said discrimination means indicates that the two authentication data do not match.

11. The apparatus according to claim 9, wherein said decoding means comprises:
    variable-length decoding means for decoding the encoded image signal by variable-length decoding;
    inverse quantization means for inverse quantizing data decoded by said variable-length decoding means in accordance with the quantizing parameter output from said parameter conversion means; and
    inverse DCT means for computing an inverse DCT of the inverse-quantization result of said inverse quantization means.

12. The apparatus according to claim 9, further comprising:
    image selection means for selecting and outputting one of a playback image of said decoding means and a specific image, and
    wherein the specific image is selected when the scramble information indicates the absence of scrambling, and the discrimination result of said discrimination means indicates that the two authentication data do not match.

13. An image processing apparatus for receiving and decoding an image signal that has undergone inter-frame predictive coding, comprising:
    authentication data input means for inputting authentication data;
    discrimination means for discriminating if the authentication data input by said authentication data input means matches authentication data input together with the image signal;
    parameter conversion means for converting an encoding parameter input together with the image signal on the basis of scramble information indicating the presence/absence of scrambling, which is input together with the image signal;
    first decoding means for decoding the image signal, that has undergone inter-frame predictive coding, in units of blocks in accordance with the encoding parameter output from said parameter conversion means;
    second decoding means for decoding the image signal, that has undergone inter-frame predictive coding, using the encoding parameter input together with the image signal and inter-frame prediction information obtained from said first decoding means;
    output means for selecting and outputting one of playback images of said first and second decoding means on the basis of a discrimination result of said discrimination means.

14. The apparatus according to claim 13, wherein said output means
    selects and outputs the playback image of said first decoding means when the scramble information indicates the presence of scrambling, and the discrimination result of said discrimination means indicates that the two authentication data match,
    selects and outputs the playback image of said second decoding means when the scramble information indicates the presence of scrambling, and the discrimination result of said discrimination means indicates that the two authentication data do not match,
    selects and outputs the playback image of either said first or second decoding means when the scramble information indicates the absence of scrambling, and the discrimination result of said discrimination means indicates that the two authentication data match, and
    outputs a specific image when the scramble information indicates the absence of scrambling, and the discrimination result of said discrimination means indicates that the two authentication data do not match.

15. An image processing apparatus comprising:
    inputting means for inputting an image signal;
    encoding means for generating an encoded image signal by converting the input image signal into a frequency component signal and encoding the frequency component signal;
    conversion means for converting the encoded image signal generated by said encoding means in accordance with scramble information indicating the presence/absence of scrambling, said conversion means converting a predetermined frequency component of the encoded image signal;
    authentication data input means for inputting authentication data; and
    multiplexing means for multiplexing and outputting at least the encoded image signal processed by said conversion means, the scramble information, and the authentication data.

16. The apparatus according to claim 15, wherein the scramble information indicates the presence/absence of scrambling in units of blocks.

17. The apparatus according to claim 15, wherein said block encoding means comprises:
DCT means for computing a discrete cosine transform of the input image signal;
quantization means for quantizing a DCT coefficient obtained by said DCT means in accordance with the encoding parameter; and
encoding means for encoding a quantization result of said quantization means by variable-length coding.

18. The apparatus according to claim 15, wherein said conversion means inverts sign bits of codes corresponding to the predetermined frequency component of the encoded image signal.

19. The apparatus according to claim 15, wherein said conversion means inverts sign bits of codes corresponding to frequency components of not less than the predetermined frequency.

20. The apparatus according to claim 15, wherein said encoding means executes inter-frame predictive coding.

21. An image processing apparatus comprising:
receiving means for receiving an encoded image signal, authentication data, and scramble information indicating the presence/absence of scrambling, wherein the encoded image signal has been generated by converting an image signal into a frequency component signal and encoding the frequency component signal;
authentication data input means for inputting authentication data;
discrimination means for discriminating if the authentication data input by said authentication data input means matches authentication data received by said receiving means;
conversion means for converting the encoded image signal on the basis of the scramble information and a discrimination result of said discrimination means, said conversion means converting a predetermined frequency component of the encoded image signal; and
decoding means for decoding the encoded image signal processed by said conversion means.

22. The apparatus according to claim 21, wherein said decoding means comprises:
variable-length decoding means for decoding the encoded image signal by variable-length decoding;
dequantization means for dequantizing data decoded by said variable-length decoding means; and
inverse DCT means for computing an inverse DCT of the dequantization result of said dequantization means.

23. An image processing apparatus for receiving and decoding an image signal that has undergone inter-frame predictive coding, comprising:
authentication data input means for inputting authentication data;
discrimination means for discriminating if the authentication data input by said authentication data input means matches authentication data input together with the image signal;
conversion means for converting sign information contained in the encoded image signal on the basis of scramble information indicating the presence/absence of scrambling, which is input together with the image signal;
first decoding means for decoding the image signal containing the sign information obtained by converting by said conversion means the image signal that has undergone inter-frame predictive coding;
second decoding means for decoding the input image signal, that has undergone inter-frame predictive coding, using inter-frame prediction information obtained from said first decoding means; and
output means for selecting and outputting one of playback images of said first and second decoding means on the basis of a discrimination result of said discrimination means.

24. The apparatus according to claim 23, wherein said output means
selects and outputs the playback image of said first decoding means when the scramble information indicates the presence of scrambling, and the discrimination result of said discrimination means indicates that the two authentication data match,
selects and outputs the playback image of said second decoding means when the scramble information indicates the presence of scrambling, and the discrimination result of said discrimination means indicates that the two authentication data do not match,
selects and outputs the playback image of either said first or second decoding means when the scramble information indicates the absence of scrambling, and the discrimination result of said discrimination means indicates that the two authentication data match, and
outputs a specific image when the scramble information indicates the absence of scrambling, and the discrimination result of said discrimination means indicates that the two authentication data do not match.

25. An image encoding apparatus comprising:
separation means for separating input image data into a plurality of layers;
block encoding means for encoding in units of blocks image data of respective layers separated by said separation means;
scramble means for scrambling blocks encoded by said block encoding means in one or a plurality of layers;
intellectual property protection data input means for inputting intellectual property protection data;
intellectual property protection data encoding means for encoding the intellectual property protection data; and
multiplexing means for multiplexing and outputting codes encoded by said block encoding means, the intellectual property protection data encoded by said intellectual property protection data encoding means, and codes of the blocks scrambled by said scramble means.

26. The apparatus according to claim 25, wherein said separation means down-samples the input image data in two-dimensional spatial directions.

27. The apparatus according to claim 25, wherein said separation means assigns frames of the input image data in units of layers.

28. The apparatus according to claim 25, wherein said scramble means replaces a bitstream encoded by said block encoding means by another code having an identical code length.

29. The apparatus according to claim 25, wherein said block encoding means comprises:
orthogonal transformation means for computing orthogonal transforms of blocks;
quantization means for quantizing coefficients transformed by said orthogonal transformation means; and variable-length encoding means for encoding quantization results of said quantization means by variable-length coding.

30. The apparatus according to claim 25, wherein said multiplexing means further multiplexes information indicating whether or not blocks scrambled by said scramble means are contained.

31. An image decoding apparatus comprising:
demultiplexing means for receiving an encoded bit stream, and demultiplexing the bitstream into an intellectual property protection code and one or a plurality of layers;
intellectual property protection code decoding means for decoding the intellectual property protection code demultiplexed by said demultiplexing means;
authentication data input means for receiving external authentication data;
authentication means for checking if the authentication data matches a decoding result of said intellectual property protection code decoding means;
descramble means for descrambling one or a plurality of layers on the basis of an authentication result of said authentication means;
decoding means for decoding the output from said demultiplexing means or the output from said descramble means; and
image output means for outputting an image decoded by said decoding means.

32. The apparatus according to claim 31, wherein said image output means assigns and outputs frames of an image in units of layers in a playback order.

33. The apparatus according to claim 31, wherein said image output means selects and outputs images from layers selected in units of frames.

34. The apparatus according to claim 31, wherein said descramble means replaces the bitstream by another code 20 having an identical code length.

35. The apparatus according to claim 31, wherein said decoding means comprises:
input means for inputting a bitstream descrambled by said descramble means;
variable-length decoding means for decoding encoded codes in units of blocks by variable-length decoding;
dequantization means for dequantizing the decoding results of said variable-length decoding means; and
inverse orthogonal transformation means for computing inverse orthogonal transforms of dequantization results of said dequantization means.

36. A data processing apparatus for demultiplexing object streams from a data stream which contains a plurality of object streams each having predetermined information, and reconstructing, compositing, and outputting the object streams, comprising:
discrimination means for discriminating if playback of the plurality of object streams is permitted;
determination means for determining playback quality of a predetermined object stream on the basis of a discrimination result of said discrimination means; and
playback control means for playing back the predetermined object stream with the playback quality determined by said determination means upon playing back the plurality of object streams.

37. The apparatus according to claim 36, wherein information in the predetermined object stream has undergone high-efficiency coding.

38. The apparatus according to claim 37, wherein said playback control means controls the playback quality of the predetermined object stream by processing decoded data of the information that has undergone high-efficiency coding.

39. The apparatus according to claim 36, wherein said playback control means controls the playback quality of the predetermined object stream in accordance with an intellectual property management stream included in the plurality of object streams.

40. The apparatus according to claim 39, wherein said determination means determines a control method of said playback control means that pertains to the playback quality on the basis of a type of the intellectual property management stream.

41. The apparatus according to claim 39, wherein said, determination means determines a control method of said playback control means, that pertains to the playback quality, on the basis of a type of the intellectual property management stream when said discrimination means discriminates that playback is not permitted.

42. The apparatus according to claim 36, wherein the plurality of object streams are MPEG-4 bitstreams.

43. The apparatus according to claim 36, wherein said control means controls the playback quality of the predetermined object stream by managing multi-thread processes in units of streams.

44. A data processing apparatus for demultiplexing object streams from a data stream which contains a plurality of object streams each having predetermined information, scene description information used to composite information contained in the plurality of object streams, and a management stream having management information used to manage a copyright of the information, reconstructing the information, and compositing and outputting playback data on the basis of the scene description information, comprising:
discrimination means for discriminating if playback of the plurality of object streams is permitted;
determination means for determining playback quality of a predetermined object stream on the basis of a discrimination result of said discrimination means; and
playback control means for playing back the predetermined object stream with the playback quality determined by said determination means upon playing back the plurality of object streams.

45. An image processing method for receiving and encoding an image signal, comprising:
the encoding step of encoding an input image signal in units of blocks by using a quantizing parameter, and outputting encoded codes;
the conversion step of converting the quantizing parameter in accordance with scramble information indicating the presence/absence of scrambling;
the authentication data input step of inputting authentication data; and
the multiplexing step of multiplexing and outputting at least the encoded codes output from the encoding step, the quantizing parameter processed in the conversion step, the scramble information, and the authentication data.

46. The method according to claim 45, wherein the block encoding step comprises:
the DCT step of computing discrete cosine transforms of the input image signal;
the quantization step of quantizing DCT coefficients obtained in the DCT step in accordance with the quantizing parameter; and the variable-length encoding step of variable-length encoding quantization results of the quantization step.

47. The method according to claim 46, wherein the quantizing parameter is a quantization matrix, and the conversion step includes the step of changing values of the quantization matrix.

48. The method according to claim 47, wherein the conversion step includes the step of inverting bits of quantization coefficient values corresponding to DCT coefficients of not less than a predetermined spatial frequency.

49. The method according to claim 45, wherein the scramble information indicates the presence/absence of scrambling in units of blocks.

50. The method according to claim 45, wherein the conversion step comprises:

the generating step of receiving the quantizing parameter and generating a converted quantizing parameter; and the selection step of selecting one of the quantizing parameter and the converted quantizing parameter in accordance with the scramble information.

51. The method according to claim 50, wherein the generating step has a table for receiving the quantizing parameter and outputting the converted quantizing parameter.

52. The method according to claim 45, wherein the encoding step includes the step of executing inter-frame predictive coding.

53. An image processing method comprising:

the receiving step of receiving an encoded image signal, a quantizing parameter, authentication data, and scramble information indicating the presence/absence of scrambling, wherein the encoded image signal is obtained by quantizing and encoding image data in units of blocks;

the authentication data input step of inputting authentication data;

the discrimination step of discriminating if the authentication data input in the authentication data input step matches authentication data received in said receiving step;

the parameter conversion step of converting the quantizing parameter, on the basis of the scramble information and a discrimination result of the discrimination step; and the decoding step of decoding the encoded image signal in units of blocks in accordance with the quantizing parameter output from the parameter conversion step.

54. The method according to claim 53, wherein the parameter conversion step includes the step of outputting the quantizing parameter without any conversion to the decoding step when the scramble information indicates the presence of scrambling, and the discrimination result of the discrimination step indicates that the two authentication data do not match.

55. The method according to claim 53, wherein the decoding step comprises:

the variable-length decoding step of decoding the encoded image signal by variable-length decoding;

the inverse quantization step of inverse-quantizing data, decoded in the variable-length decoding step, in accordance with the quantizing parameter output from the parameter conversion step; and the inverse DCT step of computing an inverse DCT of the inverse-quantization result of the dequantization step.

56. The method according to claim 53, further comprising:

the image selection step of selecting and outputting one of a playback image of the decoding step and a specific image, and wherein the specific image is selected when the scramble information indicates the absence of scrambling, and the discrimination result of the discrimination step indicates that the two authentication data do not match.

57. An image processing method for receiving and decoding an image signal that has undergone inter-frame predictive coding, comprising:

the authentication data input step of inputting authentication data;

the discrimination step of discriminating if the authentication data input in the authentication data input step matches authentication data input together with the image signal;

the parameter conversion step of converting an encoding parameter, input together with the image signal, on the basis of scramble information which indicates the presence/absence of scrambling and is input together with the image signal;

the first decoding step of decoding the image signal, that has undergone inter-frame predictive coding, in units of blocks in accordance with the encoding parameter output from the parameter conversion step;

the second decoding step of decoding the image signal, that has undergone inter-frame predictive coding, using the encoding parameter input together with the image signal and inter-frame prediction information obtained from the first decoding step; and the output step of selecting and outputting one of playback images of the first and second decoding steps on the basis of a discrimination result of the discrimination step.

58. The method according to claim 57, wherein the output step includes the steps of:

selecting and outputting the playback image of said first decoding step when the scramble information indicates the presence of scrambling, and the discrimination result of the discrimination step indicates that the two authentication data match;

selecting and outputting the playback image of said second decoding step when the scramble information indicates the presence of scrambling, and the discrimination result of the discrimination step indicates that the two authentication data do not match;

selecting and outputting the playback image of either said first or second decoding step when the scramble information indicates the absence of scrambling, and the discrimination result of the discrimination step indicates that the two authentication data match; and outputting a specific image when the scramble information indicates the absence of scrambling, and the discrimination result of the discrimination step indicates that the two authentication data do not match.

59. An image processing method, comprising:

the inputting step of inputting an image signal;

the encoding step of generating an encoded image signal by converting the input image signal into a frequency component signal and encoding the frequency signal;

the conversion step of converting the encoded image signal generated in the encoding step in accordance with scramble information indicating the presence/absence of scrambling, said conversion step comprising converting a predetermined frequency component of the encoded image signal;

the authentication data input step of inputting authentication data; and the multiplexing step of multiplexing and outputting at least the encoded image signal processed in said conversion step, the scramble information, and the authentication data.

60. The method according to claim 59, wherein the scramble information indicates the presence/absence of scrambling in units of blocks.

61. The method according to claim 59, wherein the block encoding step comprises:

the DCT step of computing a discrete cosine transform of the input image signal;

the quantization step of quantizing a DCT coefficient obtained in the DCT step in accordance with the encoding parameter; and the encoding step of encoding a quantization result of the quantization step by variable-length coding.

62. The method according to claim 59, wherein the conversion step includes the step of inverting sign bits of codes corresponding to the predetermined frequency component of the encoded image signal.

63. The method according to claim 59, wherein the conversion step includes the step of inverting sign bits of codes corresponding to frequency components of not less than the predetermined frequency.

64. The method according to claim 59, wherein the encoding step includes the step of executing inter-frame predictive coding.

65. An image processing method comprising:

the receiving step of receiving an encoded image signal, authentication data, and scramble information indicating the presence/absence of scrambling, wherein the encoded image signal has been generated by converting an image signal into a frequency component signal and encoding the frequency component signal;

the authentication data input step of inputting authentication data;

the discrimination step of discriminating if the authentication data input in the authentication data input step matches authentication data received in said receiving step;

the conversion step of converting the encoded image signal on the basis of the scramble information and a discrimination result of the discrimination step, said conversion step comprising converting a predetermined frequency component of the encoded image signal; and the decoding step of decoding the encoded image signal in the conversion step.

66. The method according to claim 65, wherein the decoding step comprises:

the variable-length decoding step of decoding the encoded image signal by variable-length decoding;

the dequantization step of dequantizing data decoded in the variable-length decoding step; and the inverse DCT step of computing an inverse DCT of the dequantization result of the dequantization step.

67. An image processing method for receiving and decoding an image signal that has undergone inter-frame predictive coding, comprising:

the authentication data input step of inputting authentication data;

the discrimination step of discriminating if the authentication data input in the authentication data input step matches authentication data input together with the image signal;

the conversion step of converting sign information contained in the encoded image signal on the basis of scramble information which indicates the presence/absence of scrambling and is input together with the image signal;

the first decoding step of decoding the image signal containing the sign information obtained by converting in the conversion step the image signal that has undergone inter-frame predictive coding;

the second decoding step of decoding the input image signal, that has undergone inter-frame predictive coding, using inter-frame prediction information obtained from the first decoding step; and the output step of selecting and outputting one of playback images of the first and second decoding steps on the basis of a discrimination result of the discrimination step.

68. The method according to claim 67, wherein said output step includes the steps of:

selecting and outputting the playback image of said first decoding step when the scramble information indicates the presence of scrambling, and the discrimination result of the discrimination step indicates that the two authentication data match;

selecting and outputting the playback image of said second decoding step when the scramble information indicates the presence of scrambling, and the discrimination result of the discrimination step indicates that the two authentication data do not match;

selecting and outputting the playback image of either said first or second decoding step when the scramble information indicates the absence of scrambling, and the discrimination result of the discrimination step indicates that the two authentication data match; and outputting a specific image when the scramble information indicates the absence of scrambling, and the discrimination result of the discrimination step indicates that the two authentication data do not match.

69. An image encoding method comprising:

the separation step of separating input image data into a plurality of layers;

the block encoding step of encoding in units of blocks image data of respective layers separated in the separation step;

the scramble step of scrambling blocks encoded in the block encoding step in one or a plurality of layers;

the intellectual property protection data input step of inputting intellectual property protection data;

the intellectual property protection data encoding step of encoding the intellectual property protection data; and the multiplexing step of multiplexing and outputting codes encoded in the block encoding step, the intellectual property protection data encoded in the intellectual property protection data encoding step, and codes of the blocks scrambled in the scramble step.

70. The method according to claim 69, wherein the separation step includes the step of down-sampling the input image data in two-dimensional spatial directions.

71. The method according to claim 69, wherein the separation step includes the step of assigning frames of the input image data in units of layers.

72. The method according to claim 69, wherein the scramble step includes the step of replacing a bitstream encoded in the block encoding step by another code having an identical code length.

73. The method according to claim 69, wherein the block encoding step comprises:
   the orthogonal transformation step of computing orthogonal transforms of blocks;
   the quantization step of quantizing coefficients transformed in the orthogonal transformation step; and
   the variable-length encoding step of encoding quantization results of the quantization step by variable-length coding.

74. The method according to claim 69, wherein the multiplexing step includes the step of further multiplexing information indicating whether or not blocks scrambled in the scramble step are contained.

75. An image decoding method comprising:
   the demultiplexing step of receiving an encoded bit stream, and demultiplexing the bit stream into an intellectual property protection code and one or a plurality of layers;
   the intellectual property protection code decoding step of decoding the intellectual property protection code demultiplexed in the demultiplexing step;
   the authentication data input step of receiving external authentication data;
   the authentication step of checking if the authentication data matches a decoding result of the intellectual property protection code decoding step;
   the descramble step of descrambling one or a plurality of layers on the basis of an authentication result of the authentication step;
   the decoding step of decoding the output from the demultiplexing step or the output from the descramble step; and
   the image output step of outputting an image decoded in the decoding step.

76. The method according to claim 75, wherein the image output step includes the step of assigning and outputting frames of an image in units of layers in a playback order.

77. The method according to claim 75, wherein the image output step includes the step of selecting and outputting images from layers selected in units of frames.

78. The method according to claim 75, wherein the descramble step includes the step of replacing the bitstream by another code having an identical code length.

79. The method according to claim 75, wherein the decoding step comprises:
   the input step of inputting a bitstream descrambled in the descramble step;
   the variable-length decoding step of decoding encoded codes in units of blocks by variable-length decoding;
   the dequantization step of dequantizing the decoding results of the variable-length decoding step; and
   the inverse orthogonal transformation step of computing inverse orthogonal transforms of dequantization results of the dequantization step.

80. A data processing method for demultiplexing object streams from a data stream which contains a plurality of object streams each having predetermined information, and reconstructing, compositing, and outputting the object streams, comprising:
   the discrimination step of discriminating if playback of the plurality of object streams is permitted;
   the determination step of determining playback quality of a predetermined object stream on the basis of a discrimination result of the discrimination step; and
   the playback control step of playing back the predetermined object stream with the playback quality determined in the determination step upon playing back the plurality of object streams.

81. The method according to claim 80, wherein information in the predetermined object stream has undergone high-efficiency coding.

82. The method according to claim 81, wherein the playback control step includes the step of controlling the playback quality of the predetermined object stream by processing decoded data of the information that has undergone high-efficiency coding.

83. The method according to claim 80, wherein the playback control step includes the step of controlling the playback quality of the predetermined object stream in accordance with an intellectual property management stream included in the plurality of object streams.

84. The method according to claim 83, wherein the determination step determines a control method of the playback control step, that pertains to the playback quality, on the basis of a type of the intellectual property management stream.

85. The method according to claim 83, wherein the determination step determines a control method of the playback control step, that pertains to the playback quality, on the basis of a type of the intellectual property management stream when it is discriminated in the discrimination step that playback is not permitted.

86. The method according to claim 80, wherein the plurality of object streams are MPEG-4 bitstreams.

87. The method according to claim 80, wherein the control step includes the step of controlling the playback quality of the predetermined object stream by managing multi-thread processes in units of streams.

88. A data processing method for demultiplexing object streams from a data stream which contains a plurality of object streams each having predetermined information, scene description information used to composite information contained in the plurality of object streams, and a management stream having management information used to manage a copyright of the information, reconstructing the information, and compositing and outputting playback data on the basis of the scene description information, comprising:
   the discrimination step of discriminating if playback of the plurality of object streams is permitted;
   the determination step of determining playback quality of a predetermined object stream on the basis of a discrimination result of the discrimination step; and
   the playback control step of playing back the predetermined object stream with the playback quality determined in the determination step upon playing back the plurality of object streams.

89. A computer readable memory that stores a control program for making a computer encode an image signal, said control program comprising:
   a code of the encoding step of encoding an input image signal in units of blocks by using a quantizing parameter, and outputting encoded codes;
   a code of the conversion step of converting the quantizing parameter in accordance with scramble information indicating the presence/absence of scrambling;
   a code of the authentication data input step of inputting authentication data; and
   a code of the multiplexing step of multiplexing and outputting at least the encoded codes output from the encoding step, the quantizing parameter processed in the conversion step, the scramble information, and the authentication data.

90. A computer readable memory comprising:

a code of the receiving step of receiving an encoded image signal, a quantizing parameter, authentication data, and scramble information indicating the presence/absence of scrambling, wherein the encoded image signal is obtained by quantizing and encoding image data in units of blocks;

a code of the authentication data input step of inputting authentication data;

a code of the discrimination step of discriminating if the authentication data input in the authentication data input step matches authentication data received in said receiving step;

a code of the parameter conversion step of converting the quantizing parameter on the basis of the scramble information and a discrimination result of the discrimination step; and a code of the decoding step of decoding the encoded image signal in units of blocks in accordance with the quantizing parameter output from the parameter conversion step.

91. A computer readable memory that stores a control program for making a computer decode an image signal that has undergone inter-frame coding, said control program comprising:

a code of the authentication data input step of inputting authentication data;

a code of the discrimination step of discriminating if the authentication data input in the authentication data input step matches authentication data input together with the image signal;

a code of the parameter conversion step of converting an encoding parameter input together with the image signal on the basis of scramble information which indicates the presence/absence of scrambling and is input together with the image signal;

a code of the first decoding step of decoding the image signal, that has undergone inter-frame predictive coding, in units of blocks in accordance with the encoding parameter output from the parameter conversion step;

a code of the second decoding step of decoding the image signal, that has undergone inter-frame predictive coding, using the encoding parameter input together with the image signal and inter-frame prediction information obtained from the first decoding step; and a code of the output step of selecting and outputting one of playback images of the first and second decoding steps on the basis of a discrimination result of the discrimination step.

92. A computer readable memory comprising:

a code of the inputting step of inputting an image signal;

a code of the encoding step of generating an encoded image signal by converting the input image signal into a frequency component signal and encoding the frequency component signal;

a code of the conversion step of converting the encoded image signal generated by the encoding step in accordance with scramble information indicating the presence/absence of scrambling, said conversion means converting a predetermined frequency component of the encoded image signal;

a code of the authentication data input step of inputting authentication data; and a code of the multiplexing step of multiplexing and outputting at least the encoded image signal processed in said conversion step, the scramble information, and the authentication data.

93. A computer readable memory comprising:

a code of the receiving step of receiving an encoded image signal, authentication data, and scramble information indicating the presence/absence of scrambling, wherein the encoded image signal has been generated by converting an image signal into a frequency component signal and encoding the frequency component signal;

a code of the authentication data input step of inputting authentication data;

a code of the discrimination step of discriminating if the authentication data input in the authentication data input step matches authentication data received in said receiving step;

a code of the conversion step of converting the encoded image signal on the basis of the scramble information and a discrimination result of the discrimination step, said conversion step comprising converting a predetermined frequency component of the encoded image signal; and a code of the decoding step of decoding the encoded image signal processed in the conversion step.

94. A computer readable memory that stores a control program for making a computer decode an image signal that has undergone inter-frame predictive coding, said control program comprising:

a code of the authentication data input step of inputting authentication data;

a code of the discrimination step of discriminating if the authentication data input in the authentication data input step matches authentication data input together with the image signal;

a code of the conversion step of converting sign information contained in the encoded image signal on the basis of scramble information which indicates the presence/absence of scrambling and is input together with the image signal;

a code of the first decoding step of decoding the image signal containing the sign information obtained by converting in the conversion step the image signal that has undergone inter-frame predictive coding;

a code of the second decoding step of decoding the input image signal, that has undergone inter-frame predictive coding, using inter-frame prediction information obtained from the first decoding step; and a code of the output step of selecting and outputting one of playback images of the first and second decoding steps on the basis of a discrimination result of the discrimination step.

95. A computer readable memory that stores a control program for making a computer encode an image signal, said control program comprising:

a code of the separation step of separating input image data into a plurality of layers;

a code of the block encoding step of encoding image data of respective layers separated in the separation step in units of blocks;

a code of the scramble step of scrambling blocks encoded in the block encoding step in one or a plurality of layers;

a code of the intellectual property protection data input step of inputting intellectual property protection data;

a code of the intellectual property protection data encoding step of encoding the intellectual property protection data; and a code of the multiplexing step of multiplexing and outputting codes encoded in the block encoding step, the intellectual property protection data encoded in the intellectual property protection data encoding step, and codes of the blocks scrambled in the scramble step.

96. A computer readable memory that stores a control program for making a computer decode an image signal, said control program comprising:

a code of the demultiplexing step of receiving an encoded bitstream, and demultiplexing the bit stream into an intellectual property protection code and one or a plurality of layers;

a code of the intellectual property protection code decoding step of decoding the intellectual property protection code demultiplexed in the demultiplexing step;

a code of the authentication data input step of receiving external authentication data;

a code of the authentication step of checking if the authentication data matches a decoding result of the intellectual property protection code decoding step;

a code of the descramble step of descrambling one or a plurality of layers on the basis of an authentication result of the authentication step;

a code of the decoding step of decoding the output from the demultiplexing step or the output from the descramble step; and a code of the image output step of outputting an image decoded in the decoding step.

97. A computer readable memory that stores a control program for making a computer execute a data process for demultiplexing object streams from a data stream which contains a plurality of object streams each having predetermined information, and reconstructing, compositing, and outputting the object streams, said control program comprising:

a code of the discrimination step of discriminating if playback of the plurality of object streams is permitted;

a code of the determination step of determining playback quality of a predetermined object stream on the basis of a discrimination result of the discrimination step; and a code of the playback control step of playing back the predetermined object stream with the playback quality determined in the determination step upon playing back the plurality of object streams.

98. A computer readable memory that stores a control program for making a computer execute a data process for demultiplexing object streams from a data stream which contains a plurality of object streams each having predetermined information, scene description information used to composite information contained in the plurality of object streams, and a management stream having management information used to manage a copyright of the information, reconstructing the information, and compositing and outputting playback data on the basis of the scene description information, said control program comprising:

a code of the discrimination step of discriminating if playback of the plurality of object streams is permitted;

a code of the determination step of determining playback quality of a predetermined object stream on the basis of a discrimination result of the discrimination step; and a code of the playback control step of playing back the predetermined object stream with the playback quality determined in the determination step upon playing back the plurality of object streams.

* * * * *

UNITED STATES PATENT AND TRADEMARK OFFICE
CERTIFICATE OF CORRECTION

PATENT NO.      : 6,810,131 B2
DATED           : October 26, 2004
INVENTOR(S)     : Toshiyuki Nakagawa et al.

It is certified that error appears in the above-identified patent and that said Letters Patent is hereby corrected as shown below:

Title page,
Item [*] Notice, "502" should read -- 614 --; and
Item [56], References Cited, FOREIGN PATENT DOCUMENTS, "EP 0 696 668 1/2000" should be deleted.

Column 1,
Line 55, "sub" should read -- sub- --.

Column 5,
Line 25, "embodiment;" should read -- embodiment; and --

Column 6,
Line 53, "QP'i[j][i]." should read -- QP'[j][i]. --.

Column 17,
Line 62, "macrob-" should read -- macro- --.
Line 63, "locks." should read -- blocks. --.

Column 24,
Line 1, "can" should read -- can be --.

Column 28,
Line 7, "include" should read -- includes --.

Column 30,
Line 34, "must" should read -- must be --.

Column 34,
Line 25, "means;" should read -- means; and --.

UNITED STATES PATENT AND TRADEMARK OFFICE
CERTIFICATE OF CORRECTION

PATENT NO. : 6,810,131 B2
DATED : October 26, 2004
INVENTOR(S) : Toshiyuki Nakagawa et al.

It is certified that error appears in the above-identified patent and that said Letters Patent is hereby corrected as shown below:

Column 37,
Line 15, "means:" should read -- means; --.
Line 37, "20" should be deleted.

Signed and Sealed this

Third Day of May, 2005

JON W. DUDAS
*Director of the United States Patent and Trademark Office*